(12) United States Patent
Cavalier

(10) Patent No.: US 9,742,867 B1
(45) Date of Patent: Aug. 22, 2017

(54) NETWORK DATA RETRIEVAL

(71) Applicant: SAS Institute Inc., Cary, NC (US)

(72) Inventor: Charles Michael Cavalier, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/467,955

(22) Filed: Mar. 23, 2017

Related U.S. Application Data

(60) Provisional application No. 62/312,745, filed on Mar. 24, 2016.

(51) Int. Cl.
G06F 15/16 (2006.01)
H04L 29/08 (2006.01)

(52) U.S. Cl.
CPC .......... *H04L 67/32* (2013.01); *H04L 67/1097* (2013.01)

(58) Field of Classification Search
CPC ............................ H04L 67/32; H04L 67/1097
See application file for complete search history.

(56) References Cited

U.S. PATENT DOCUMENTS

| | | | | |
|---|---|---|---|---|
| 5,230,047 A * | 7/1993 | Frey, Jr. | ............... | G06F 11/1402 707/E17.012 |
| 8,406,175 B2 * | 3/2013 | Santivanez | ....... | H04W 74/0816 370/328 |
| 8,667,012 B2 | 3/2014 | Fuchs et al. | | |
| 9,092,481 B2 | 7/2015 | Digana | | |
| 9,171,031 B2 * | 10/2015 | Dhuse | ............... | G06F 17/30321 |
| 9,325,635 B2 * | 4/2016 | Kim | ................. | H04L 12/413 |
| 2011/0205961 A1 * | 8/2011 | Santivanez | ....... | H04W 74/0816 370/328 |
| 2013/0188653 A1 * | 7/2013 | Kim | ................. | H04L 12/413 370/442 |
| 2013/0238630 A1 * | 9/2013 | Dhuse | ............... | G06F 17/30321 707/741 |
| 2014/0379631 A1 | 12/2014 | Sebastian et al. | | |
| 2015/0365800 A1 * | 12/2015 | Vennelakanti | ...... | H04W 56/005 702/104 |

OTHER PUBLICATIONS

Gioran, Chris, "ADigital Stain, Neo4j Internals: Persistence and Memory Mapping", retrieved from <http://digitalstain.blogspot.com/2010/10/neo4j-internals-persistence-and-memory.html>, Oct. 10, 2010, 3 pages.

"Chapter 9 Performance—The Neo4j Operations manual v.3.1", retrieved from <http://neo4j.com/docs/stable/configuration-io-examples.html>, Apr. 26, 2016, 6 pages, (author unknown).

* cited by examiner

*Primary Examiner* — Moustafa M Meky

(57) ABSTRACT

An apparatus includes a processor and a storage storing instructions causing the processor to: receive a request for data concerning a target node and neighboring nodes; multiply an identifier of the target node with an index multiplier to determine a location of an index entry of the target node within an index data; access the index entry to retrieve an identifier of a window and an indication of a location within the window at which a node entry of the target node may be accessed, and to retrieve an indication of data size of the node entry; access the node entry within the identified window to retrieve an amount of the node entry up to the data size to retrieve at least one identifier of at least one neighboring node within a single degree of separation of the target node; and output the at least one identifier.

30 Claims, 33 Drawing Sheets

500 

RECEIVE GRID STATUS INFORMATION INCLUDING A PROJECT STATUS OF A PORTION OF A PROJECT BEING EXECUTED BY A NODE IN THE COMMUNICATIONS GRID
502

STORE THE GRID STATUS INFORMATION
504

RECEIVE A FAILURE COMMUNICATION CORRESPONDING TO A NODE IN THE COMMUNICATIONS GRID
506

REASSIGN A NODE OR A PORTION OF THE PROJECT BEING EXECUTED BY THE FAILED NODE
508

RECEIVE UPDATED GRID STATUS INFORMATION BASED ON THE REASSIGNMENT
510

TRANSMIT A SET OF INSTRUCTIONS BASED ON THE UPDATED GRID STATUS INFORMATION TO ONE OR MORE NODES IN THE COMMUNICATIONS GRID
512

FIG. 5

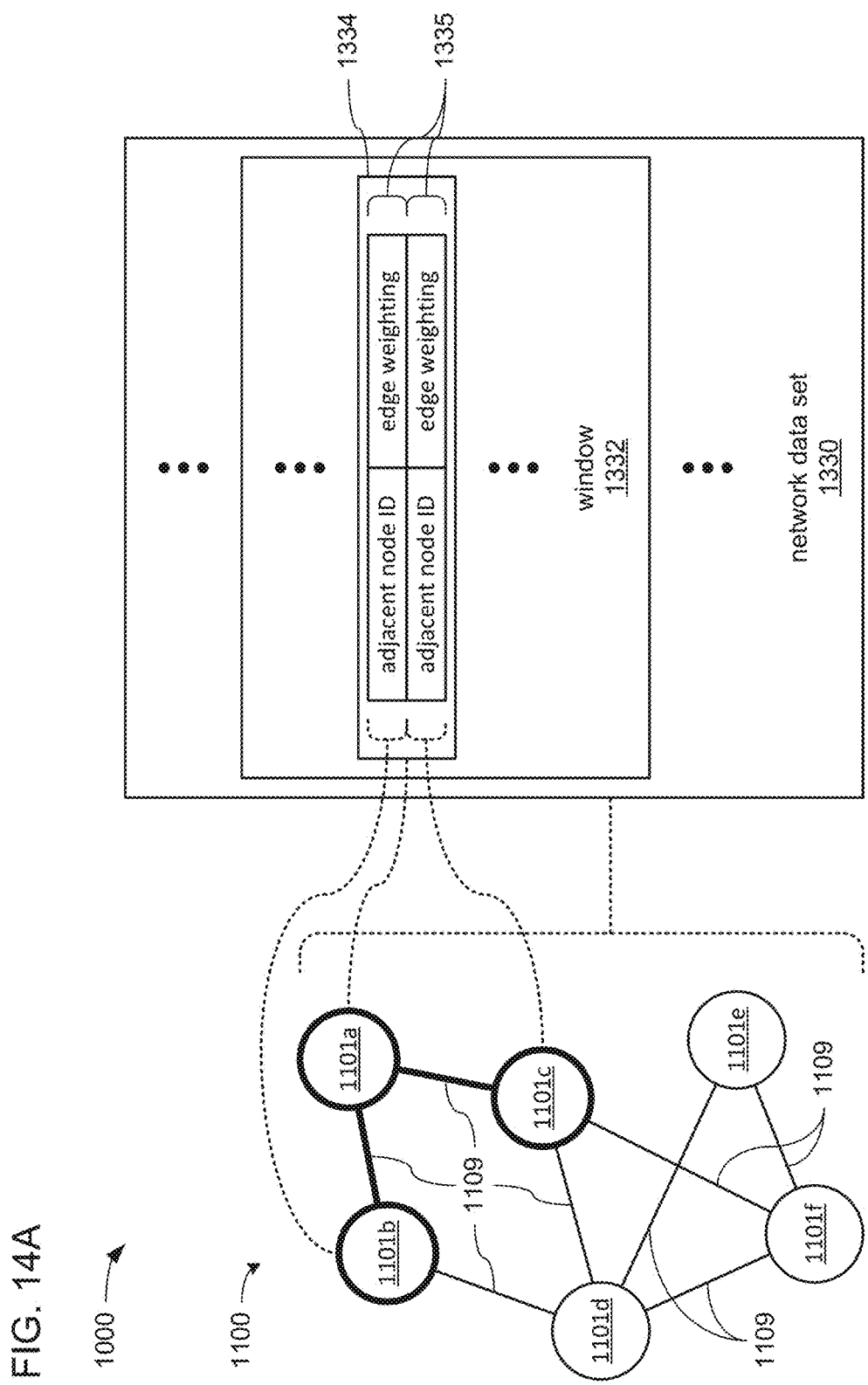

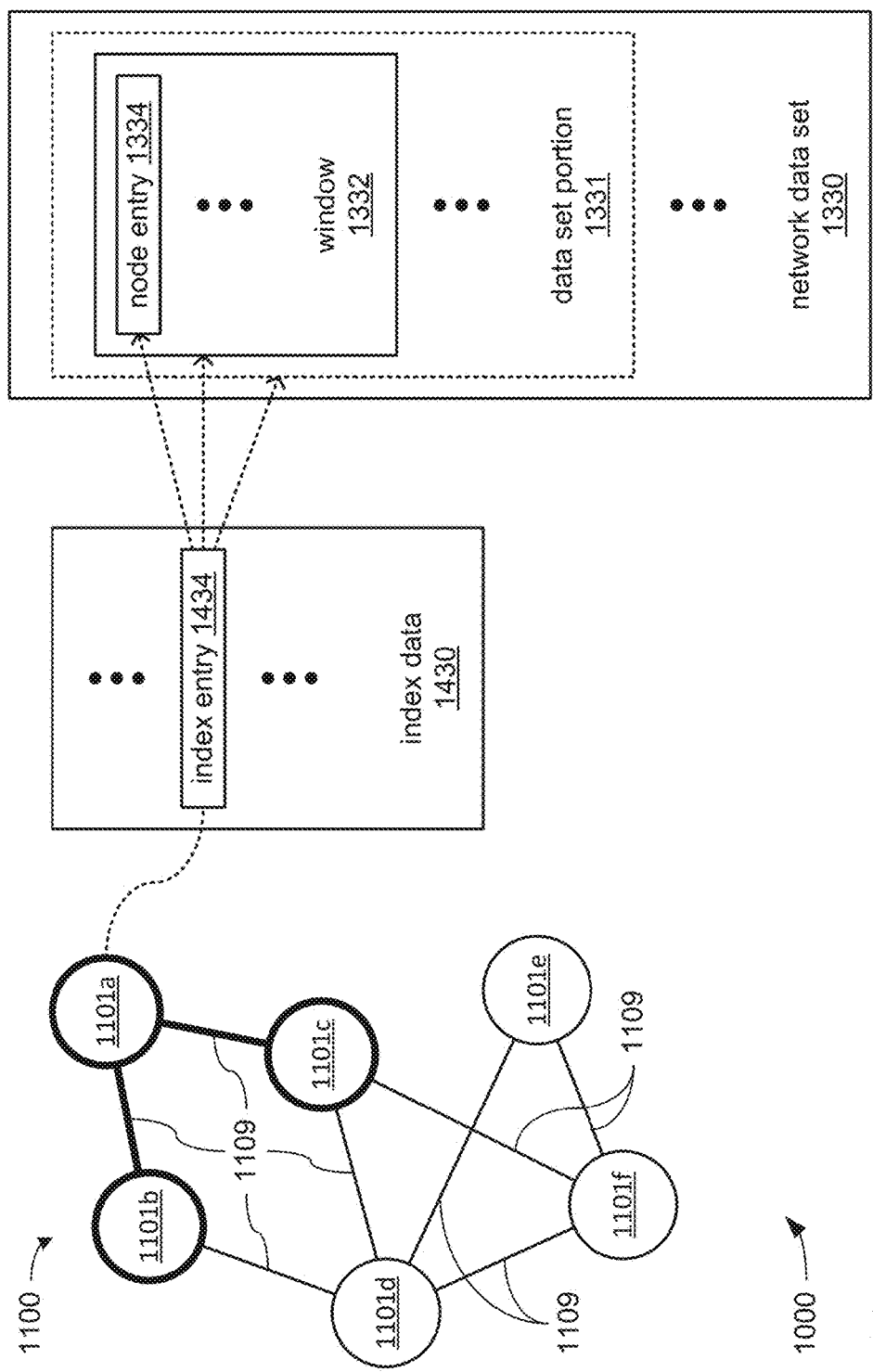

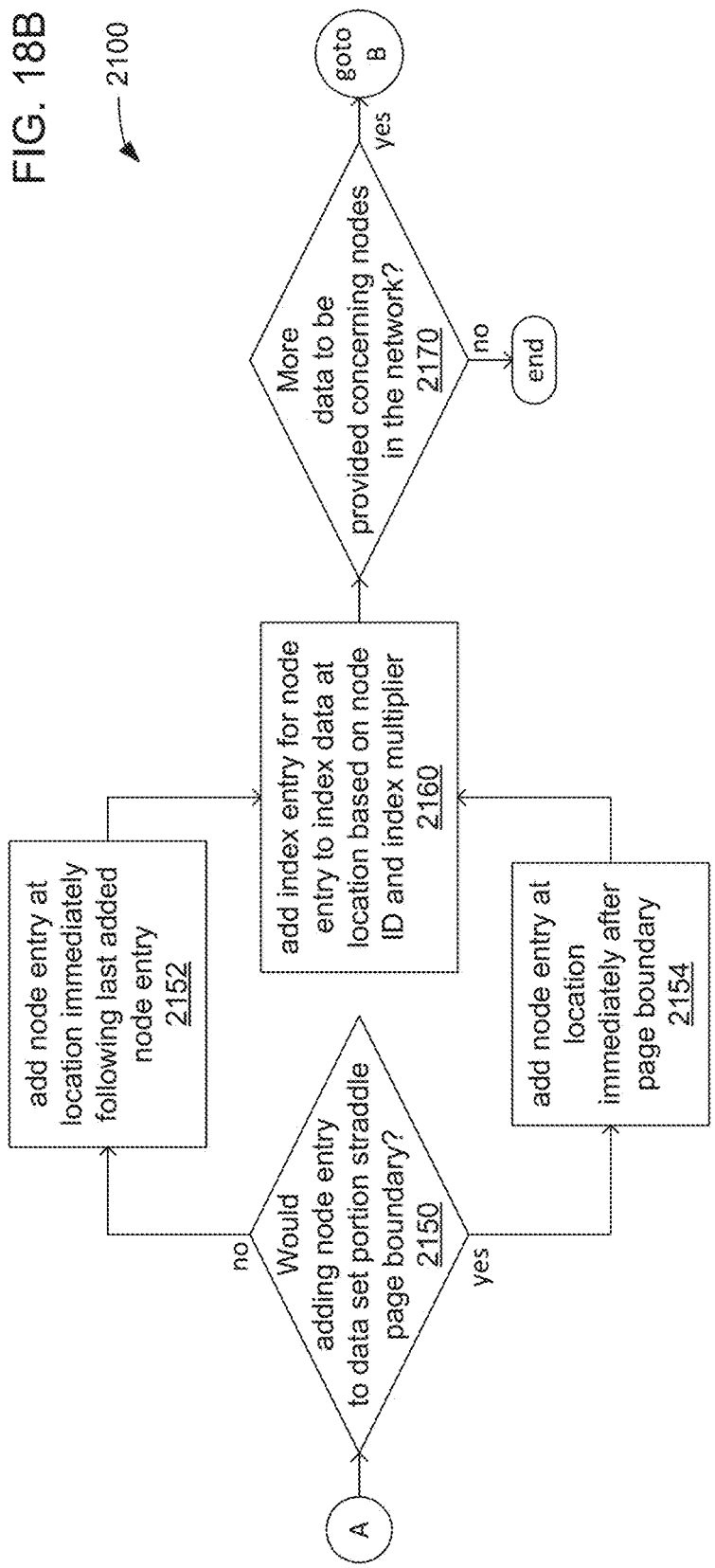

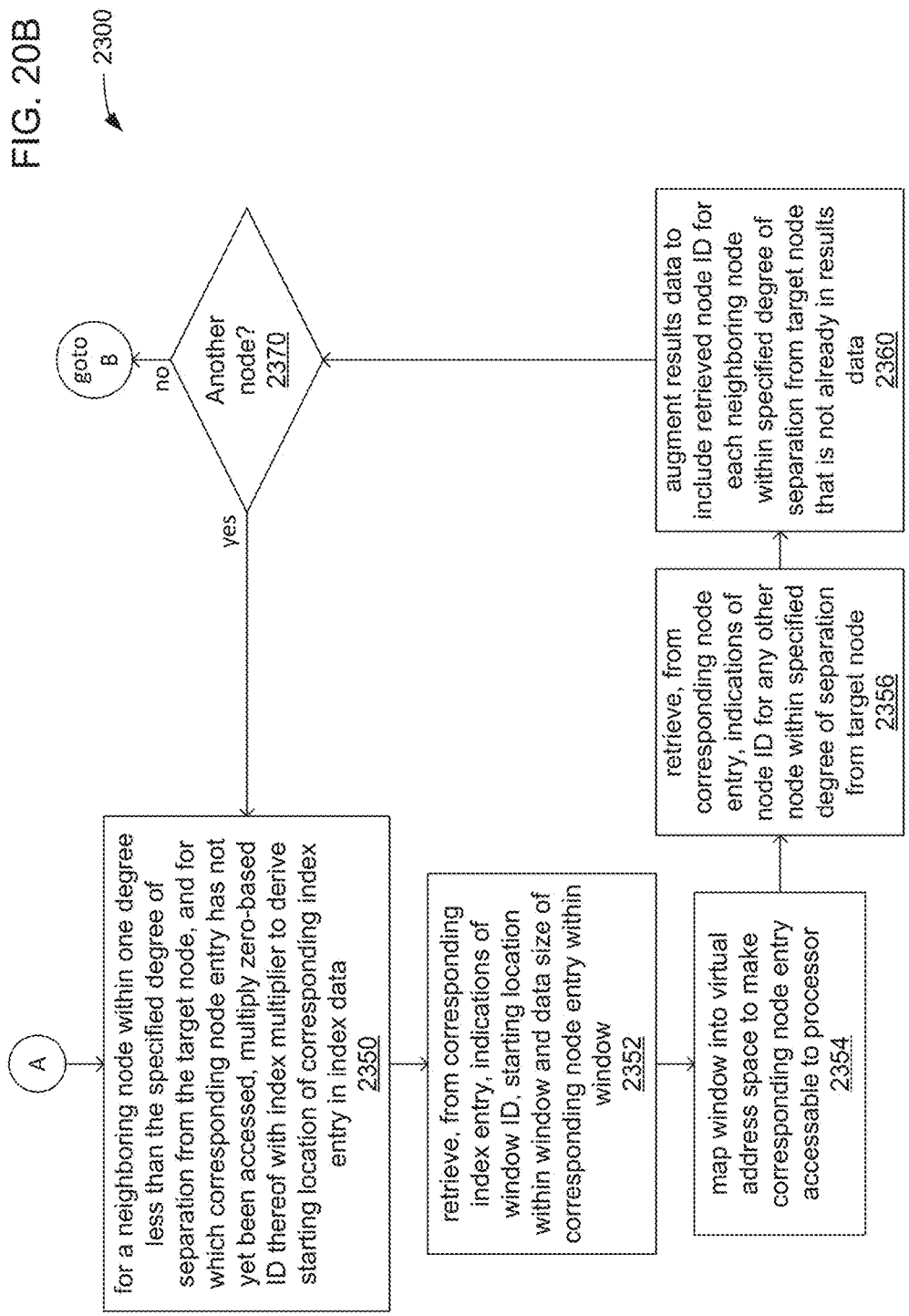

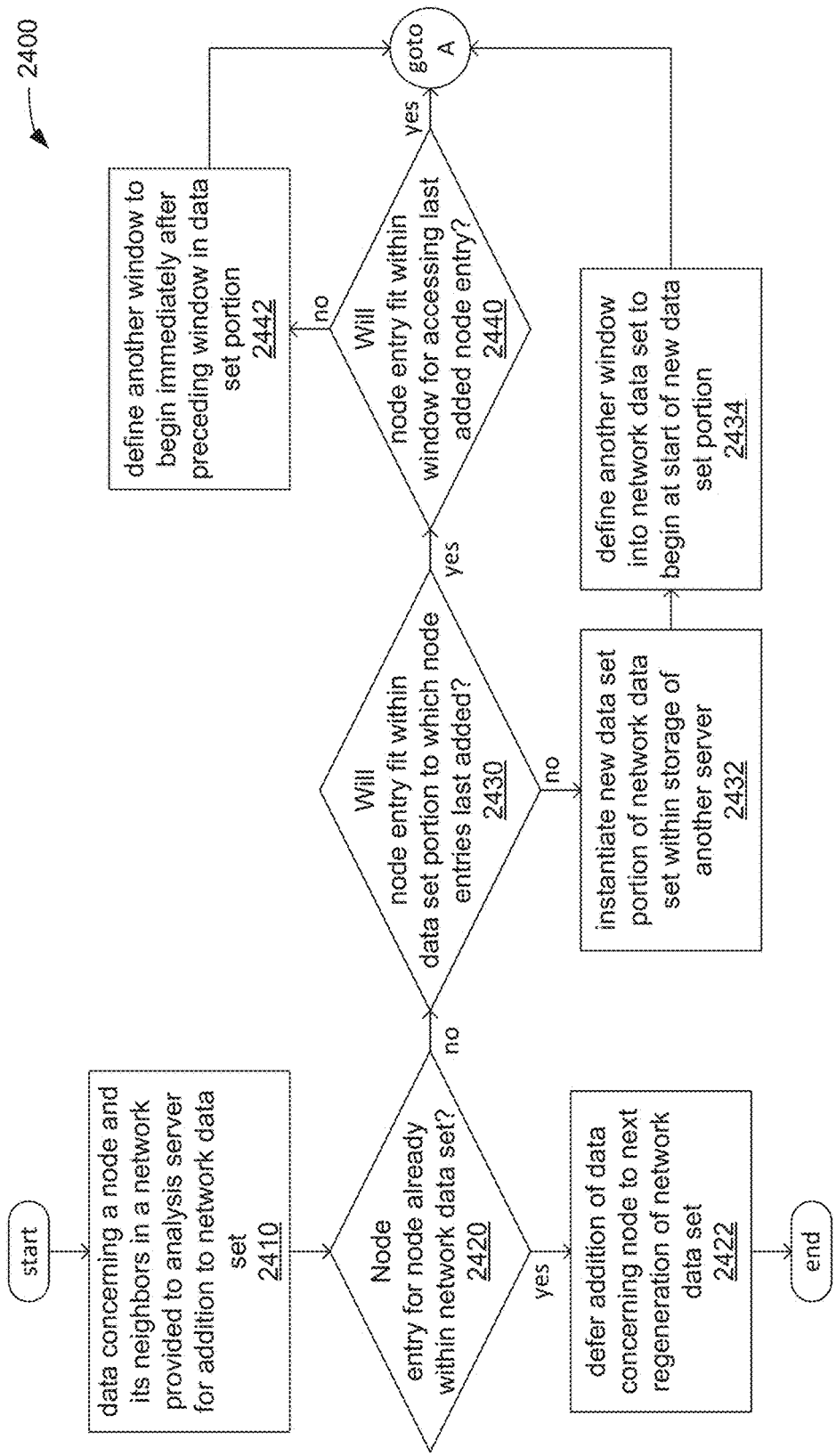

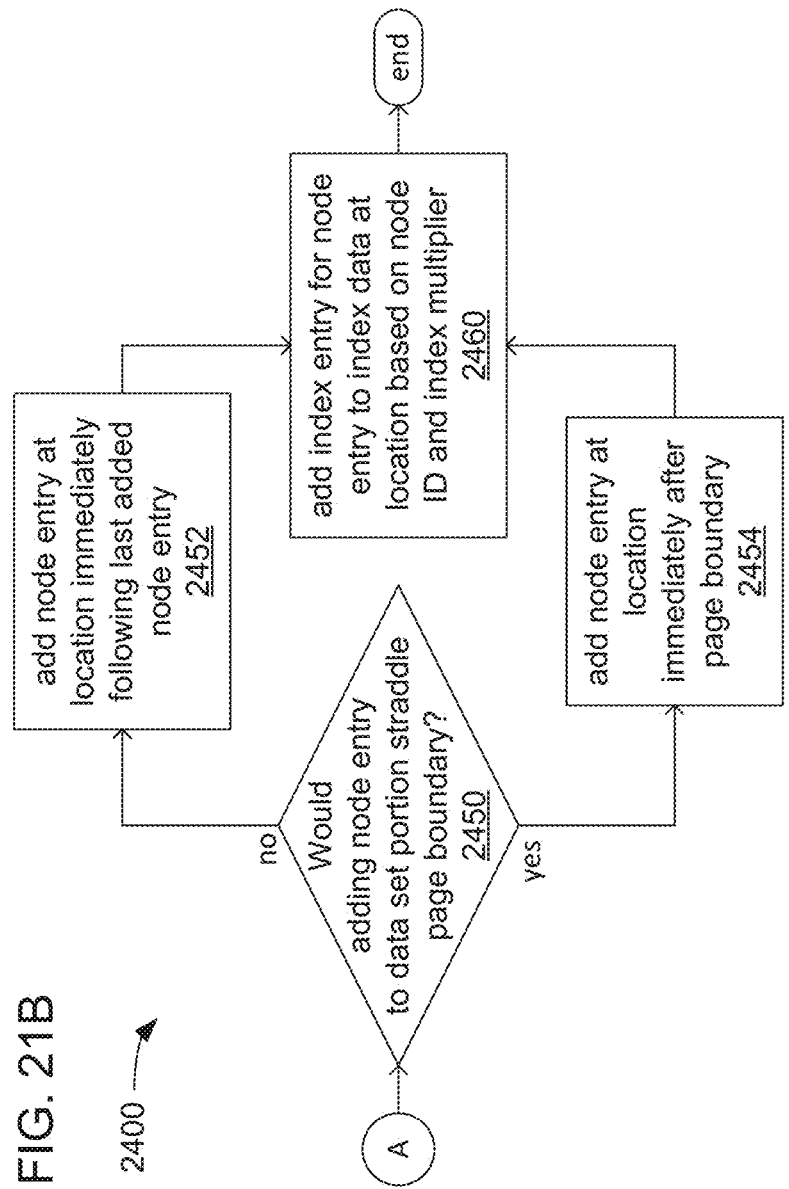

NETWORK DATA RETRIEVAL

CROSS-REFERENCE TO RELATED APPLICATIONS

This application claims the benefit of priority under 35 U.S.C. §119(e) to U.S. Provisional Application Ser. No. 62/312,745 filed Mar. 24, 2016, the entirety of which is incorporated herein by reference.

BACKGROUND

There is growing recognition that understanding characteristics of connections between objects can be as important, if not more important, than understanding characteristics of the objects, themselves. Understanding where there is or isn't a connection between two or more objects can aid in recognizing influences that may exist between objects, and understanding the characteristics of a connection between two objects can aid in understanding a likelihood and/or mechanism of an effect by one of the objects on the other.

Therefore, it has become increasingly commonplace to create and store network data sets in which sets of objects and the connections thereamong are represented as a network of nodes that represent the objects and edges extending between pairs of the nodes that represent the connections. The represented objects may be any of a variety of people or inanimate things, and the represented connections thereamong may be any of a variety of physical, chemical, behavioral and/or still other types of connection. As recognition of the usefulness of such network data sets has continued to grow, the quantity, size and complexity of network data sets has also continued to grow, thereby creating various challenges unique to such data sets.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus may include a processor and a storage to store instructions that, when executed by the processor, cause the processor to perform operations including receive, at an analysis server, a request for data concerning a target node and one or more neighboring nodes of the target node that are within a degree of separation specified by the request from the target node within a network that includes multiple nodes interconnected by multiple edges. The processor may be further caused to multiply an identifier of the target node provided by the request with an index multiplier to determine a location of an index entry of the target node within an index data, wherein: the index data includes multiple index entries for the multiple nodes of the network; the multiple index entries are organized based on a sequential order of multiple zero-based numeric identifiers that are each uniquely associated with each node of the multiple nodes; the identifier of the target node includes one of the multiple zero-based numeric identifiers; and the index multiplier is based on a length of each of the multiple index entries. The processor may be further caused to access the index entry of the target node within the index data to retrieve an identifier of a window and an indication of a location within the window at which a node entry of the target node within a network data set may be accessed, and to retrieve an indication of data size of the node entry of the target node, wherein: the network data set includes multiple node entries for the multiple nodes of the network; and the window includes one of multiple windows that are each defined to enable access to a corresponding subset of the network data set. The processor may be further caused to access the node entry of the target node within the network data set at the indicated location within the identified window to retrieve an amount of the node entry of the target node up to the indicated data size, wherein the node entry of the target node includes: at least one identifier of at least one neighboring node of the target node that is within a first degree of separation from the target node within the network; and at least one weighting value associated with at least one edge interposed between the target node and the at least one neighboring node. The processor may be further caused to output an indication of the at least one identifier of the at least one neighboring node within the first degree of separation from the target node.

The apparatus may include a persistent storage to retain the network data set therein regardless of provision of electric power thereto, and a volatile storage able to provide the processor with faster access than the persistent storage to multiple pages of the network data set stored therein, wherein, in accessing the node entry of the target node; and the processor is caused to retrieve, from the persistent storage, at least one page of the network data set within the identified window that includes the node entry of the target node, and store, within the volatile storage, the at least one page. The apparatus may include a display; the network may include a social network; each node of the multiple nodes may include a person; each edge of the multiple edges may include a relationship between two persons; in outputting the indication of the at least one identifier of the at least one neighboring node, the processor may be caused to present the indication of the at least one identifier on the display as part of a presentation of a portion of the network within a user interface; and in providing the user interface, the processor may be caused to alter the presentation of the portion of the network in response to input received by the processor through the user interface.

The network data set may include multiple data set portions; each of the multiple data set portions may be stored by a separate one of multiple storage servers; each of the multiple storage servers may include a persistent storage to retain one of the multiple data set portions therein regardless of provision of electric power thereto; each window of the multiple windows may be defined to provide access to multiple pages of one of the data set portions of the multiple data set portions; and the apparatus may include a volatile storage able to provide the processor with faster access than the persistent storage to multiple pages of the network data set stored therein. In accessing the node entry of the target node, the processor may be caused to perform operations including: transmit, to a storage server that stores a data set portion that the identified window provides access to at least a subset of, a request for at least one page of the data set portion within the identified window that includes the node entry of the target node; receive, at the analysis server, the at least one page from the storage server; and store, within the volatile storage, the at least one page. The processor may be caused to access the index entry of the target node to additionally retrieve an identifier of at least one of the data set portion and the storage server; and select the storage server from among the multiple storage servers to transmit the request to based on the identifier of at least one of the data set portion and the storage server. The identifier of the window may also identify at least one of the data set portion and the storage server.

The processor may be caused to perform operations including determine whether the degree of separation specified by the request from the target node is greater than one. In response to the determination that the specified degree of separation from the target node is greater than one, for each neighboring node within the specified degree of separation from the target node, the processor may perform operations including: multiply an identifier of the neighboring node with the index multiplier to determine a location of an index entry of the neighboring node within the index data; access the index entry of the neighboring node within the index data to retrieve an identifier of a window and an indication of a location within the window at which a node entry of the neighboring node within the network data set may be accessed, and to retrieve an indication of the data size of the node entry of the neighboring node; access the node entry of the neighboring node within the network data set at the indicated location within the identified window to retrieve an amount of the node entry of the neighboring node up to the indicated data size, wherein the node entry of the neighboring node includes an identifier of another neighboring node of the target node that is within the specified degree of separation from the target node within the network, and a weighting value associated with an edge interposed between the neighboring node and the other neighboring node; and output an indication of the identifier of the other neighboring node.

The processor may be caused to perform operations including receive, at the analysis server, data descriptive of the multiple nodes of the network; and for each node of the multiple nodes, perform operations including add a node entry of the multiple node entries for the node to the network data set, and add an index entry of the multiple index entries for the node to the index data at a location that enables the index entry to be accessed by multiplying the identifier of the node with the index multiplier. For each node entry of the multiple node entries that is added to the node data set, the processor may be caused to perform operations including: determine whether adding the node entry at a location within the network data set that is immediately adjacent to another node entry most recently added to the network data set will cause the node entry to straddle a page boundary; and in response to a determination that adding the node entry immediately adjacent to the other node will straddle a page boundary, add the node entry at a location adjacent to and not straddling the page boundary. The network data set may include multiple data set portions; each of the multiple data set portions may be stored by a separate one of multiple storage servers; and adding the node entry to the network data set may include adding the node entry to one of the data set portions stored by one of the multiple storage servers. In adding the node entry of the multiple node entries to the one of the data set portions, the processor may include caused to perform operations including: determine whether the node entry will fit within the one of the multiple data set portions; and in response to a determination that the node entry will not fit within the one of the multiple data set portions, perform operations including instantiate another of the multiple data set portions within another of the multiple storage servers, and add the node entry to the other of the multiple data set portions.

A computer-program product tangibly embodied in a non-transitory machine-readable storage medium, the computer-program product including instructions operable to cause a processor to perform operations including receive, at an analysis server, a request for data concerning a target node and one or more neighboring nodes of the target node that are within a degree of separation specified by the request from the target node within a network that includes multiple nodes interconnected by multiple edges. The processor may be further caused to multiply, at the analysis server, an identifier of the target node provided by the request with an index multiplier to determine a location of an index entry of the target node within an index data, wherein: the index data may include multiple index entries for the multiple nodes of the network; the multiple index entries are organized based on a sequential order of multiple zero-based numeric identifiers that are each uniquely associated with each node of the multiple nodes; the identifier of the target node may include one of the multiple zero-based numeric identifiers; and the index multiplier may be based on a length of each of the multiple index entries. The processor may be further caused to access, at the analysis server, the index entry of the target node within the index data to retrieve an identifier of a window and an indication of a location within the window at which a node entry of the target node within a network data set may be accessed, and to retrieve an indication of data size of the node entry of the target node, wherein: the network data set may include multiple node entries for the multiple nodes of the network; and the window may include one of multiple windows that are each defined to enable access to a corresponding subset of the network data set. The processor may be further caused to access the node entry of the target node within the network data set at the indicated location within the identified window to retrieve an amount of the node entry of the target node up to the indicated data size, wherein the node entry of the target node includes: at least one identifier of at least one neighboring node of the target node that is within a first degree of separation from the target node within the network; and at least one weighting value associated with at least one edge interposed between the target node and the at least one neighboring node. The processor may be further caused to output, from the analysis server, an indication of the at least one identifier of the at least one neighboring node within the first degree of separation from the target node.

In accessing the node entry of the target node, the processor may be caused to perform operations including: retrieve, from a persistent storage of the analysis server, at least one page of the network data set within the identified window that includes the node entry of the target node, wherein the persistent storage is to retain the network data set therein regardless of provision of electric power thereto; and store, within a volatile storage of the analysis server, the at least one page, wherein the volatile storage is able to provide the processor with faster access than the persistent storage to multiple pages of the network data set stored therein. In outputting the indication of the at least one identifier of the at least one neighboring node, the processor may be caused to provide the indication of the at least one identifier to an application routine executed by the processor at the analysis server.

The network data set may include multiple data set portions; each of the multiple data set portions may be stored by a separate one of multiple storage servers; each of the multiple storage servers may include a persistent storage to retain one of the multiple data set portions therein regardless of provision of electric power thereto; and each window of the multiple windows may be defined to provide access to multiple pages of one of the data set portions of the multiple data set portions. In accessing the node entry of the target node, the processor may be caused to perform operations including: transmit, from the analysis server and to a storage server that stores a data set portion that the identified window provides access to at least a subset of, a request for at least one page of the data set portion within the identified window that includes the node entry of the target node; receive, at the analysis server, the at least one page from the storage server; and store, within a volatile storage of the analysis server, the at least one page, wherein the volatile storage able to provide the processor with faster access than the persistent storage to multiple pages of the network data set stored therein. The processor may be caused to: access, at the analysis server, the index entry of the target node to additionally retrieve an identifier of at least one of the data set portion and the storage server; and select, at the analysis server, the storage server from among the multiple storage servers to transmit the request to based on the identifier of at least one of the data set portion and the storage server. The identifier of the window may also identify at least one of the data set portion and the storage server.

The processor may be caused to perform operations including determine, at the analysis server, whether the degree of separation specified by the request from the target node is greater than one. In response to a determination that the specified degree of separation from the target node is greater than one, for each neighboring node within the specified degree of separation from the target node, perform operations including: multiply, at the analysis server, an identifier of the neighboring node with the index multiplier to determine a location of an index entry of the neighboring node within the index data; access, at the analysis server, the index entry of the neighboring node within the index data to retrieve an identifier of a window and an indication of a location within the window at which a node entry of the neighboring node within the network data set may be accessed, and to retrieve an indication of the data size of the node entry of the neighboring node; access the node entry of the neighboring node within the network data set at the indicated location within the identified window to retrieve an amount of the node entry of the neighboring node up to the indicated data size, wherein the node entry of the neighboring node includes an identifier of another neighboring node of the target node that is within the specified degree of separation from the target node within the network, and a weighting value associated with an edge interposed between the neighboring node and the other neighboring node; and output, from the analysis server an indication of the identifier of the other neighboring node.

The processor may be caused to perform operations including: receive, at the analysis server, data descriptive of the multiple nodes of the network; and for each node of the multiple nodes, the processor may be caused to perform operations including add a node entry of the multiple node entries for the node to the network data set, and add an index entry of the multiple index entries for the node to the index data at a location that enables the index entry to be accessed by multiplying the identifier of the node with the index multiplier. For each node entry of the multiple node entries that is added to the node data set, the processor may be caused to perform operations including: determine, at the analysis server, whether adding the node entry at a location within the network data set that is immediately adjacent to another node entry most recently added to the network data set will cause the node entry to straddle a page boundary; and in response to a determination that adding the node entry immediately adjacent to the other node will straddle a page boundary, add the node entry at a location adjacent to and not straddling the page boundary. The network data set may include multiple data set portions; each of the multiple data set portions may be stored by a separate one of multiple storage servers; and adding the node entry to the network data set may include adding the node entry to one of the data set portions stored by one of the multiple storage servers. In adding the node entry of the multiple node entries to the one of the data set portions, the processor may be caused to perform operations including: determine, at the analysis server, whether the node entry will fit within the one of the multiple data set portions; and in response to a determination that the node entry will not fit within the one of the multiple data set portions, the processor may be caused to perform operations including instantiate another of the multiple data set portions within another of the multiple storage servers, and add the node entry to the other of the multiple data set portions.

A computer-implemented method may include receiving, at an analysis server, a request for data concerning a target node and one or more neighboring nodes of the target node that are within a degree of separation specified in the request from the target node within a network that includes multiple nodes interconnected by multiple edges. The method may further include multiplying, at the analysis server, an identifier of the target node provided by the request with an index multiplier to determine a location of an index entry of the target node within an index data, wherein: the index data includes multiple index entries for the multiple nodes of the network; the multiple index entries are organized based on a sequential order of multiple zero-based numeric identifiers that are each uniquely associated with each node of the multiple nodes; the identifier of the target node includes one of the multiple zero-based numeric identifiers; and the index multiplier is based on a length of each of the multiple index entries. The method may further include accessing, at the analysis server, the index entry of the target node within the index data to retrieve an identifier of a window and an indication of a location within the window at which a node entry of the target node within a network data set may be accessed, and to retrieve an indication of data size of the node entry of the target node, wherein: the network data set includes multiple node entries for the multiple nodes of the network; and the window includes one of multiple windows that are each defined to enable access to a corresponding subset of the network data set. The method may further include accessing the node entry of the target node within the network data set at the indicated location within the identified window to retrieve an amount of the node entry of the target node up to the indicated data size, wherein the node entry of the target node includes: at least one identifier of at least one neighboring node of the target node that is within a first degree of separation from the target node within the network; and at least one weighting value associated with at least one edge interposed between the target node and the at least one neighboring node. The method may further include outputting; from the analysis server, an indication of the at least one identifier of the at least one neighboring node within the first degree of separation from the target node.

Accessing the node entry of the target node may include: retrieving, from a persistent storage of the analysis server, at least one page of the network data set within the identified window that includes the node entry of the target node, wherein the persistent storage is to retain the network data set therein regardless of provision of electric power thereto; and storing, within a volatile storage of the analysis server, the at least one page, wherein the volatile storage is able to provide a processor of the analysis server with faster access than the persistent storage to multiple pages of the network data set stored therein. Outputting the indication of the at least one identifier of the at least one neighboring node may include transmitting the indication of the at least one identifier to a viewing device.

The network data set may include multiple data set portions; each of the multiple data set portions may be stored by a separate one of multiple storage servers; each of the multiple storage servers may include a persistent storage to retain one of the multiple data set portions therein regardless of provision of electric power thereto; and each window of the multiple windows may be defined to provide access to multiple pages of one of the data set portions of the multiple data set portions. Accessing the node entry of the target node may include: transmitting, from the analysis server and to a storage server that stores a data set portion that the identified window provides access to at least a subset of, a request for at least one page of the data set portion within the identified window that includes the node entry of the target node; receiving, at the analysis server, the at least one page from the storage server; and storing, within a volatile storage of the analysis server, the at least one page, wherein the volatile storage able to provide a processor with faster access than the persistent storage to multiple pages of the network data set stored therein. The method may include: accessing, at the analysis server, the index entry of the target node to additionally retrieve an identifier of at least one of the data set portion and the storage server; and selecting, at the analysis server, the storage server from among the multiple storage servers to transmit the request to based on the identifier of at least one of the data set portion and the storage server. The identifier of the window may also identify at least one of the data set portion and the storage server.

The method may further include determining, at the analysis server, whether the degree of separation specified by the request from the target node is greater than one. The method may further include, in response to a determination that the specified degree of separation from the target node is greater than one, for each neighboring node within the specified degree of separation from the target node, performing operations including: multiplying, at the analysis server, an identifier of the neighboring node with the index multiplier to determine a location of an index entry of the neighboring node within the index data; accessing, at the analysis server, the index entry of the neighboring node within the index data to retrieve an identifier of a window and an indication of a location within the window at which a node entry of the neighboring node within the network data set may be accessed, and to retrieve an indication of the data size of the node entry of the neighboring node; accessing the node entry of the neighboring node within the network data set at the indicated location within the identified window to retrieve an amount of the node entry of the neighboring node up to the indicated data size, wherein the node entry of the neighboring node may include an identifier of another neighboring node of the target node that is within the specified degree of separation from the target node within the network, and a weighting value associated with an edge interposed between the neighboring node and the other neighboring node; and outputting, from the analysis server an indication of the identifier of the other neighboring node.

The method may further include: receiving, at the analysis server, data descriptive of the multiple nodes of the network; and for each node of the multiple nodes, performing operations including adding a node entry of the multiple node entries for the node to the network data set, and adding an index entry of the multiple index entries for the node to the index data at a location that enables the index entry to be accessed by multiplying the identifier of the node with the index multiplier. The method may further include, for each node entry of the multiple node entries that is added to the node data set, performing operations including: determining, at the analysis server, whether adding the node entry at a location within the network data set that is immediately adjacent to another node entry most recently added to the network data set will cause the node entry to straddle a page boundary; and in response to a determination that adding the node entry immediately adjacent to the other node will straddle a page boundary, adding the node entry at a location adjacent to and not straddling the page boundary.

The network data set may include multiple data set portions; each of the multiple data set portions may be stored by a separate one of multiple storage servers; and adding the node entry to the network data set may include adding the node entry to one of the data set portions stored by one of the multiple storage servers. Adding the node entry of the multiple node entries to the one of the data set portions may include: determining, at the analysis server, whether the node entry will fit within the one of the multiple data set portions; and in response to a determination that the node entry will not fit within the one of the multiple data set portions, performing operations including instantiating another of the multiple data set portions within another of the multiple storage servers, and adding the node entry to the other of the multiple data set portions.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIG. 5 illustrates a flow chart showing an example process for adjusting a communications grid or a work project in a communications grid after a failure of a node, according to some embodiments of the present technology.

FIGS. 14A, 14B and 14C, together, illustrate an example of generation of node entries in a network data set.

FIGS. 18A and 18B, together, illustrate an example embodiment of a logic flow of an analysis server generating a network data set.

FIGS. 20A and 20B, together, illustrate an example embodiment of a logic flow of an analysis server retrieving identities of nodes from a network data set.

FIGS. 21A and 21B, together, illustrate an example embodiment of a logic flow of an analysis server conditionally generating another node entry within a network data set.

DETAILED DESCRIPTION

Figure 1:
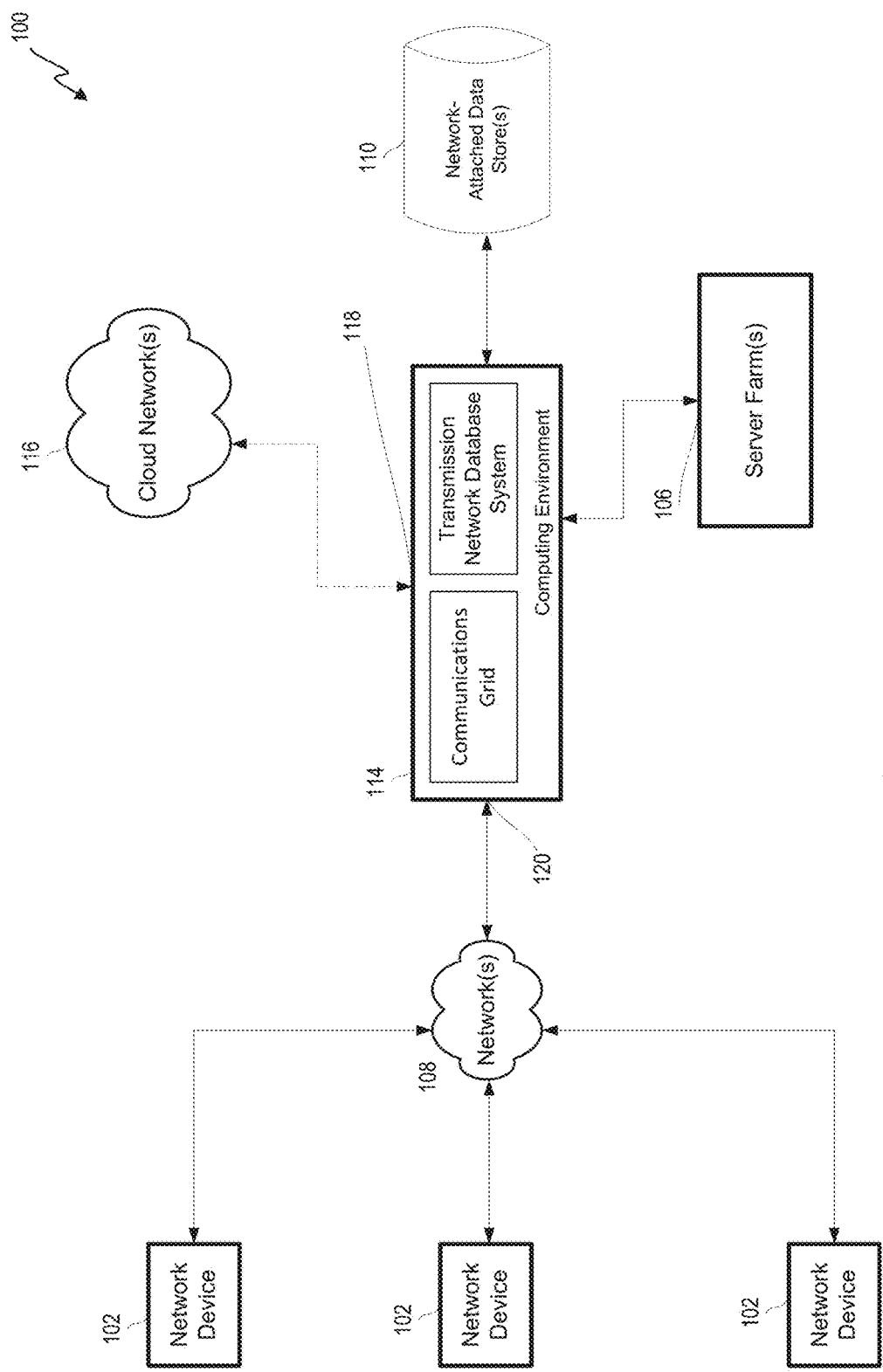
FIG. 1 illustrates a block diagram that provides an illustration of the hardware components of a computing system, according to some embodiments of the present technology.

Various embodiments described herein are generally directed to techniques for generating a network data set that represents objects and their connections in a manner that enables speedy identification and traversal of the connections between the objects. The node data set may be a representation of a network of nodes where the nodes represent the objects, and the edges extending between pairs of the nodes represent connections between corresponding pairs of the objects. A single node entry may be included in the node data set for each node of the network that is connected by at least one edge to another node. Each one of multiple subsets of the node entries of the network data set may be organized within the network data set for assignment to one of multiple windows. The network data set may be stored within persistent storage of an analysis server, and accessing a node entry of the network data set may entail mapping one of the windows into virtual address space of volatile storage of the analysis server to cause loading of the associated subset of node entries into the volatile storage from the persistent storage. Alternatively, the network data set may be distributed among the persistent storages of multiple storage servers that are remotely accessible to the analysis server, and accessing a node entry of the network data set may entail mapping one of the windows into virtual address space of the volatile storage of the analysis server to cause loading of the associated subset of node entries into the volatile storage of the analysis server from the persistent storage of one of the storage servers.

Regardless of where the network data set is stored for persistent storage, indications of which window includes the node entry for a particular node and the location of the node entry within the window may be retrieved from index data that may be maintained within the volatile storage of the analysis server for speedier access. The node identifier of the particular node may be a numerical value that may be multiplied by an index multiplier value to derive the address of the index entry within the index data for the particular node within the index data. Where the network data set is distributed among multiple storage servers, the index entry for the particular node may also include an identifier of the storage server in which the node entry is stored, in addition to an identifier of the window and the location of the node entry within the window.

The network represented by the network data set may be any of a variety of types of network in which the objects represented by the nodes may be inanimate objects or people, and in which the connections represented by the edges may be physical connections, causal linkages or behavioral influences. By way of example, the represented network may be one in which voice, video and/or other forms of data are exchanged using cabling-based and/or wireless technologies. The objects so represented may be telephones, cameras, video screens, microphones, speakers, handheld control devices, smart phones, various varieties of computing devices, sensors, routers, hub devices, etc., that are connected by point-to-point and/or other varieties of wireless, electrically wired and/or optically cabled links. Alternatively, by way of another example, the represented network may be one of inanimate objects that demonstrate causally linked behavior and/or other forms of influence therebetween, such as individual genes of a genetic sequence that may cooperate to bring about a disease condition, individual atmospheric storm events that are part of a larger series of weather patterns, individual neurons or groups of neurons in the brain that influence each other through electrical and/or biochemical signals, etc. As another alternative, the represented network may be of a population of people defined by geography, nationality, range of ages, employment with a particular employer, enrollment in a particular scholastic institution, sharing a particular medical condition, sharing a particular medical treatment, etc., that are connected by particular behaviors, particular shared experiences, particular shared outcomes, etc. As still another example, the represented network may be a social network of people who directly communicate with each other and/or exert influence on each other's behavior in a manner that may not involve intentional communication therebetween.

The network data set may be generated on a recurring basis to keep the contents of the network data set current. By way of example, the network data set may be generated on a nightly basis, at a time when accesses made to the network data set may tend to be at a minimum, to incorporate changes in the represented network that occurred during the preceding 24 hours. Alternatively, depending on such factors as the size and kind of network represented, as well as the frequency with which changes occur to the represented network and/or the frequency with which the network data set is accessed, the generation of the network data set may be caused to occur at more or less frequent intervals of time.

In some embodiments, the network data set may be repeatedly generated from one or more other data structures that includes updated data collected about the represented network during the interval of time since the network data set was last generated. The one or more other data structures may be of any of a variety of types, including and not limited to, linked lists, binary search tree(s), key pairs in table(s), etc. Such other data structure(s) may be structured and/or stored in a manner selected for ease of being updated to reflect changes in the represented network, such as the addition and/or removal of objects represented by the nodes, and/or the addition and/or removal of connections between objects represented by the edges. Such other data structure(s) may be widely distributed among devices that may be physically proximate to the locations of the objects represented by the nodes to be more easily augmented with indications of such changes. In other embodiments, the network data set may be generated each time from a direct analysis of the represented network. This may occur and/or be deemed desirable in situations where the objects of the represented network are able to be communicated with in a relatively speedy manner, such as where the objects are devices capable of electronically exchanging information and the represented network is a network for the exchange of information among those devices (e.g., a network of telephones, computing devices, etc.).

As each generation of the network data set occurs, the network data set may be one of multiple data structures that are created and/or used together in providing a representation of a network. By way of example, in addition to the network data set and/or the index data, various aspects of the network data set may be defined within a configuration data, such as the maximum size and/or quantity of the windows, the value of the index multiplier, and/or various aspects of the processing environment of the analysis server, such as the maximum value able to be represented with an integer. Further, the configuration data may include a set of window entries to specify the manner in which the node entries of the network data set are organized to be made accessible through the set of windows. Each window entry of the configuration data may specify a starting address of one of the windows within the network data, and its size. In embodiments in which the network data set is stored in a distributed manner among multiple storage servers, each window entry may additionally specify an identifier of the portion of the network data set to which a window is mapped and/or an identifier of the storage server that stores that portion of the network data set.

The manner in which network data set is stored and accessed may rely upon each of the nodes of the represented network being assigned a unique, zero-based numerical value as a node identifier. More specifically, the node identifiers assigned to the nodes of the represented network may be a sequentially generated and assigned series of integer values that may start with the value of zero and may be incremented by the value of one for each assignment to ensure that no two nodes are assigned the same value. In other embodiments, however, the numerical values assigned as node identifiers, while still being unique to each node, may not be zero based (e.g., may start at the value of one and be incremented with each assignment, instead of starting at zero).

In some embodiments, the node identifiers may be reassigned with each generation of the node data set to accommodate changes in the represented network that may include the addition and/or removal of objects such that there may be the addition and/or removal of nodes between each generation of the network data set. Such reassignment of node identifiers with each generation of the node data set may be deemed desirable where the represented network undergoes relatively frequent changes in the objects that are included therein. In other embodiments, the node identifiers may have a more persistent quality in which there is an assignment of node identifiers for all nodes present in the represented network at a particular time, and then additional node identifiers may be assigned to new nodes as those new nodes are added over a period of time that encompasses multiple generations of the network data set. During the period of time, as nodes may be removed from the represented network, the node identifiers that had earlier been assigned to those nodes may not be reassigned. Such persistence in the assignment of node identifiers may be deemed desirable where the node identifiers may be used in other ways unrelated to the node data set such that some degree of stability in the assignment of node identifiers for at least the period of time encompassing multiple generations of the network data set is deemed useful.

A single node entry may be generated within the network data set for each node of the represented network that is directly connected by at least one edge to another node. In some embodiments, there may be no node entry in the network data set for any node that is not connected to any other node. Such a node may represent an object that is not currently connected to any other object in a manner that would be represented by an edge. Such nodes may or may not be assigned node identifiers in various embodiments. As part of minimizing the size of the network data set, each node entry may not include the node identifier of the node to which it corresponds. Instead, the each node entry may include only the node identifiers of the nodes to which the node that corresponds to the node entry is directly connected via a single edge. In some embodiments, each node entry may additionally include a weighting value for each such edge that may be descriptive of an edge characteristic, such as a degree of importance of the connection represented by the edge. Also as part of minimizing the size of the network data set, there may not be a predetermined identical amount of space allocated within the network data set for all node entries. Instead, the size of each node entry may be allowed to vary based on the number of connections that each node has directly to another node. Thus, the locations within the network data set at which each node entry starts and ends may not be aligned to quadword, doubleword or word boundaries, and instead, may or may not be aligned to byte boundaries.

A single index entry may be generated within the index data for each of the node entries generated within the network data, and thus, a single index entry may be generated for at least each node that is directly connected by at least one edge to another node. In some embodiments, there may also be an index entry for each node that is not currently connected to any other node, regardless of whether there are any node entries in the network data set for such nodes. Like the network data set, as part of minimizing the size of the index data, each index entry may not include the node identifier of the node to which it corresponds. Instead, each index entry may include an indication of the window identifier assigned to the window through which the corresponding node entry is able to be accessed, an indication of the location of the corresponding node entry, and/or an indication of size of the corresponding node entry. Unlike the node entries of the network data set, each index entry may be allocated an identical amount of space within the index data. This may permit the index data to be defined as one-dimensional or two-dimensional array, a table, or other data structure in which the entries are all of an identical size. Regardless of the specific type of data structure employed, the fact of there being a single identical amount of space assigned to each index entry may be advantageously used to enable the node identifiers to serve, through a simple calculation, as the addresses of the index entries within the index data. More specifically, the node identifier of a particular node may be multiplied by an index multiplier that is based on the size of the index entries to derive the address of the particular index entry in the index data that corresponds to the particular node. As part of enabling such use of multiplication to derive the addresses of the index entries within the index data, and at least where the values used for node identifiers start with the value of zero, the range of addresses used to access the index entries may also begin at zero, with the address of the first byte of the first index entry at address zero, the address of the first byte of each subsequent index entry at an address that is incremented by the value of the index multiplier. Once the index entry corresponding to the particular node is accessed through such multiplication by the index multiplier, the contents of the index entry may be used to locate and access the node entry in the network data set that corresponds to the particular node. The node entries may not be required to be generated within the network data set in an order that follows an ascending, descending or other particular order based on the numerical values of the node identifiers. However, in at least some embodiments in which the node identifiers are not persistent through multiple generations of the network data set such that they may be entirely reassigned to the nodes each time the network data set is generated, the assignment of a node identifier to each node may occur as its corresponding node entry is generated within the network data set. Also, in such embodiments, as the assignment of the node identifier occurs, the corresponding index entry that indicates the location of the corresponding node entry within the network data set may be generated within the index data, and at a location within the index data that is addressable by multiplying the newly assigned node identifier with the index multiplier.

The defining of the windows, including the assignment of particular subsets of node entries within the network data set to be made accessible through particular ones of the windows, may also take place as the node entries are generated within the network data set. Although the node entries may be permitted to start and end on byte or bit boundaries, various factors may lead to the start and end of each window being required to occur on a word, doubleword or quadword boundary, or other boundary defined by a still larger granular data size, such as a processor cache line and/or the size of a page used in support of virtual addressing. Also, in some embodiments, it may also be deemed desirable to avoid situations in which a node entry spans a boundary defined in the storage space of the network data set between two adjacently located windows. Thus, in such embodiments, if a situation should arise where the next node entry to be generated would span across a boundary between two adjacent windows if the next node entry were to be generated to start immediately after the end of the preceding node entry within one of the two windows, then the next node entry may instead be generated to start at the start of the next window to avoid such an instance of spanning. In this way, the need to map one of the windows into the volatile storage of the analysis server followed by similarly mapping the other of the windows into the volatile storage of the analysis server to access the entirety of that next node entry is avoided.

In embodiments in which the network data set is distributed for storage within the persistent storages of multiple storage servers, the start and end locations, in addition to the size, of each windows may be affected by at least the amounts of storage space allocated within the persistent storage of each of the storage servers for the network data set. As will be apparent to those skilled in the art, the amount of storage space in the persistent storage of each storage server may vary. It may also be deemed desirable to avoid having a window defined to start and end at locations within the network data set that are not both within the storage space allocated within the persistent storage of a single one of the storage servers so as to avoid having any window spanning multiple storage servers.

Aspects of the current disclosure provides technical advantages and solutions to technical problems. For example, the use of a single multiplication operation with integer value node identifiers to derive the addresses of corresponding index entries, instead of the more typical use of a table or other data structure to match the node identifiers to index entries may greatly improve the speed with which the index entries are able to be accessed. This, in turn, may greatly improve the speed with which a node entry corresponding to a particular node may be accessed, and thereby greatly improve the speed of access and retrieval of at least the node identifiers of the nodes that are directly connected to the particular node. As a result, the speed with which each step of a traversal of a network from one node to another may be greatly improved. In embodiments in which single-instruction-multiple-data (SIAM) instructions are used, such use of multiplication of node identifiers with a single index multiplier value that is used for all such multiplication operations may allow the addresses for multiple index entries within the index data to be derived using a single identical SIMD multiplication operation applied to multiple node identifiers distributed among multiple lanes of a single processor register. This may allow greater parallelization of multiple traversals of a network.

The lack of inclusion, within each node entry, of the node identifier of the node that corresponds to each entry reduces the amount of storage space occupied by each node entry, and therefore, may greatly reduce the overall size of the network data set. Such a reduction in size may enable the network data set to be stored using fewer storage servers and/or enable a reduction in network traffic to retrieve data set portions as part of retrieving particular node entries. Correspondingly, the size and/or quantity of windows that need to be defined may be reduced.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
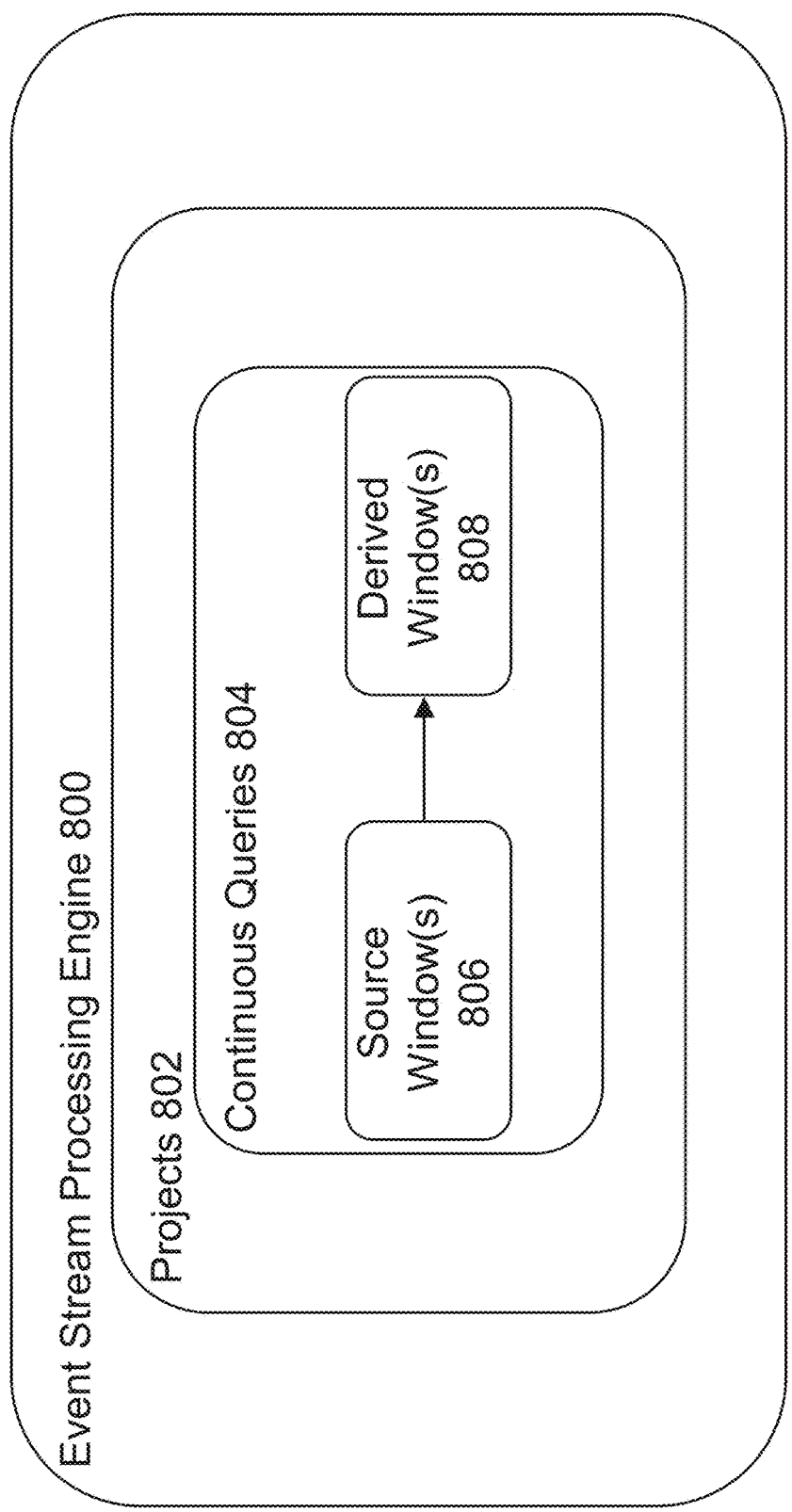
FIG. 8 illustrates a block diagram including components of an Event Stream Processing Engine (ESPE), according to embodiments of the present technology.
Figure 9:
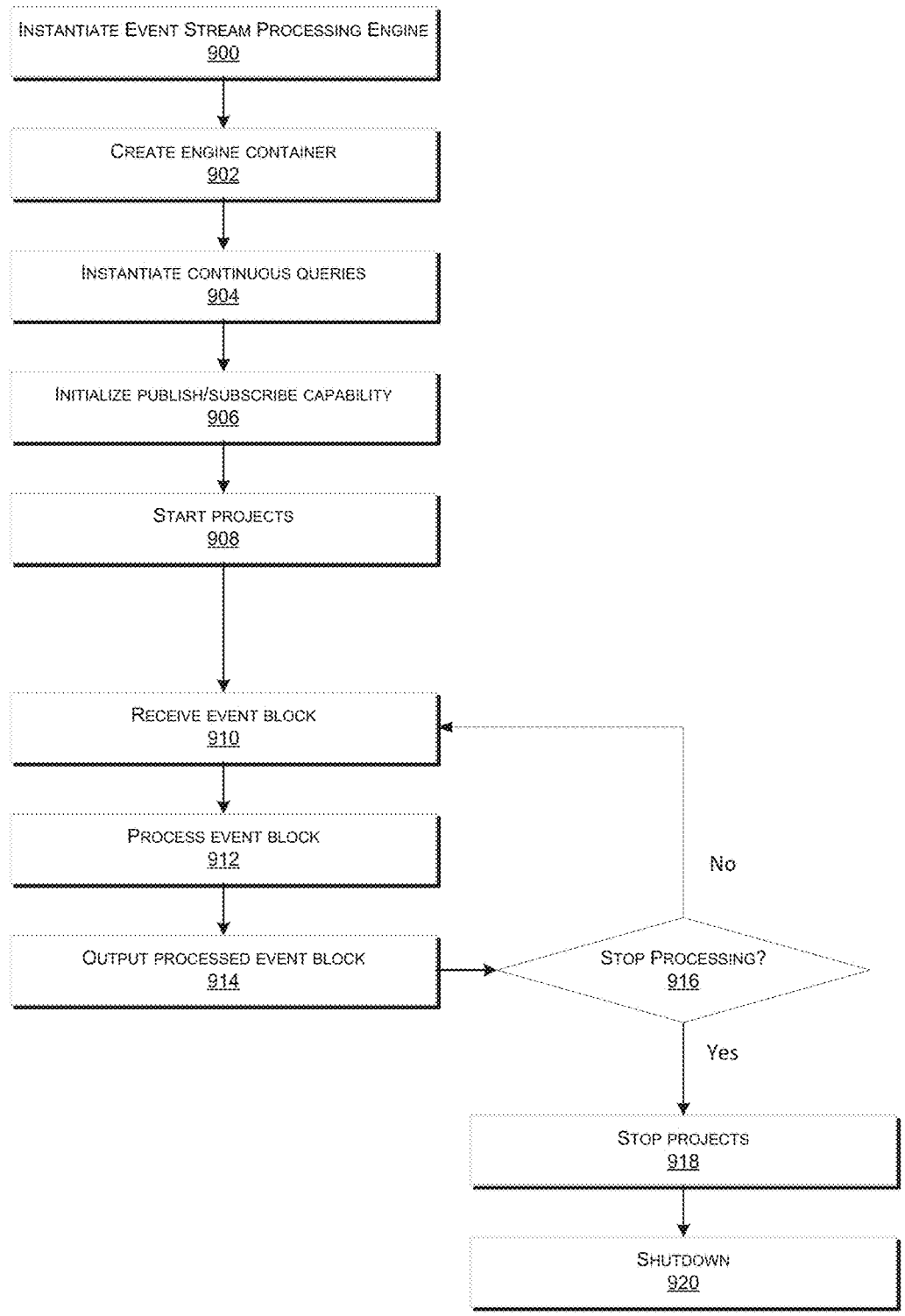
FIG. 9 illustrates a flow chart showing an example process including operations performed by an event stream processing engine, according to some embodiments of the present technology.
Figure 10:
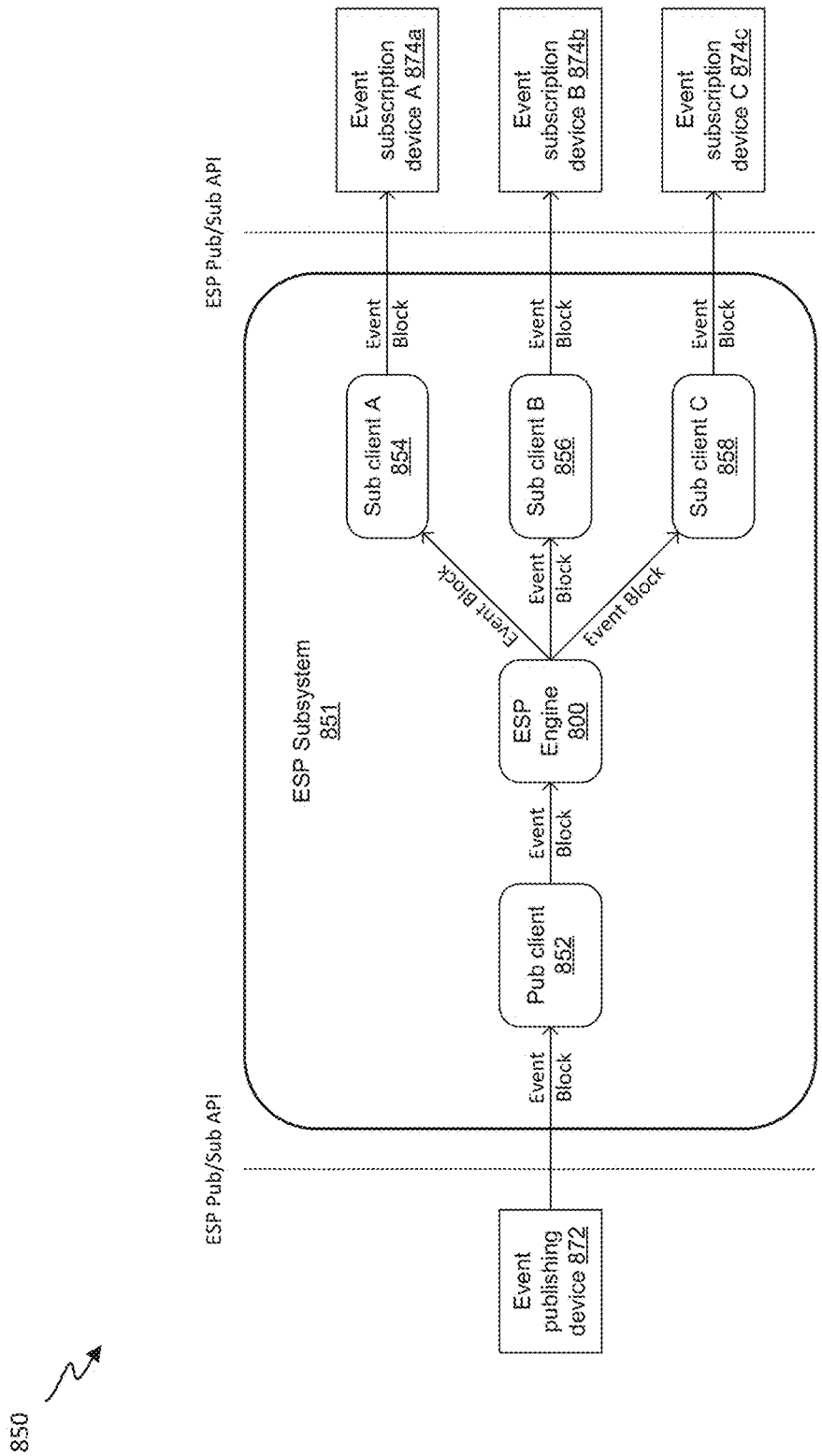
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing, environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
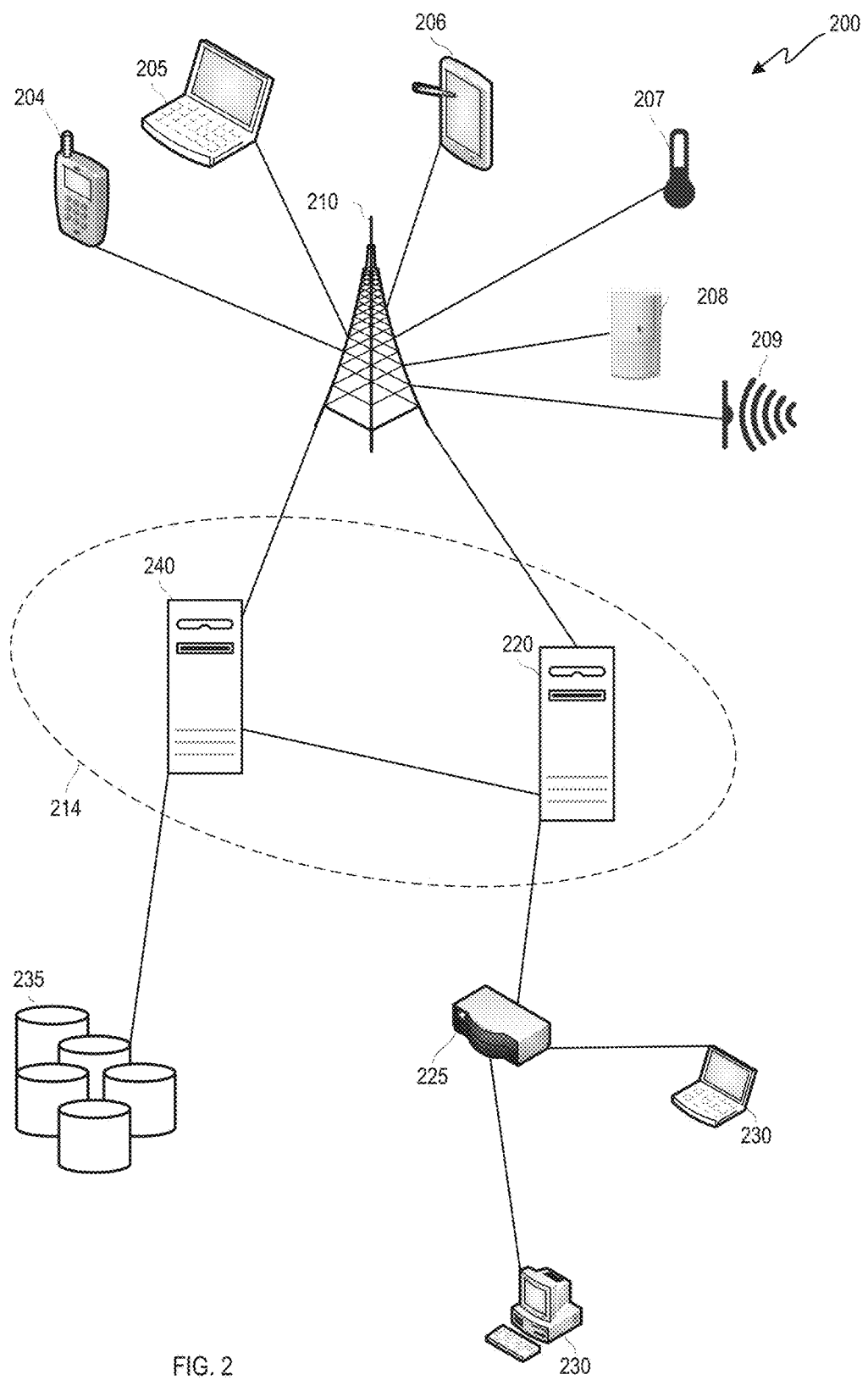
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
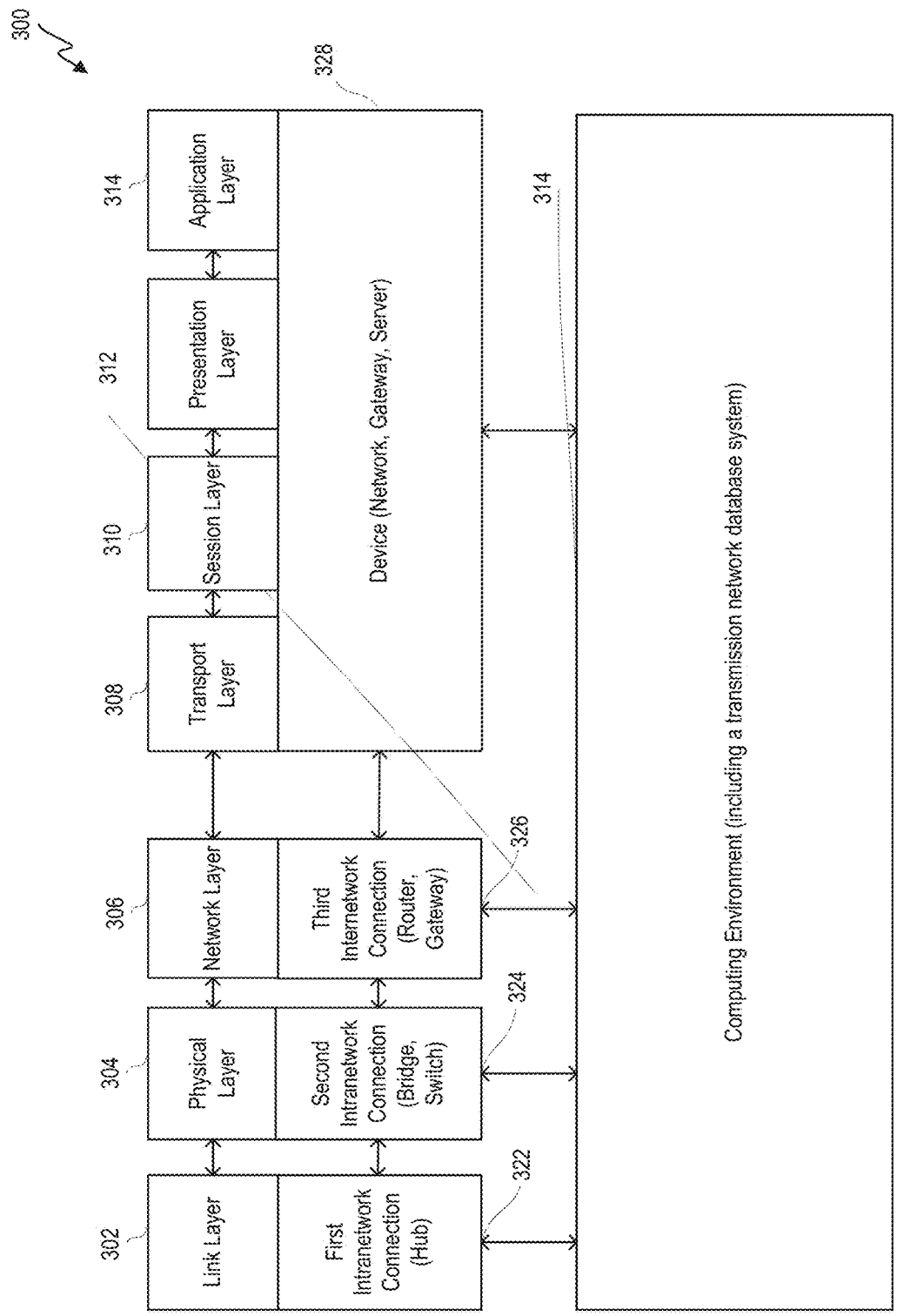
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
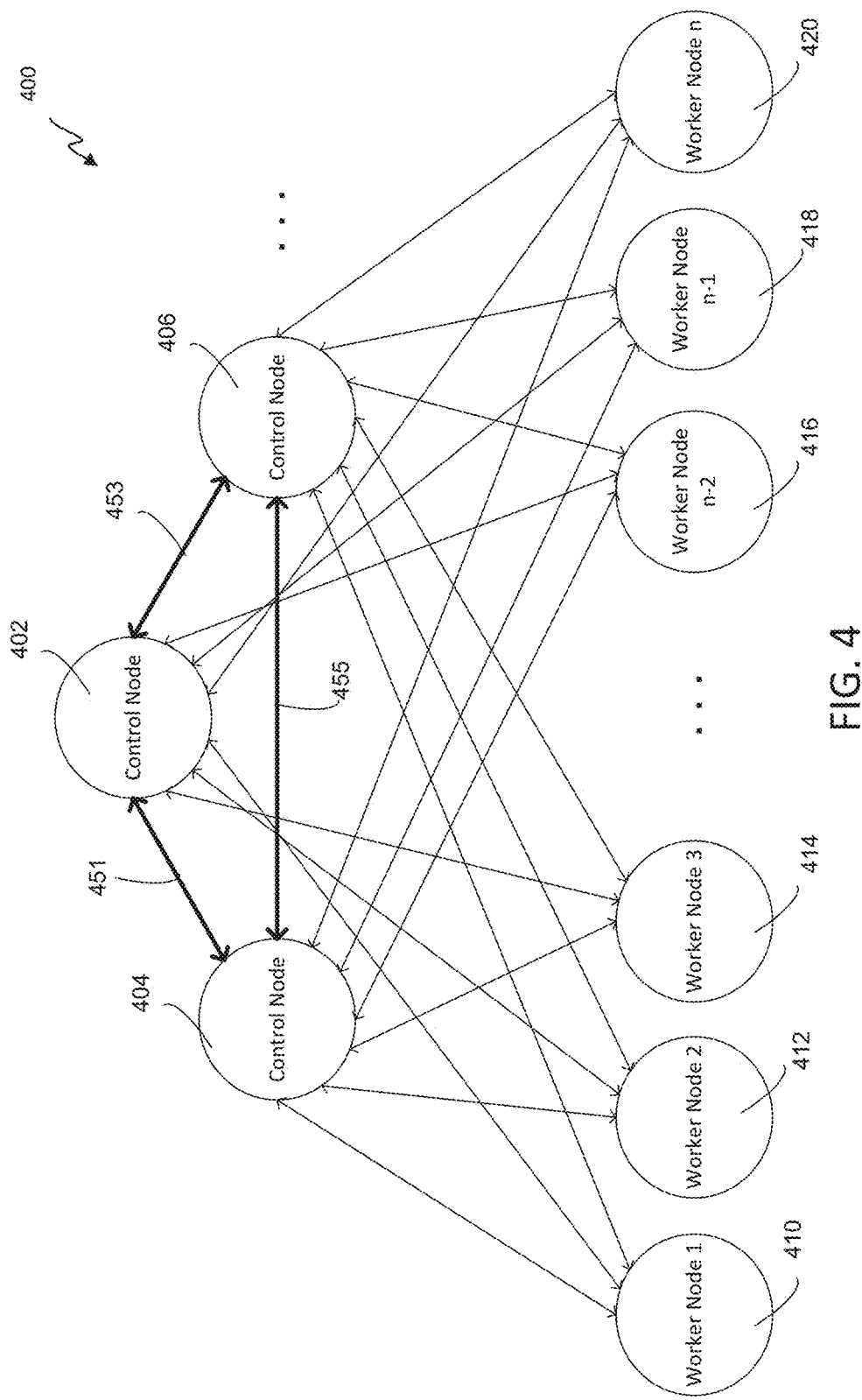
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primal)/control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
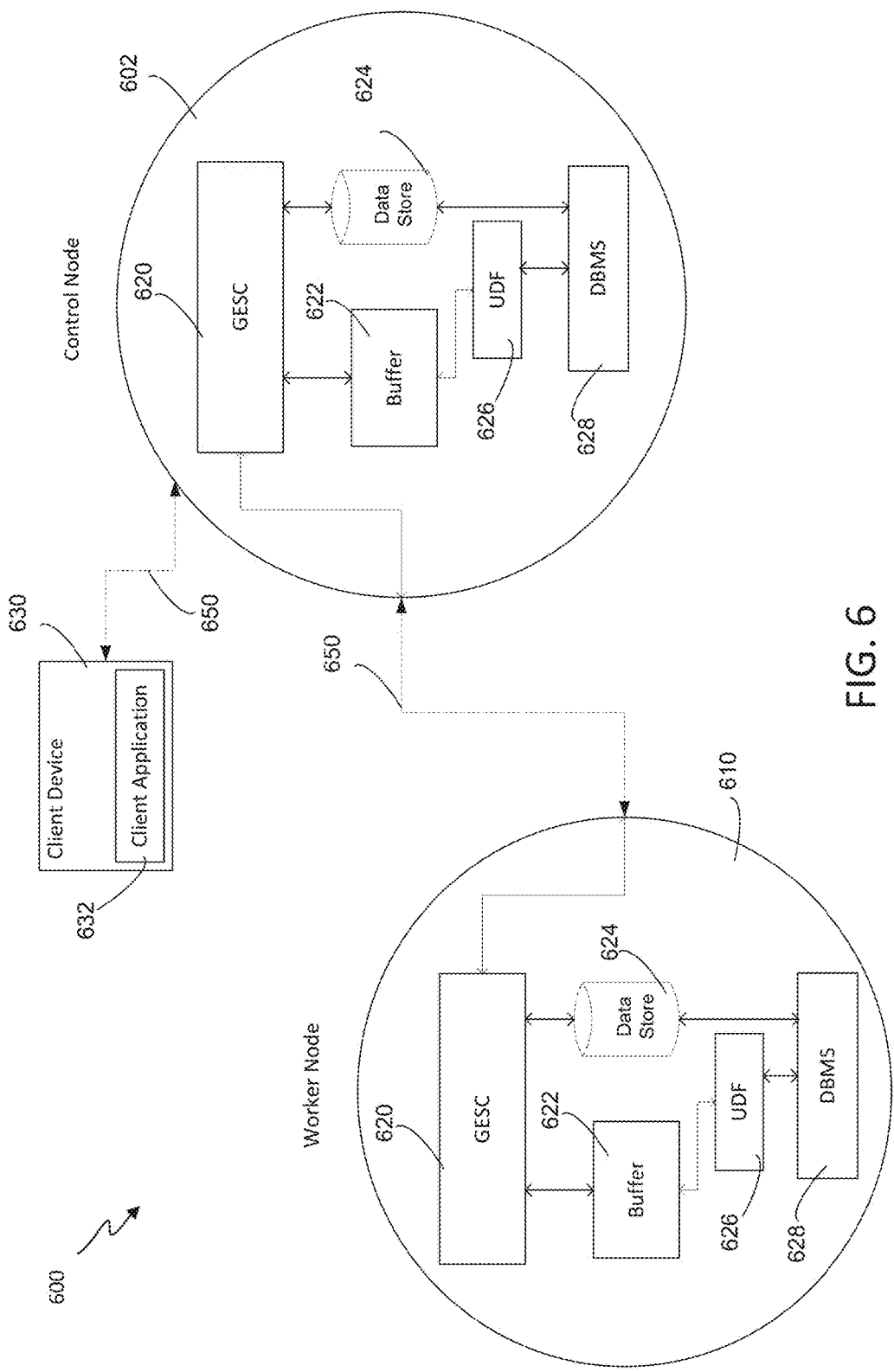
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DA/IBS 628 to transfer data to or receive data from the database stored in the data stores 624 that are managed by the DBMS. For example, UDF 626 can be invoked by the DBMS to provide data to the GESC for processing. The UM' 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1. Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
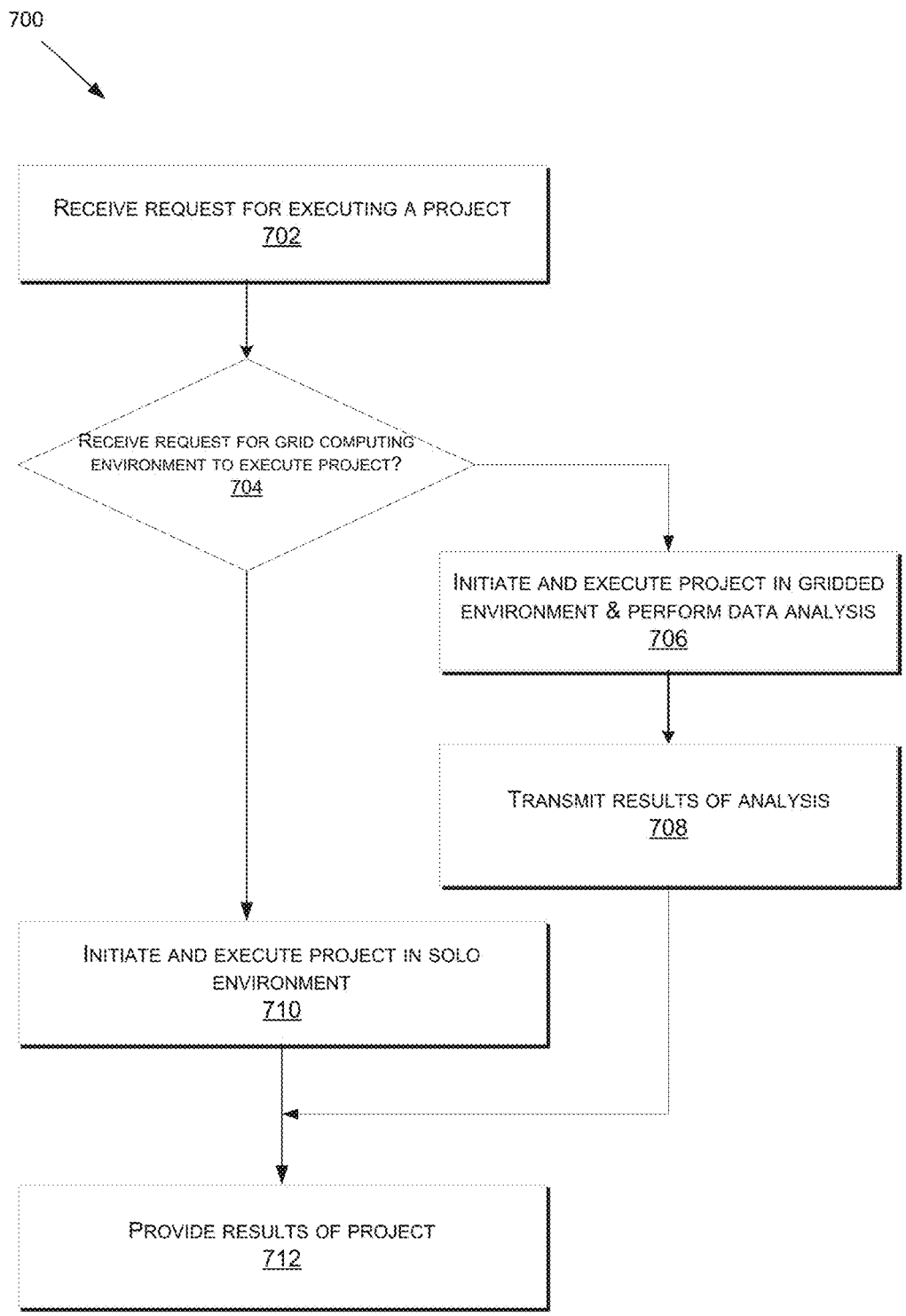
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874*a-c*, according to embodiments of the present technology. ESP system 850 may include ESP device or subsystem 851, event publishing device 872, an event subscribing device A 874*a*, an event subscribing device B 874*b*, and an event subscribing device C 874*c*. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874*a*, event subscribing device B 874*b*, and event subscribing device C 874*c*. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874*a*, event subscribing device B 874*b*, and event subscribing device C 874*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874*a*, event subscribing device B 874*b*, and event subscribing device C 874*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874*a* using the publish/subscribe API. Subscribing client B 856 may be started by an event subscription application B executing at event subscribing device B 874*b* using the publish/subscribe API. Subscribing client C 858 may be started by an event subscription application C executing at event subscribing device C 874*c* using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874*a*, event subscription device B 874*b*, and event subscription device C 874*c*. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874*a-c*. For example, subscribing client A 804, subscribing client B 806, and subscribing client C 808 may send the received event block object to event subscription device A 874*a*, event subscription device B 874*b*, and event subscription device C 874*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time.

For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging, network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11A:
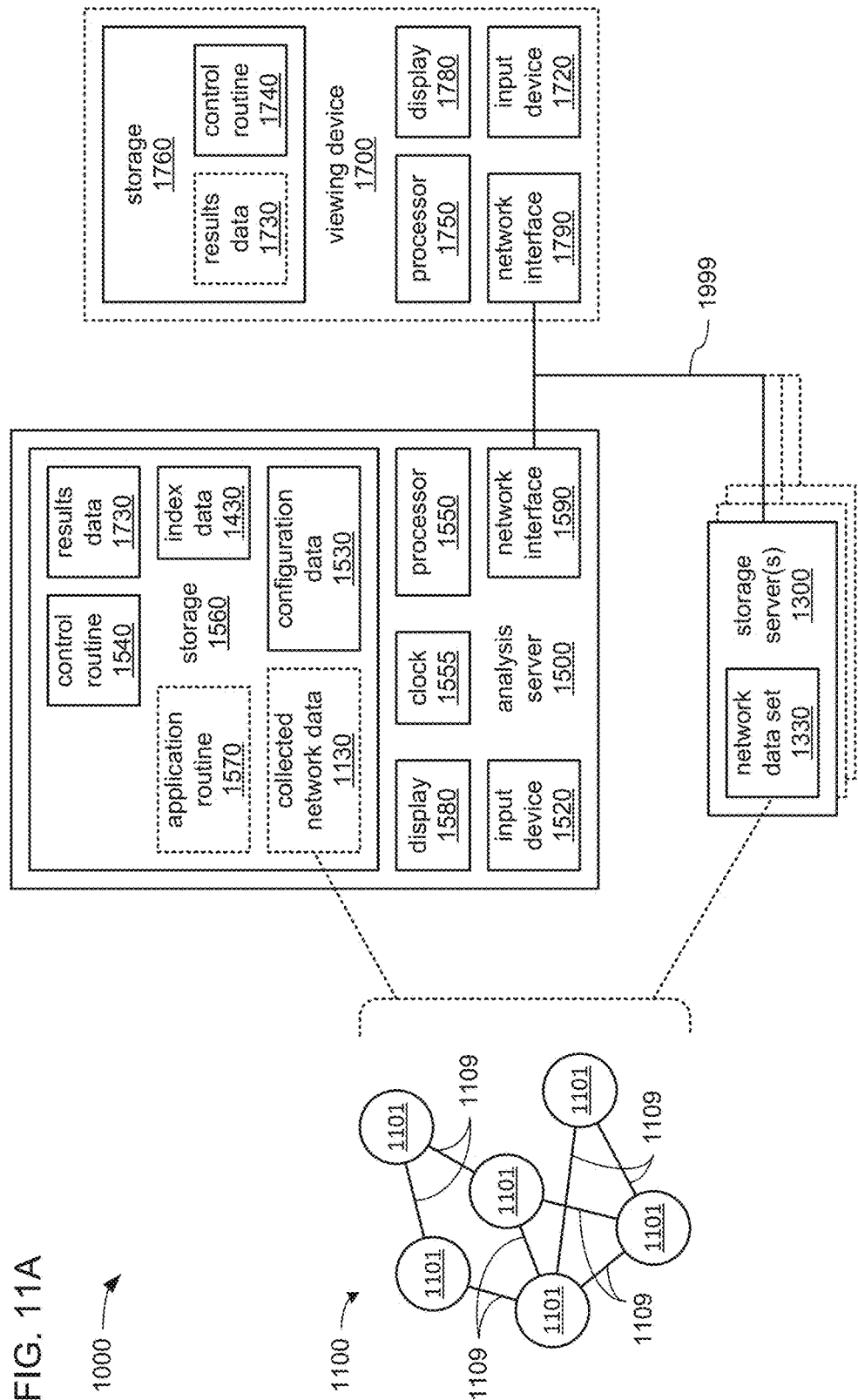
FIGS. 11A and 11B each illustrate an example embodiment of a distributed processing system.
Figure 11B:
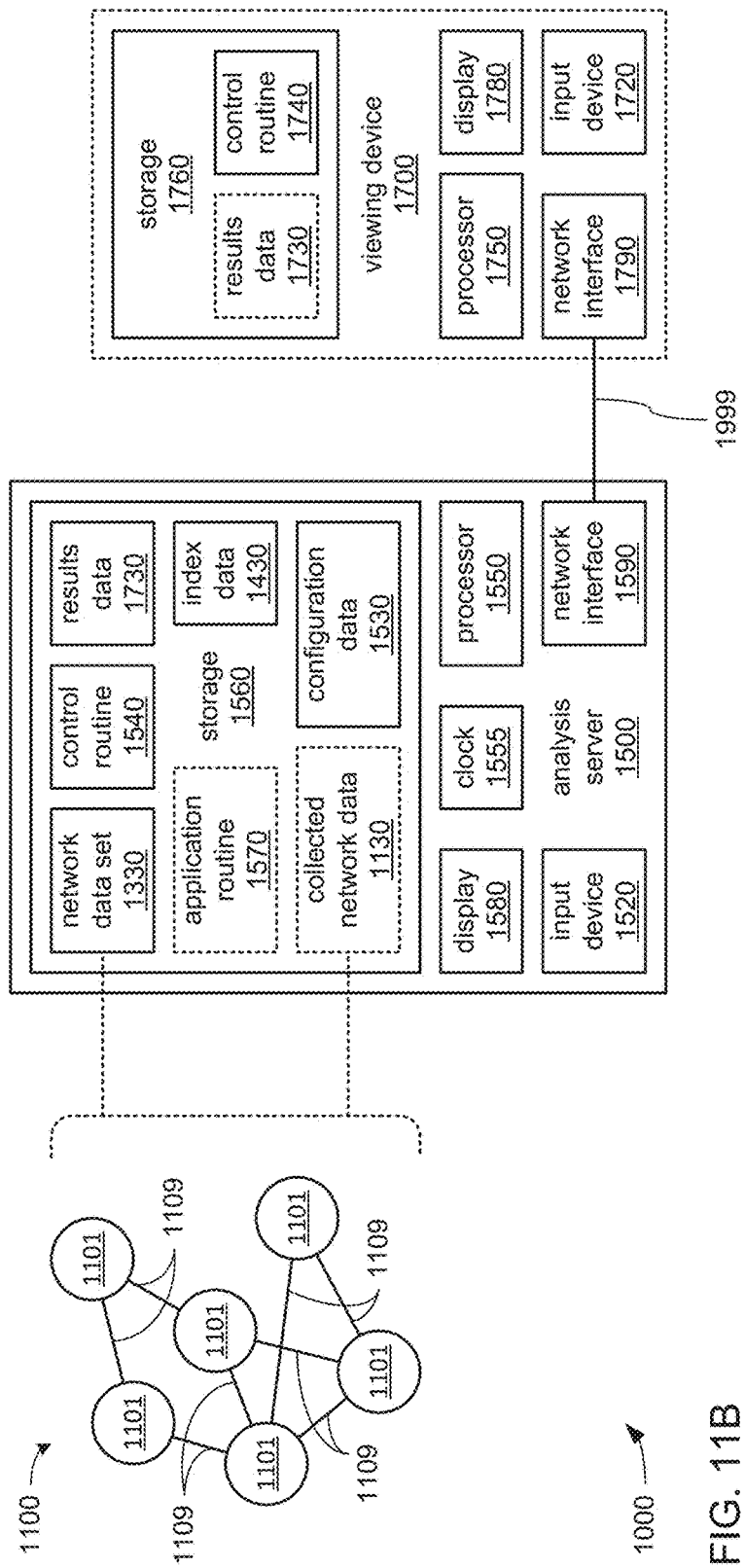

FIG. 11A illustrates a block diagram of an example embodiment of a distributed processing system 1000 incorporating one or more storage servers 1300, an analysis server 1500, and/or a viewing device 1700. FIG. 11B illustrates a block diagram of an alternate example embodiment of the distributed processing system 1000 in which an alternate embodiment of the analysis server 1500 incorporates features of and/or performs functions of the one or more storage servers 1300. In the embodiments of both of FIGS. 11A and 11B, the analysis server 1500 may receive a request for data concerning a particular target node 1101 and one or more of its neighboring nodes 1101 within a network 1100. The request may be received from the viewing device 1700, via an input device 1520 of the analysis server 1500, and/or from an application routine executed within the analysis server 1500. In response to the request, the analysis server 1500 may retrieve, from index data 1430, indications of locations within a network data set 1330 at which the requested data may be located. The analysis server 1500 may use those indications to retrieve the requested data from the network data set 1330, either from the one or more storage servers 1300 as depicted in FIG. 11A, or from within persistent storage of the analysis server 1500 as depicted in FIG. 11B.

Referring to both FIGS. 11A and 11B, as depicted, these devices 1300, 1500 and/or 1700 may exchange communications thereamong related to requests for data concerning target nodes 1101 and their neighboring nodes 1101 of the network 1100 via a communications network 1999. Such communications may include the exchange of node entries retrieved from the network data set 1330, and/or results data 1730 indicative of results of such requests. However, one or more of the devices 1300, 1500 and/or 1700 may also exchange, via the communications network 1999, other data entirely unrelated to any requests for data concerning nodes 1100 of the network 1191. In various embodiments, the communications network 1999 may be a single network that may extend within a single building or other relatively limited area, a combination of connected networks that may extend a considerable distance, and/or may include the Internet. Thus, the communications network 1999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

The network 1100 represented by the network data set 1330 may be any of a variety of types of network in which the objects represented by the nodes 1101 may be any of a variety of types of objects and in which the connections represented by the edges 1109 may any of a variety of types of connections. In various embodiments, the objects that may be represented by the nodes 1101 may include, and are not limited to, manufactured devices, naturally occurring organisms, places, events or people. In various embodiments, the connections between objects represented by the edges 1109 may include, and are not limited to, causal linkages, apparent and/or statistically significant correlations, or behavioral influences. By way of one example, the network 1100 may be one in which voice, video and/or other forms of data are exchanged using cabling-based and/or wireless technologies. Therefore, the objects represented by the nodes 1101 may be telephones, cameras, video screens, microphones, speakers, handheld control devices, smart phones, various varieties of computing devices, sensors, routers, huh devices, etc., that are connected by point-to-point and/or other varieties of wireless, electrically wired and/or optically cabled links represented by the edges 1109. By way of another example, the network 1100 may be one of inanimate objects that demonstrate causally linked behavior, or apparent correlations in behavior that may be determined to be statistically significant so as to rule out random chance, such as and not limited to, individual genes of a genetic sequence that may cooperate to bring about a disease condition, individual atmospheric storm events that are part of a larger series of weather patterns, or individual neurons or groups of neurons in the brain that influence each other through electrical and/or biochemical signals. By way of still another example, the network 1100 may be of a population of people that are each represented by one of the nodes 1101. The population may be defined by geography, nationality, range of ages, employment with a particular employer, enrollment in a particular scholastic institution, sharing a particular medical condition, sharing a particular medical treatment, etc. The connections between people represented by the edges 1109 may include, and are not limited to, particular behaviors (e.g., anomalous psychological behaviors, criminal behaviors, responses to particular situations such as exposure to combat, etc.), particular shared experiences (e.g., presence at a particular location during the release of a toxin, attendance at a large scale public event, etc.), or particular shared outcomes of a medical treatment or the provision of a governmental service. By way of yet another example, the network 1100 may be a social network of people represented by the nodes 1101 who directly communicate with each other or otherwise exert influence on each other's behavior in a manner deemed to bring about a statistically significant result represented by the edges 1109.

In various embodiments, the analysis server 1500 may incorporate one or more of a processor 1550, a clock 1555, a storage 1560, an input device 1520, a display 1580, and a network interface 1590 to couple the analysis server 1500 to the communications network 1999. The storage 1560 may store collected network data 1130, the index data 1430, configuration data 1530, a control routine 1540, an application routine 1570 and/or the results data 1730. The storage 1560 may also store the network data set 1330 in embodiments in which the network data set 1330 is not distributed among the one or more storage servers 1300 for storage (as depicted in FIG. 11B). The control routine 1540 and the application routine 1570 (if present within the storage 1560) may each incorporate a sequence of instructions operative on the processor 1550 to implement logic to perform various functions. The processor 1500 may be caused by its execution of the control routine 1540 to, as just earlier described, receive request and respond to requests for data concerning target nodes 1101 and their neighboring nodes 1101 within the network 1100. The processor 1500 may also be caused by its execution of the control routine 1540 to recurringly prepare for responding to such requests by recurringly regenerating the network data set 1330 and the index data 1430 to reflect the current condition of the network 1100.

In various embodiments, the viewing device 1700 may incorporate one or more of a processor 1750, a storage 1760, an input device 1720, a display 1780, and a network interface 1790 to couple the viewing device 1700 to the communications network 1999. The storage 1760 may store one or more of a control routine 1740 and the results data 1730. The control routine 1740 may incorporate a sequence of instructions operative on the processor 1840 to implement logic to perform various functions. The processor 1750 may be caused by its execution of the control routine 1740 to operate the network interface 1790 to receive the results data 1730 from the coordinating device 1500 via the communications network 1999 indicative of a response to a request for data concerning a target node 1101 and its neighboring nodes 1101. In some embodiments, the processor 1750 may also be caused to generate a visualization based on the results data 1730 to present a depiction of the target node 1101 and its neighboring nodes 1101 and/or data concerning one or more of those nodes 1101.

Alternatively or additionally, the processor 1750 may be caused by its execution of the control routine 1740 to operate the display 1780 and/or the input device 1720 to provide a user interface by which an operator of the viewing device 1700 may provide input thereto that may include entry of the request that begets the results data 1730. In response to receipt of the entered request, the processor 1750 may be caused to operate the network interface 1790 to convey the request to the coordinating device 1500 via the communications network 1999.

Figure 12:
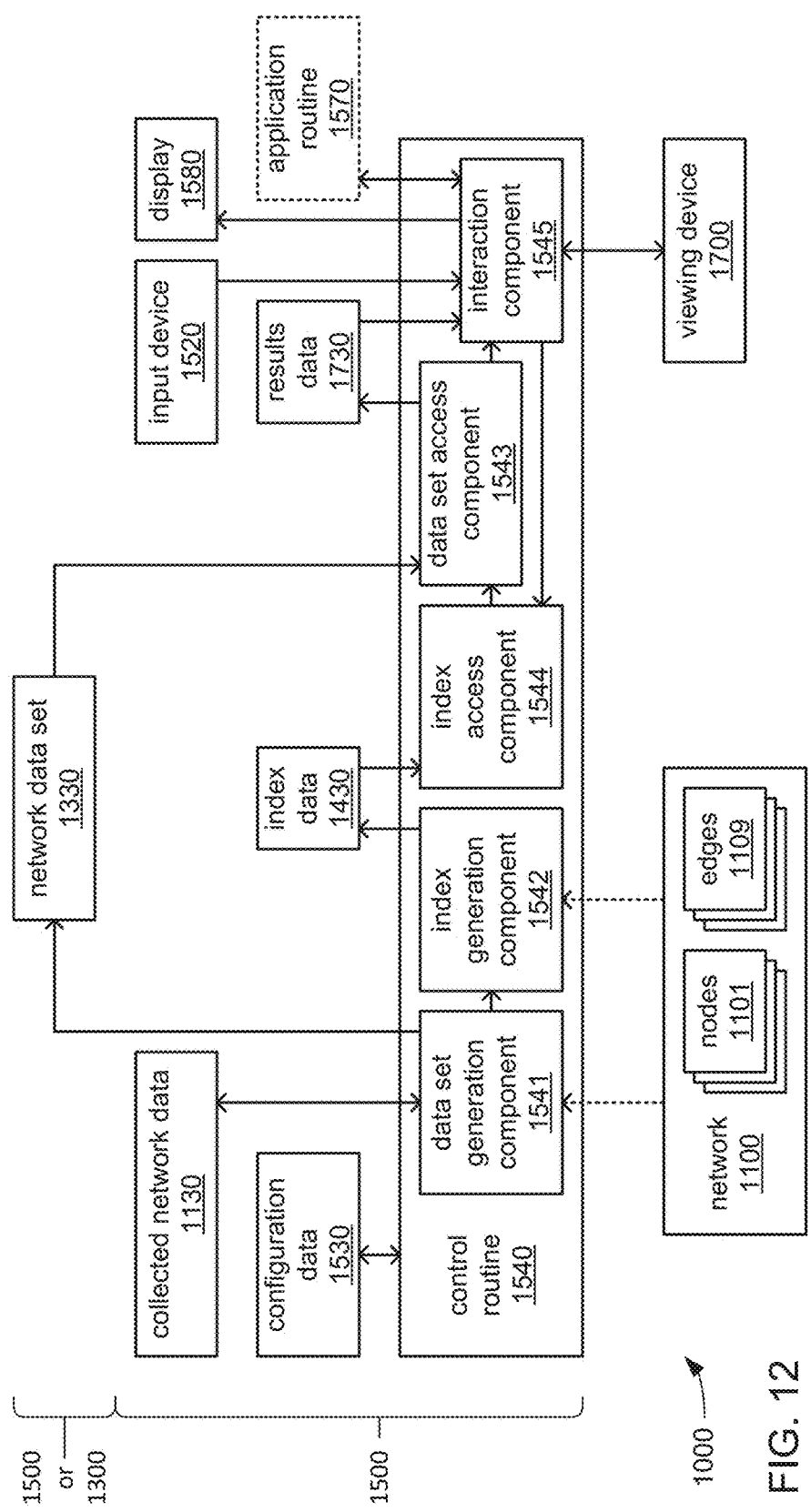
FIG. 12 illustrates an example of preparation and use of a network data set for speedy identification and traversal of connections between objects.

FIG. 12 illustrates an example of generating and retrieving data from the network data set 1330. More specifically, FIG. 12 illustrates aspects of generating the network data set 1330 to provide an efficiently traversable representation of the network 1100, and of generating the index data 1430 to provide an efficiently accessible index to the network data set 1330. FIG. 12 also illustrates aspects of using the index data 1430 and the manner in which data concerning, the nodes 1101 and the edges 1109 are stored within the network data set 1330 to efficient retrieve data concerning a requested target node 1101, one or more of its neighboring nodes 1101, and/or one or more of the edges 1109 thereamong.

As recognizable to those skilled in the art, each of the control routine 1540 and the application routine 1570, including the components of which each may be composed, are selected to be operative on whatever type of processor or processors that are selected to implement the processor 1550 of the analysis server 1500. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for execution by the processors 1550. Where one or more device drivers are included, those device drivers may provide support for any of a variety of other components, whether hardware or software components, of the analysis server 1500.

Figure 13A:
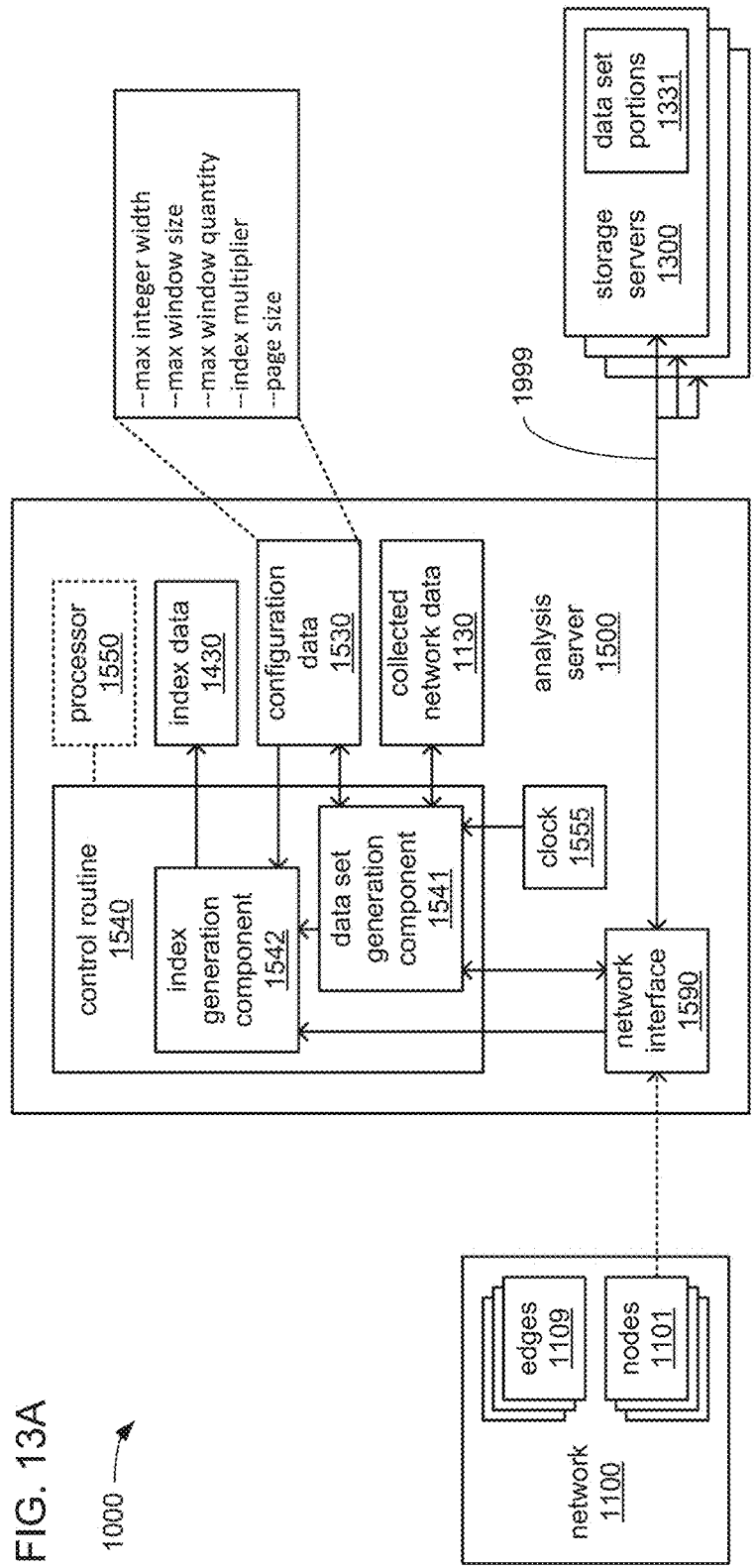
FIGS. 13A and 13B each illustrate an example embodiment of preparation of a network data set.
Figure 13B:
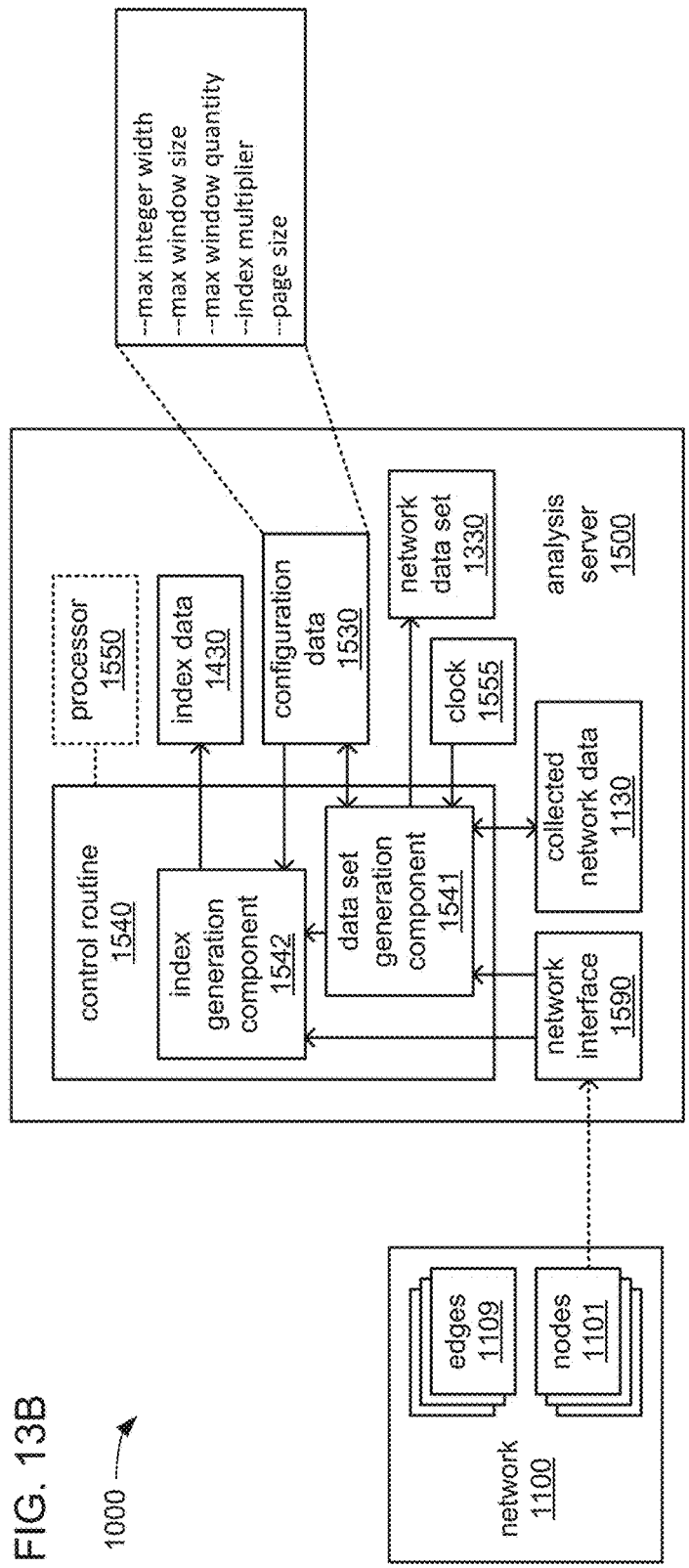

As depicted, the control routine 1540 executed by the processor 1550 of the analysis server 1500 may include a data set generation component 1541 to recurringly generate the network data set 1330 either within the analysis server 1500 or as distributed among the one or more storage servers 1300. As also depicted, the control routine 1540 may include an index generation component execution component 1542 to, in conjunction with the recurring generation of the network data set 1330, recurringly generate the index data 1430 within the analysis server 1500. FIGS. 13A and 13B both depict similar aspects of generating the network data set 1330 and index data 1430 in greater detail, where FIG. 13A correlates with FIG. 11A inasmuch as the network data set 1330 is generated as distributed among the one or more storage servers 1300, while FIG. 13B correlates with FIG. 11B inasmuch as the network data set 1330 is generated as stored within the analysis server 1500.

Turning to both FIGS. 13A and 13B, in executing the control routine 1540, the processor 1550 may be caused, on an ongoing basis, to collect updates concerning the network 1100 and store those updates as part of the collected network data 1130 in preparation for the generation of each new version of the network data set 1330 and accompanying index data 1430. Among such updates may be indications of the addition of objects to be represented by nodes 1101 to the network 1100 and/or removal of objects already represented by nodes 1101 from the network 1100. Alternatively or additionally, among such updates may be indications of changes in the presence and/or characteristics of the connections between objects, such as the addition of new connection to be represented by edges 1109, the removal of connections already represented by edges 1109, and/or changes in characteristics of connections that may prompt changes in weighting values ascribed to edges 1109. In embodiments in which the nodes 1101 of the network 1100 represent devices that are able to be communicated with electronically, the processor 1500 may recurringly operate the network interface 1590 to communicate with one or more of the objects represented by the nodes 1101 to retrieve current information concerning what objects are currently present and what connections are currently in place among the objects for storage as part of the collected network data 1130. Alternatively, in embodiments in which the nodes 1101 do not represent devices that are able to be communicated with electronically, the processor 1500 may receive the collected network data 1130 concerning what objects represented by the nodes 1101 are currently present and what connections are currently in place among the objects from one or more other devices (not shown) that may monitor the objects and/or connections (e.g., sensors), and/or that may enable manual entry of updates concerning the objects and/or connections by personnel who monitor the objects and/or connections.

Also in executing the data set generation component 1541, the processor 1550 may be caused to monitor the clock 1555 for an indication of when a recurring interval of time has elapsed such that the node data set 1330 and the index data 1430 are to be generated, again. Upon the arrival of a time at which such regeneration is to take place, the processor 1550 may be caused to commence generation of new versions of the node data set 1330 and the index data 1430 to replace the versions of each that were last generated. Again, the network data set 1330 and the index data 1430 may be regenerated to update both on a recurring basis, such as and not limited to, weekly on weekends, nightly, during shift changes at a business or other entity where there is rotation of personnel, etc. The frequency with which such regeneration occurs may be selected based on such factors as the size and type of the network 1100, the frequency with which changes occur to the network 1100, and/or the frequency with which the network data set 1330 is accessed.

Turning to FIG. 14A, the processor 1550 may be caused by the data set generation component 1541 to assign each node 1101 of the network 1100 a node identifier that may be a unique zero-based numeric value for each one of the nodes 1101. More specifically, the node identifier assigned to each node may be one of a series of sequentially assigned ascending integer values that may begin with the value of zero and may be incremented by the value of one with each assignment. Thus, the first node identifier assigned to a node may be the integer value zero, the second node identifier assigned to a node may be the integer value one, the third node identifier assigned to a node may be the integer value two, and so on. However, in alternate embodiments, while the assignment of values for node identifiers may still entail generating a unique value for each node identifier, the values generated may not be zero based such that the value of one (or still some other value) may be the first assigned value. In some embodiments, the processor 1550 may assign the node identifiers as the processor 1550 generates each new version of the network data set 1330. Each version of the network data set 1330 may be generated to include a single node entry 1334 for each node 1101 of the network 1100 that is connected by at least one edge 1109 to another node 1101. In some embodiments, the processor 1550 may be caused to refrain from generating any node entry 1334 in the network data set 1330 for any node 1101 that is not connected to any other node 1101, which may represent an object that currently does not have a connection to another object of a type that would be represented by an edge 1109.

To aid in the speedy retrieval of data from the network data set 1330 after its generation, it may be deemed desirable to minimize the overall size of the network data set 1330 by not including such information as the node identifier of the node 1101 that corresponds to each of the node entries 1334. Thus, each node entry 1334 may include only a subentry 1335 for each neighboring node that is connected directly to the node associated with the node entry 1334. In some embodiments, each subentry 1335 may include just the node identifier of such a neighboring node 1101. Alternatively, in other embodiments, each subentry 1335 may also include an edge weighting value that is indicative of a characteristic of the edge 1109 that directly connects the neighboring node 1101 of the subentry 1335 to the node 1101 associated with the entry 1334. The characteristic represented by the weighting value may be any of a variety of measurable characteristics of a connection, such as a degree of importance, a distance, a latency, a cost, etc. Therefore, the depicted example node entry 1334 for the depicted example node 1101a may not include the node identifier for node 1101a. Instead, the node entry for node 1101a may include two node subentries 1335, one for each of the depicted neighboring nodes 1101b and 1101c. One of the two depicted node subentries 1335 may include the node identifier of the neighboring node 1101.b, and may also include an edge weighting value associated with the edge 1109 that directly connects the neighboring node 1101b to the example node 1101a. The other of the two depicted node subentries 1335 may include the node identifier for the other neighboring node 1101c, and may also include an edge weighting value associated with the edge 1109 that directly connects the neighboring node 1101c to the example node 1101a. As still another alternative, in addition to, or in lieu of, the inclusion of one or more weighting values associated with an edge 1109 in each subentry 1335, each subentry 1335 may include one or more values indicative of characteristic(s) of the neighboring node 1101 of the subentry 1335. Regardless of what values and/or how many values associated with a neighboring node 1101 and/or an edge 1109 are included in each subentry 1335, the selection of values included in every subentry 1335 may be identical such that every subentry 1335 occupies an identical amount of space within the network data set 1330.

To avoid filling the network data set 1330 with numerous empty spaces between node entries 1334, and thereby further minimize the overall size of the network data set 1330, there may not be a predetermined identical amount of space allocated within the network data set 1330 for every one of the node entries 1334. Instead, the size of each node entry 1334 may be allowed to vary based on the number of node subentries 1335 included within each node entry 1334, which as described, is based on the number of connections that each node has directly to another node. Thus, the locations within the network data set 1330 at which each node entry 1334 starts and ends may not be aligned to quadword, doubleword or word boundaries, and instead, may or may not be aligned to byte boundaries.

As the node entries are generated, the processor 1550 may also be caused by the data set generation component 1541 to divide the node entries 1334 of the network data set 1330 into subsets that are each assigned to a window 1332. As will be explained in greater detail, after the generation of the network data set 1330, the act of accessing a particular node entry 1334 to retrieve its contents may entail memory mapping the particular window 1332 to which the particular node entry 1334 is assigned into a virtual address space of the analysis server 1500. With the particular window 1332 so mapped, the processor 1550 then retrieves the contents of the particular node entry 1334 by accessing the location within the particular window 1332 at which the node entry 1334 begins.

Turning to FIG. 14B in addition to FIG. 14A, as the processor 1550 is caused by the data set generation component 1541 to generate each node entry 1334, the processor 1550 may also be caused by its execution of the index generation component 1542 to generate a corresponding index entry 1434. Thus, as with the node entries 1334, a single index entry 1434 may be generated for at least each node 1101 that is directly connected by at least one edge 1109 to another node 1101. Therefore, as the processor 1550 is caused to generate the example node entry 1334 depicted in and just discussed in reference to FIG. 14A, the processor 1550 may also be caused to generate a corresponding example index entry 1434 within the index data 1430, as depicted in FIG. 14B. In some embodiments, there may also be an index entry for each node 1101 that is not currently connected to any other node 1101, regardless of whether there are any node entries 1334 in the network data set 1330 for such nodes.

Figure 14C:
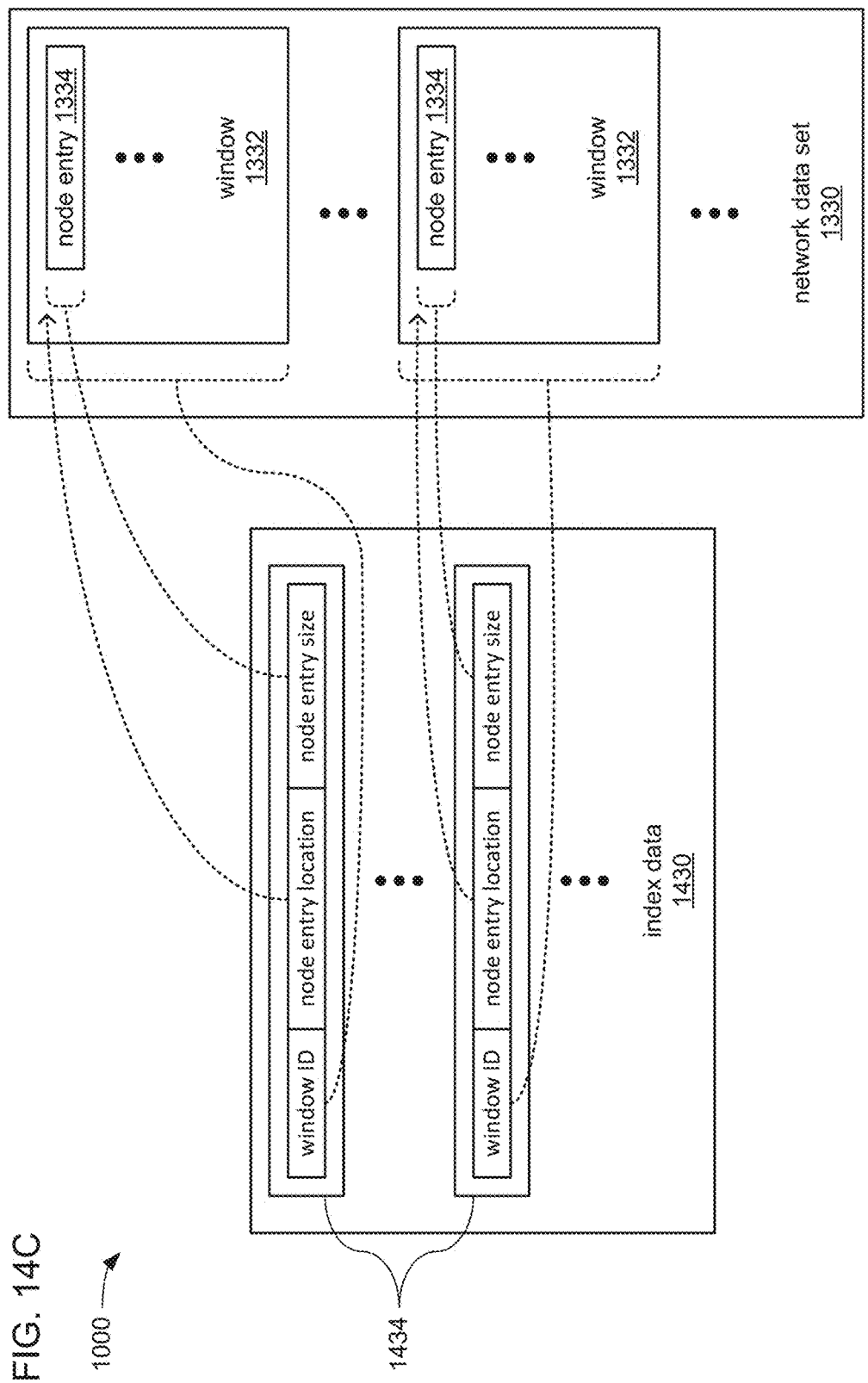

Turning to FIG. 14C, like the network data set 1330, as part of minimizing the size of the index data 1430, each index entry 1434 may not include the node identifier of the node 1101 to which it corresponds. Instead, each index entry 1434 may include an indication of the window identifier of the window through which the corresponding node entry 1334 is able to be accessed, an indication of the location within that window at which the corresponding node entry 1334 begins, and/or an indication of size of the corresponding node entry 1334. Unlike the node entries 1334 of the network data set, each index entry 1434 may be allocated an identical amount of space within the index data 1430. The fact of there being a single identical amount of space assigned within the index data 1430 to each index entry 1434 may enable the node identifiers to serve, through a simple calculation, as the addresses of the index entries 1434 within the index data 1430. More specifically, the range of addresses used to access the index entries 1434 in the index data 1430 may also be zero-based with the first byte of each of the index entries 1434 being located at an address that is a multiple of an index multiplier having a value equal to the quantity of bytes occupied by each index entry 1434 within the node data 1430. Thus, to access an index entry 1434 that corresponds to a particular node 1101, the node identifier of the particular node 1101 may be multiplied by the index multiplier to derive the address at which the index entry 1434 that corresponds to the particular node 1101 begins. Then, the contents of the particular index entry 1434 may be used to identify the particular window 1332 through which the node entry 1334 that corresponds to the particular node 1101 may be accessed, and to locate the particular node entry 1334 within the particular window 1332 to access the contents of the particular node entry after the particular window 1332 has been mapped into the virtual address space of the analysis server 1500.

Returning to FIGS. 13A-B, the processor 1550 may be caused by the data set generation component 1541 to, on at least one occasion, retrieve information concerning various characteristics of the processing and storage resources of the analysis server 1500 and/or the one or more storage servers 1300 (in embodiments that include the one or more storage servers 1300, as depicted in FIG. 13B). The various characteristics may include, and are not limited to, available storage capacity for persistent storage of the node data set 1330 within the analysis server 1500 and/or within each of the one or more storage servers 1300, the maximum byte width for an integer value that may be supported by at least the processor 1550 of the analysis server 1500, and/or the page size for pages swapped between volatile and persistent storage within at least the analysis server 1500. As depicted, such retrieved characteristics may be stored as part of the configuration data 1530 for subsequent use.

As will be familiar to those skilled in the art, the maximum number of bytes that may be used to represent an integer value that is supported by a processor defines the maximum integer value (often referred to as "MAXINT") that is able to be supported by that processor. In some embodiments, the size of the network data set 1330 may become sufficiently large as to be incapable of being directly described as a number of bytes that would not exceed MAXINT. As a result, it may not be possible to describe the location of a node entry 1334 within the network data set 1330 with a value indicating an offset from the start of the network data set 1330 without exceeding MAXINT. The grouping of the node entries 1334 into subsets that are each assigned to be accessed through one of the windows 1332 may alleviate such difficulties by allowing the location of a particular node entry 1334 within the network data set 1330 to be described as a combination of a window identifier of the particular window 1332 through which the particular node entry 1334 may be accessed and a location within the particular window 1332 at which the contents of the node entry 1334 begin. In support of this particular approach, the processor 1550 may be caused by the data set generation component 1541 to access the configuration data 1530 to determine the maximum number of bytes that may be supported by at least the processor 1550 to describe an integer value, and to define each window 1332 to not reach a size that would cause the location of any node entry 1334 therein to become incapable of being described with an integer value. Alternatively or additionally, the processor 1550 may also be caused to access the configuration data 1530 to determine the available storage capacity within the analysis server 1500 and/or within each of the one or more storage servers 1300, and to base the size of each window 1332 at least partially on such storage capacity limits.

As also depicted, the configuration data 1530 may also specify a maximum quantity of windows 1332 that may be defined. Such a quantity may be based on the number of bits allocated for the window identifiers that uniquely identify each window 1332, which may be defined by the number of bits allocated in each index entry 1434 for a window identifier. Alternatively or additionally, the configuration data 1530 may specify the value of the index multiplier by which a node identifier is multiplied to derive the address within the index data 1430 at which the corresponding index entry 1434 begins. Such a value may be based on the number of bytes allocated to each index entry 1434 within the index data 1430.

Also alternatively or additionally, the size of a memory page supported within at least the analysis server 1500 may be specified in the configuration data. As will be familiar to those skilled in the art, processors may support the use of a virtual address space that is larger than the amount of storage space that is actually available within volatile storage as a mechanism to manage the use of the finite amount of storage space in the volatile storage in storing portions of data and/or executable routines. During execution of the those routines, page-sized portions of those routines may be swapped between the volatile storage and a portion of persistent storage based on what addresses a processor accesses as part of accessing routines for execution and/or accessing data for use with those routines. As will be explained in greater detail, the processor 1550 may employ such swapping of page-sized portions between volatile and persistent storage as part of supporting the mapping of one of the windows 1332 into the virtual address space of the analysis server 1500 as part of accessing node entries 1334 of the network data set 1330.

Figure 15A:
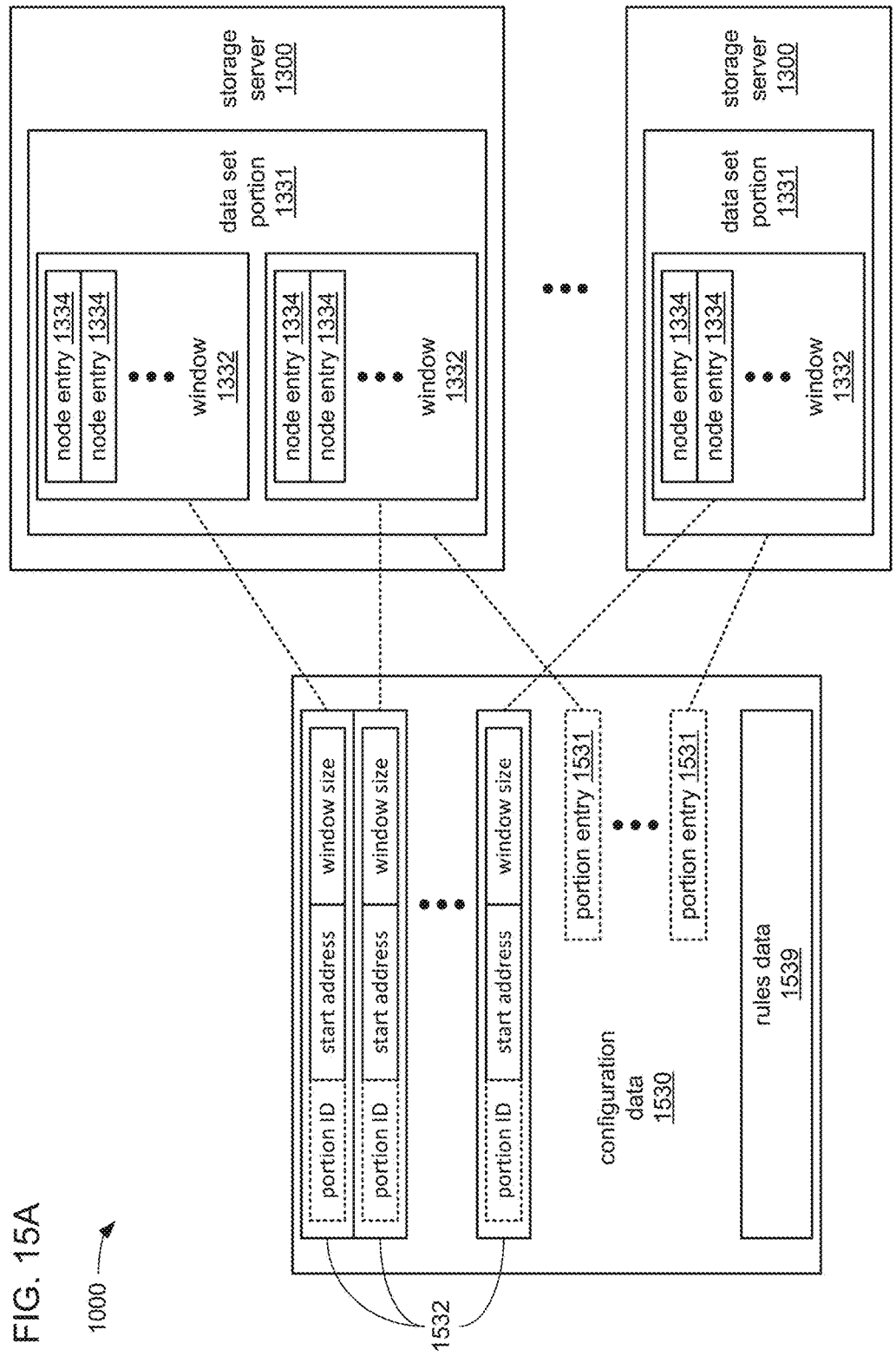
FIGS. 15A and 15B, together, illustrate an example of assignment of node entries in a network data set to a set of windows.
Figure 15B:
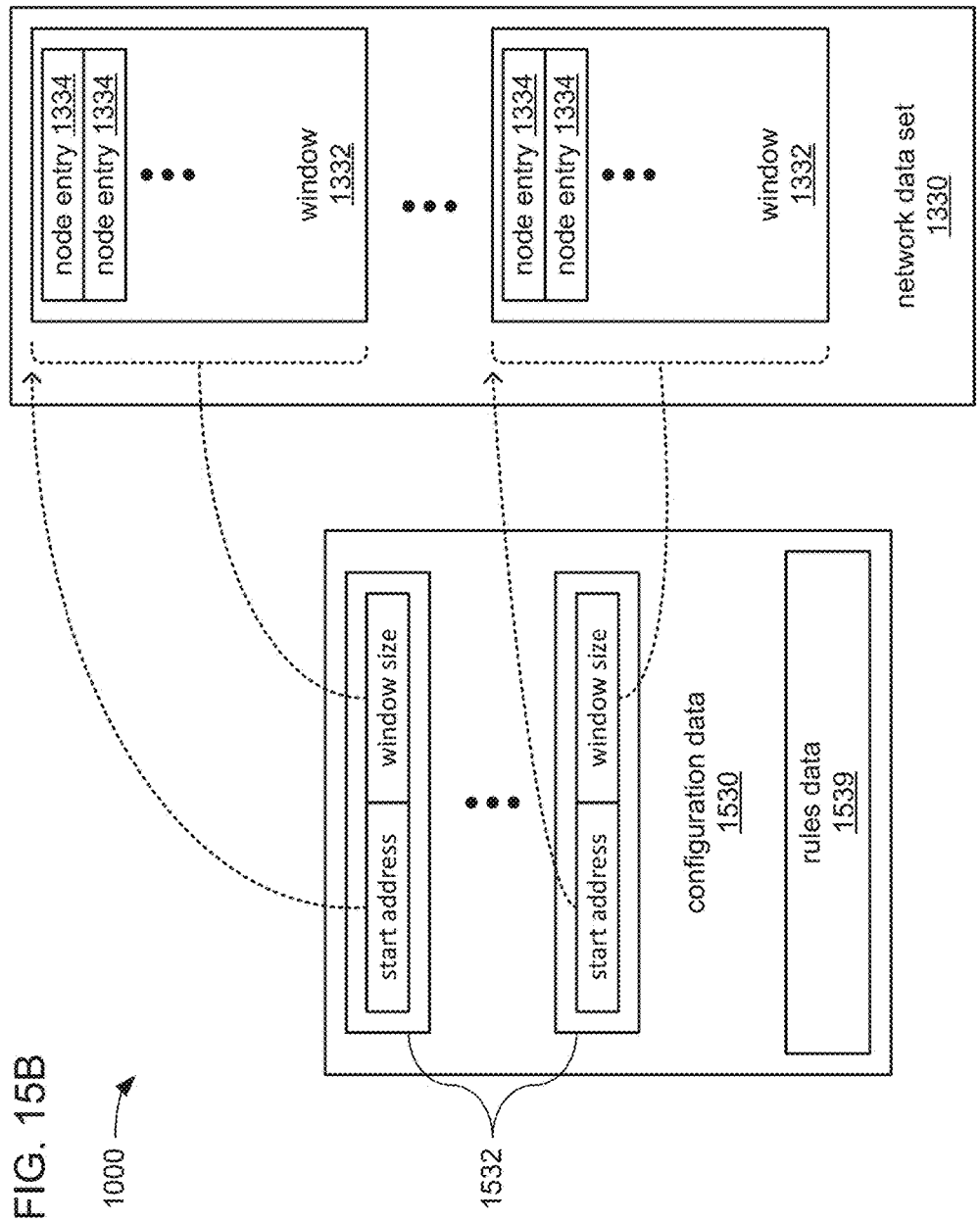

In some embodiments, as the processor 1550 is caused to define each of the windows 1332, the processor 1550 may be caused to store indications of various details of each of the windows 1332 as part of the configuration data 1530. FIGS. 15A and 15B both depict similar aspects of generating and storing details of the windows 1332 in greater detail, where FIG. 15A correlates with FIG. 11A inasmuch as the network data set 1330 is generated as distributed among the one or more storage servers 1300, while FIG. 15B correlates with FIG. 11B inasmuch as the network data set 1330 is generated as stored within the analysis server 1500. In both FIGS. 15A and 15B, the processor 1550 may be caused to store the aforedescribed indications of storage capacity limitations and/or the largest integer value able to represented as part of a set of rules in a rules data 1539 portion of the configuration data 1530 for use in generating the network data set 1330, generating the index data 1430 and/or defining the windows 1332.

In further executing the data set generation component 1541, the processor 1550 may be caused to generate a window entry 1532 for each window 1332 defined to correspond with a subset of the node entries 1334 within the network data set 1330. Where the network data set 1330 is small enough in size to be stored entirely within the analysis server 1500, as depicted in FIG. 15B, each of the window entries 1532 within the configuration data 1530 may include just an indication of a start address within the network data set 1330 at which the corresponding window 1332 starts, and an indication of the size of the corresponding window 1332. As previously discussed, embodiments are possible in which the size of the network data set 1330 exceeds the ability of at least the processor 1550 to describe the size with a single integer value such that multiple windows 1332 may be used to overcome such a limitation and enable the location of a particular node entry 1334 to be specified. In such embodiments, the window entries 1532 may not include an indication of a start address within the network data set 1330 at which each window 1332 begins, as it may not be possible to specify that start address for one or more of the windows 1332. Instead, it may be that each window entry 1532 includes just an indication of the size of its corresponding window 1332, and the indications of size may be used to determine a number of bytes to skip in the network data set 1330 to proceed from window 1332 to another.

Where the network data set 1330 is large enough in size to necessitate being stored as multiple data set portions 1331 distributed manner among multiple ones of the storage servers 1300, as depicted in FIG. 15A, each of the window entries 1532 may additionally include an indication of a portion identifier that identifies either the data set portion 1331 within which the corresponding window is defined or an indication of an identifier of the storage server 1300 in which that data set portion 1331 is stored. A separate set of portion entries 1531 may also be generated within the configuration data 1530 to match windows 1332 to their corresponding data set portions 1331 in embodiments in which there may not be a one-to-one correspondence therebetween. More specifically, and as depicted in FIG. 15A, one or more of the data set portions 1331 may have multiple ones of the windows 1332 defined therein. Alternatively, at least where there is a one-to-one correspondence of the windows 1332 to the data set portions 1331, the window identifiers that are uniquely assigned to each window 1332 may also be treated as the identifiers of the portions of the corresponding ones of the data set portions 1331.

In some embodiments, the window entries 1532 within the configuration data 1530 may be made addressable in a manner similar to the index entries 1434 of the index data 1430, where the window identifiers are also integer values assigned that are assigned to the windows 1332 in an ascending order that starts with the value zero and is incremented by the value of one. In this way, each window identifier may be used to address the corresponding window entry 1532 by multiplying the window identifier with a value based on the size of the storage space allocated to every window entry 1532.

Although the node entries 1334 may be permitted to start and end on byte boundaries, it may be that in some embodiments, various factors lead to the start and end of each window 1332 being required to occur on a word, doubleword or quadword boundary, or on a boundary of still larger granularity that may be defined by the size of a cache line of the processor 1550 and/or the size of a memory page. In such embodiments, it may also be deemed desirable to avoid situations in which a node entry 1334 spans across a boundary defined within the network data set 1330 between two adjacently located windows 1332. Thus, in such embodiments, if a situation should arise, during the generation of the network data set 1330, where the next node entry 1334 to be generated would span a boundary between two adjacent windows 1332 if the next node entry 1334 were to be generated to start immediately after the end of the preceding node entry 1334 within one of the two windows 1332, then the next node entry 1334 may instead be generated to start coincident with the start of the next window 1332 to avoid such an instance of spanning. In this way, the need to map one of the windows 1332 into the virtual address space of the analysis server 1500 followed by similarly mapping the other of the windows 1332 into the virtual address space to access the entirety of that next node entry 1334 is avoided.

Figure 16A:
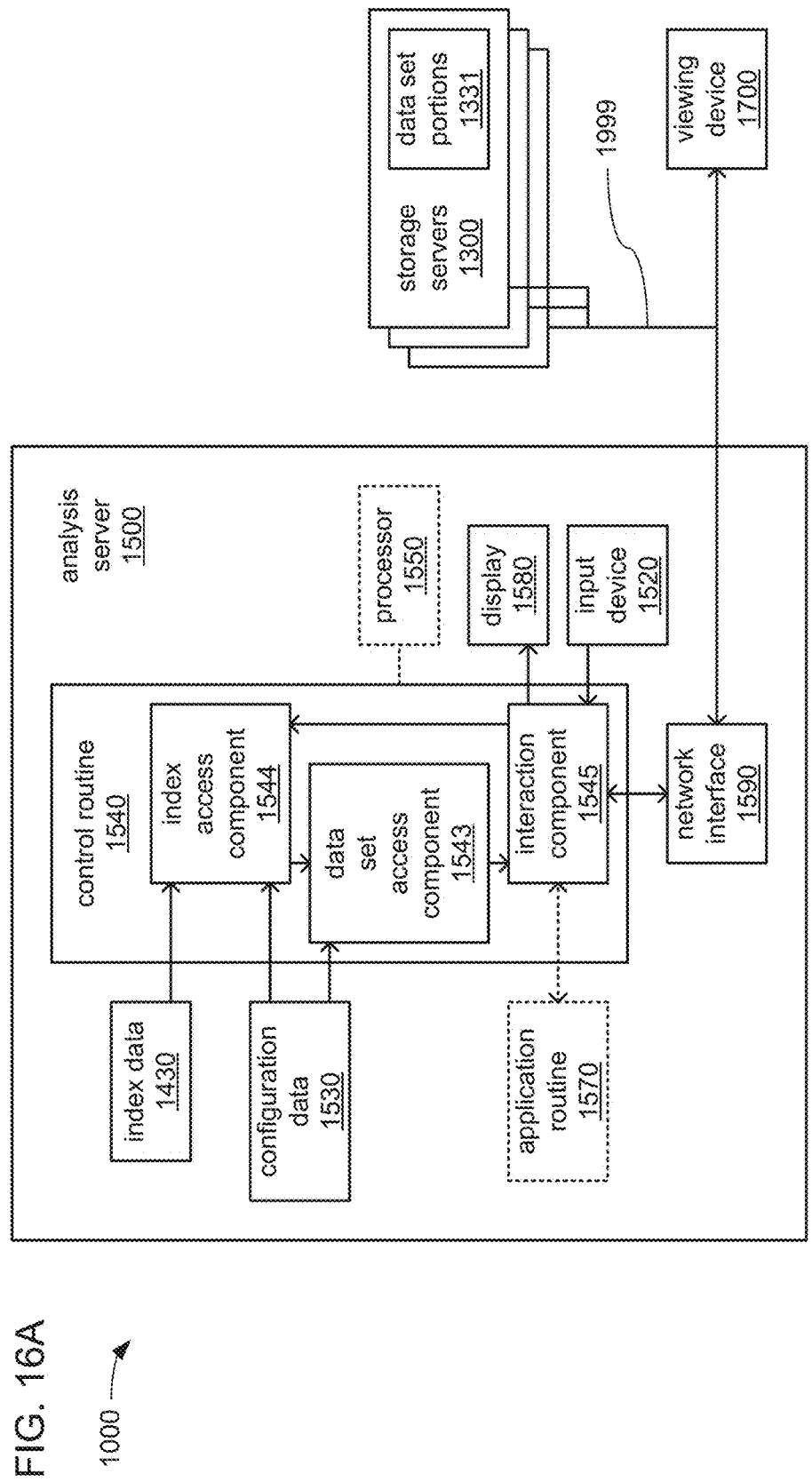
FIGS. 16A and 16B each illustrate an example embodiment of using a data set for speedy identification and traversal of connections between objects.
Figure 16B:
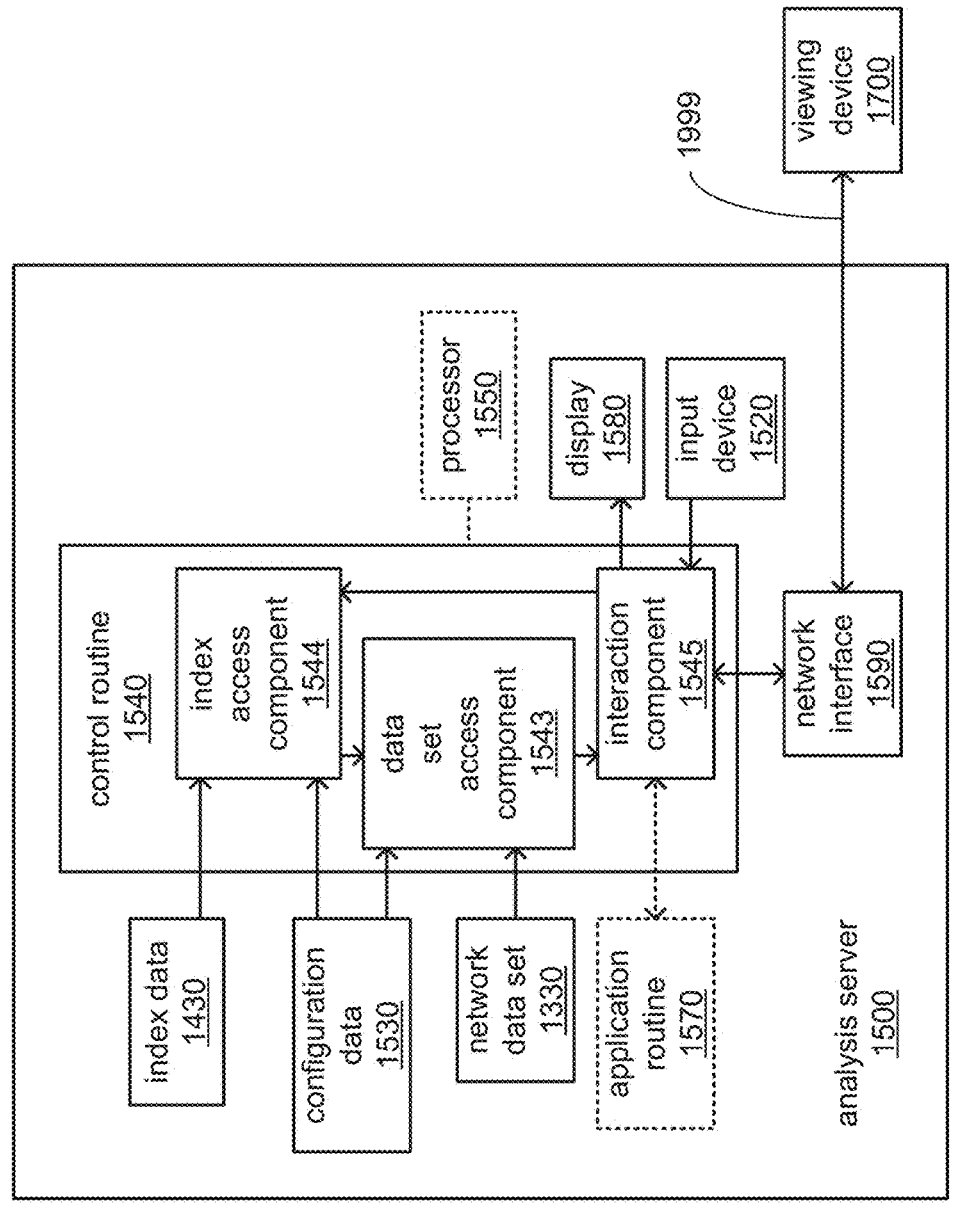

Returning to FIG. 12, as depicted, the control routine 1540 may include an interaction component 1545 to receive a request for information concerning a target node 1101 and/or neighboring nodes 1101 of the target node 1101 of the network 1100. As also depicted, the control routine 1540 may include an index access component 1544 to use the node identifier provided in the request for the target node 1101 to retrieve, from the corresponding index entry 1434 within the index data 1430, the location of the corresponding node entry 1334 within the network data set 1330. As further depicted, the control routine 1550 may include data access component 1543 to use the indication of location of the corresponding node entry 1334 to retrieve information concerning neighboring nodes 1101 of the target node 1101 and/or edges 1109 therebetween from the corresponding node entry 1334. FIGS. 16A-B depict aspects of such retrieval of information concerning one or more nodes 1101 in greater detail.

Turning to both FIGS. 16A and 16B, in executing the interaction component 1545 of the control routine 1540, the processor 1550 may be caused to receive a request for information concerning a target node 1101, one or more neighboring nodes 1101 of the target node 1101, and/or one or more edges 1109 extending therebetween. In some embodiments, the request may specify the one or more neighboring nodes 1101 by specifying a degree of separation from the target node 1101. As will be familiar to those skilled in the art, the degree of separation of one node from another is an indication of the number of edges that separate those two nodes in a network. Thus, where one node is connected directly to another such that there is only a single edge therebetween, those two nodes are within a 1st degree of separation of each other.

In some embodiments, the request may be received via the communications network 1999 from the viewing device 1700 and/or another device (not shown) that may transmit the request to the analysis server 1500. The processor 1550 may be caused by the interaction component 1545 to operate the network interface 1590 to monitor for the receipt of such requests from other devices via the communications network 1999. In other embodiments, the request may be received via the input device 1520 and/or the display 1580. The processor 1550 may be caused by the interaction component 1545 to operate the input device 1520 and/or the display 1580 to provide a user interface (UI) by which an operator of the analysis server 1500 may manually enter such requests. In still other embodiments, the request may be received by the processor 1550 from the application routine 1570 as the processor 1550 executes the application routine 1570. The processor 1550 may be caused by the application routine 1570 to perform any of a variety of analyses that may require, as input, information concerning one or more of the nodes 1101 and/or edges 1109 of the network 1100 represented by the network data set 1330.

In executing the index access component 1544, the processor 1550 may be caused to use the node identifier of the target node 1101 received in the request to access the index entry 1434 within the index data 1430 that corresponds to target node 1101. The processor 1550 may then be caused to retrieve an indication from the index entry 1434 of the location within the network data set 1330 of a corresponding node entry 1334. Then in executing the data set access component 1543, the processor 1550 may use the indication of the location of the corresponding node entry 1334 to access the corresponding node entry 1334 within the network data set 1330 and retrieve at least a subset of the contents thereof as part of responding to the request. In embodiments in which the request is to identify the neighboring nodes 1101 within the 1st degree of separation of the target node 1101 (i.e., identify the neighboring nodes 1101 that are directly connected to the target node 1101), the processor 1550 may retrieve just the node identifiers of the neighboring nodes 1101 of the target node 1101 that are included in the corresponding entry 1334.

Where the request was received via the input device 1520, the processor 1550 may be caused by the interaction component 1545 to present the retrieved node identifiers and/or a graphical representation of the neighboring nodes on the display 1580. Where the request was received from another device (e.g., the viewing device 1700) via the communications network 1999, the processor 1550 may be caused to operate the network interface 1590 to transmit the retrieved node identifiers back to the device from which the request was received. Where the request was received by the processor 1550 from the application routine 1570, the processor may be cause to provide the retrieved node identifiers to the application routine 1570.

However, in embodiments in which the request is to identify the neighboring nodes 1101 within the 2nd degree of separation from the target node 1101 (i.e., identify the neighboring nodes 1101 that are directly connected to the target node 1101, and also the neighboring nodes 1101 that are directly connected to the neighboring nodes 1101 that are directly connected to the target node 1101), the processor 1550 may additionally use each of the retrieved node identifiers of the neighboring nodes 1101 that are within the 1st degree of separation from the target node 1101 (i.e., that are directly connected to the target node 1101) to separately retrieve the node identifiers of the neighboring nodes 1101 that are directly connected to each of the neighboring nodes 1101 within that 1st degree of separation. Again, the processor 1550 may be caused by the index access component 1544 to use each node identifier of a node 1101 within the 1st degree of separation to retrieve from a corresponding index entry 1434 an indication of location within the network data set 1330 of the corresponding node entry 1334. Then, the processor 1550 may be caused by the data set access component 1543 to use each such indication of location to access one of the corresponding node entries 1334 and retrieve the node identifiers of the neighboring nodes 1101 that are directly connected to the corresponding one of the 1st degree neighboring nodes 1101.

Figure 17A:
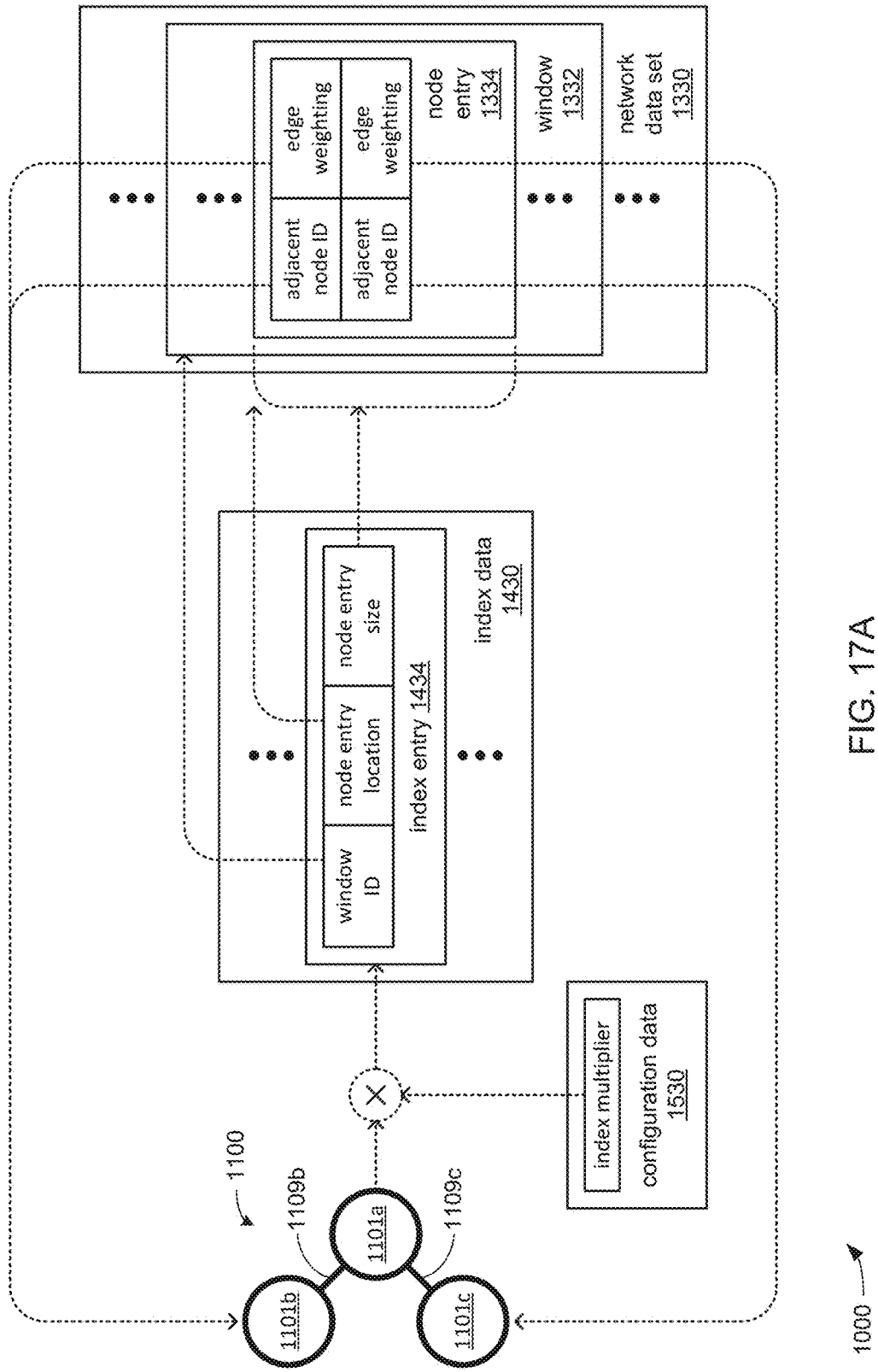
FIGS. 17A, 17B and 17C, together, illustrate an example of accessing a node entry of a network data set.

FIG. 17A depicts a more detailed example of the retrieval of data in response to a request for data concerning a target node 1101a and/or the neighboring nodes 1101b and 1101c that each are within a 1st degree of separation of the target node 1101a (i.e., that are each directly connected to the target node 1101a). Again, the target node 1101a may be identified by its node identifier in the request. The processor 1550 may be caused to multiply the node identifier by the index multiplier (an indication of which may be stored within the configuration data 1530) to derive the address at which the index entry 1434 corresponding to the target node 1101a begins within the index data 1430. Again, as depicted, the corresponding index entry 1434 may include the window identifier of the particular window 1332 through which the corresponding node entry 1334 may be accessed, the location of the corresponding node entry 1334 within the particular window 1332 (e.g., a value specifying an offset from the start of the particular window 1332 to a location within the particular window 1332 at which the corresponding node entry 1334 starts), and/or an indication of the size of the corresponding node entry 1334 (e.g., a value specifying how many bytes there are within corresponding node entry 1334).

The processor 1550 may be caused to use the indication of the window identifier of the particular window 1332 within the corresponding index entry 1434 to select and map the particular window 1332 into the virtual address space of the analysis device 1500 to enable access to the corresponding node entry 1334. This may be done regardless of whether the node entries 1334 that are assigned to be accessible through particular window 1332 are stored as part of a data set portion 1331 of the network data set 1330 within one of the storage servers 1300 (as depicted in FIG. 16A) or are stored within as part of the network data set 1330 within the analysis server 1500 (as depicted in FIG. 16B).

With the particular window 1332 so mapped, the processor 1550 may then be caused to use the indication of the location of the start of the corresponding node entry 1334 within the particular window 1332 to access the first byte of the corresponding node entry 1334. The processor 1550 may then be caused to use the indication of the size of the corresponding node entry 1334 to retrieve the bytes of the corresponding node entry 1334. Again, as depicted, the corresponding node entry 1334 may include the node identifiers of the neighboring nodes 1101*b* and 1101*c* that are within the 1st degree of separation of the target node 1101*a*, and may additionally include weighting values associated with a characteristic of each of the two edges 1109*b* and 1109*c* that directly connect the neighboring nodes 1101*b* and 1101*c*, respectively, to the target node 1101*a*.

Since the node entry 1334 includes the node identifiers of all of the neighboring nodes 1101 that are directly connected to the target node 1101*a* (i.e., the nodes 1101*b* and 1101*c*), the single node entry 1334 for the target node 110*a* is able to provide the node identifiers for all of the nodes 1101 within the 1st degree of separation from the target node 1101*a*. Thus, if the request was limited to the identities of all nodes 1101 within the 1st degree of separation from the target node 1101*a*, then the data within this single node entry 1334 corresponding to the target node 1101*a* provides all the data that is needed to satisfy the request, and without the need to access any of the node entries 1334 that correspond to any of the neighboring nodes 1101 that are within the 1st degree of separation of the target node 1101*a* (i.e., the nodes 1101*b* and 1101*c*). However, if the request is for data concerning all nodes 1101 within the 1st degree of the target node 1101*a*, and such data is to include data concerning connections that may exist among the nodes 1101 within 1st degree of the target node 1101*a* other than connections to the target node 1101*a*, then the node entries 1334 for each of the nodes 1101 within the 1st degree of separation of the target node 1101*a* (i.e., the nodes 1101*b* and 1101*c*) would also need to be accessed to obtain the weighting values for each of those connections.

As discussed earlier, and again just above in reference to FIG. 17A, as part of retrieving data from a particular node entry 1334 of the network data set 1330, the processor 1500 may be caused to map the window 1332 through which the particular node entry 1334 is made accessible into the virtual address space of the analysis device 1500. In some embodiments, such mapping of one of the windows 1332 may entail a mapping into the virtual address space supported by the processor 1550 of the analysis server 1500. As will be familiar to those skilled in the art, a virtual address space is a range of addresses for storage locations that is usually far larger than the actual amount of storage space that is physically provided by volatile storage that is physically accessible to a processor. As a result, only a portion of the range of addresses of a virtual address space is actually associated with real storage locations of volatile storage. The existence of volatile storage throughout the rest of the virtual address space is usually simulated using persistent storage. A page management system is often implemented to swap page-sized portions of executable routines and/or data between the volatile storage and the persistent storage. The page-sized portions often retain their associations to specific page-sized portions of the virtual address space such that as each is swapped between the volatile and persistent storages, the page-sized portions of the virtual address space to which page-sized portions of the volatile storage are mapped are caused to change.

As a result, the mapping of a selected window 1332 into the volatile storage of the analysis server 1500 as part of retrieving the contents of a particular node entry 1334 within the selected window 1332 may entail the loading of at least some of the node entries 1334 that are assigned to be accessible through the selected window 1332 into volatile storage. Depending on the size of the selected window 1332 versus the amount of storage space available within the volatile storage of the analysis server 1500, it may not be possible to load the entirety of the selected window 1332 into the volatile storage such that some degree of swapping of page-sized portions of the selected window 1332 may occur.

Figure 17B:
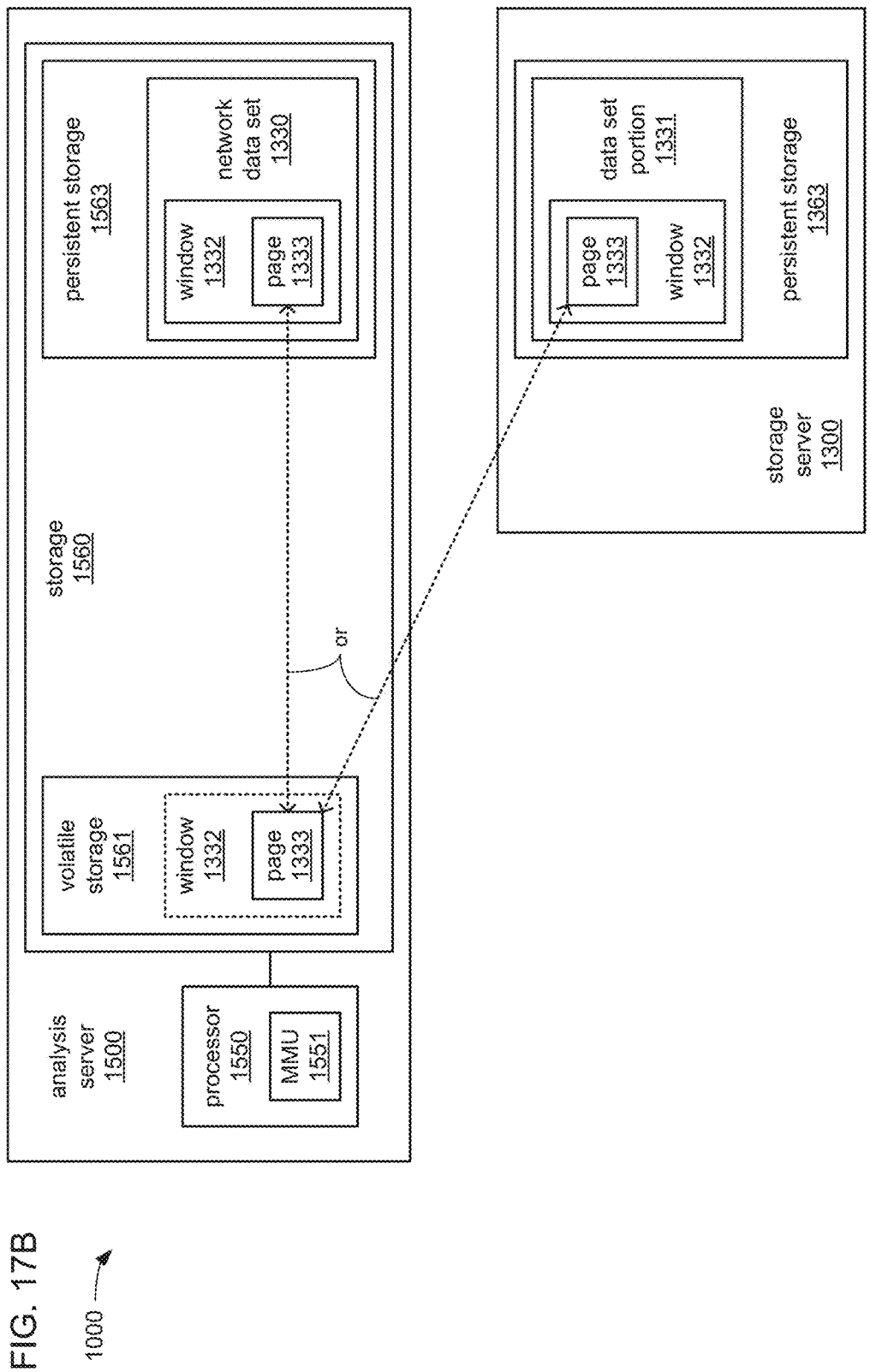

FIG. 17B depicts the mapping of a selected window 1332 into the virtual address space of the storage 1560 of the analysis server 1500 in greater detail. As depicted, the storage 1560 of the analysis server 1500 may be divided into a volatile storage 1561 and a persistent storage 1563, and the depicted example storage server 1300 may include at least a persistent storage 1363. As will be familiar to those skilled in the art, the volatile storage 1561 may be implemented with any of a variety of storage technologies that enable relatively speedy access to data and/or routines stored therein, but which are unable to retain data and/or routines stored therein without a continuous supply of electrical power. Such technologies include, and are not limited to, any of a variety of types of random access memory (RAM). In contrast, the persistent storages 1563 and 1363 may each be implemented with any of a variety of storage technologies that are able to retain data and/or routines stored therein regardless of whether electric power continues to be provided, but which are unable to provide access to data and/or routines that is as speedy as that provided by the volatile storage technologies on which the volatile storage 1561 may be based. Such technologies include, and are not limited to, any of a variety of technologies that employ ferromagnetic and/or optical storage media.

Due to such differences in their respective technologies, each of the persistent storages 1563 and 1363 may have considerably greater storage capacity than the volatile storage 1561. Thus, where virtual addressing is employed within the analysis server 1500, pages of data and/or routines stored within the persistent storage 1563 may be swapped into and out of each of the volatile storage 1561 as a mechanism to enable the processor 1550 to make use of the speedier access of the volatile storage 1561 for data and/or routines that are currently being accessed by the processor 1550, while overcoming the more limited storage capacity of the volatile storage 1561 by using the persistent storage 1563 to simulate the presence of more volatile storage than actually exists.

As will also be familiar to those skilled in the art, the use of a virtual address space and page swapping as a mechanism to manage the use of a limited amount of volatile storage while still accommodating relatively large executable routines and/or pieces of data has become sufficiently prevalent that processors often incorporate specialized components to increase the speed and efficiency of the swapping of page-sized portions between volatile and persistent storages. By way of example, the processor 1550 may incorporate a memory management unit (MMU) 1551 that may provide hardware-based support for translating between physical and virtual addresses, interrupt-driven triggering for swapping pages, and hardware-based support for the monitoring of status of each individual page. Thus, by mapping a selected window 1332 into the virtual address space of the analysis server 1560, use is being made of one of the more efficient mechanisms that may be provided by the processor 1550 for retrieving node entries 1334 that are within the selected window 1332 into the volatile storage 1561 from one of the persistent storages 1563 or 1363 for faster access. As the one or more node entries 1334 within the selected window 1332 are accessed to retrieve their contents as part of responding to various requests, pages 1333 that include page-sized portions of the selected window 1332 may be swapped between the volatile storage 1561 and either the persistent storage 1563 of the analysis device 1500 or the persistent storage 1363 of one of the storage servers 1300.

Figure 17C:
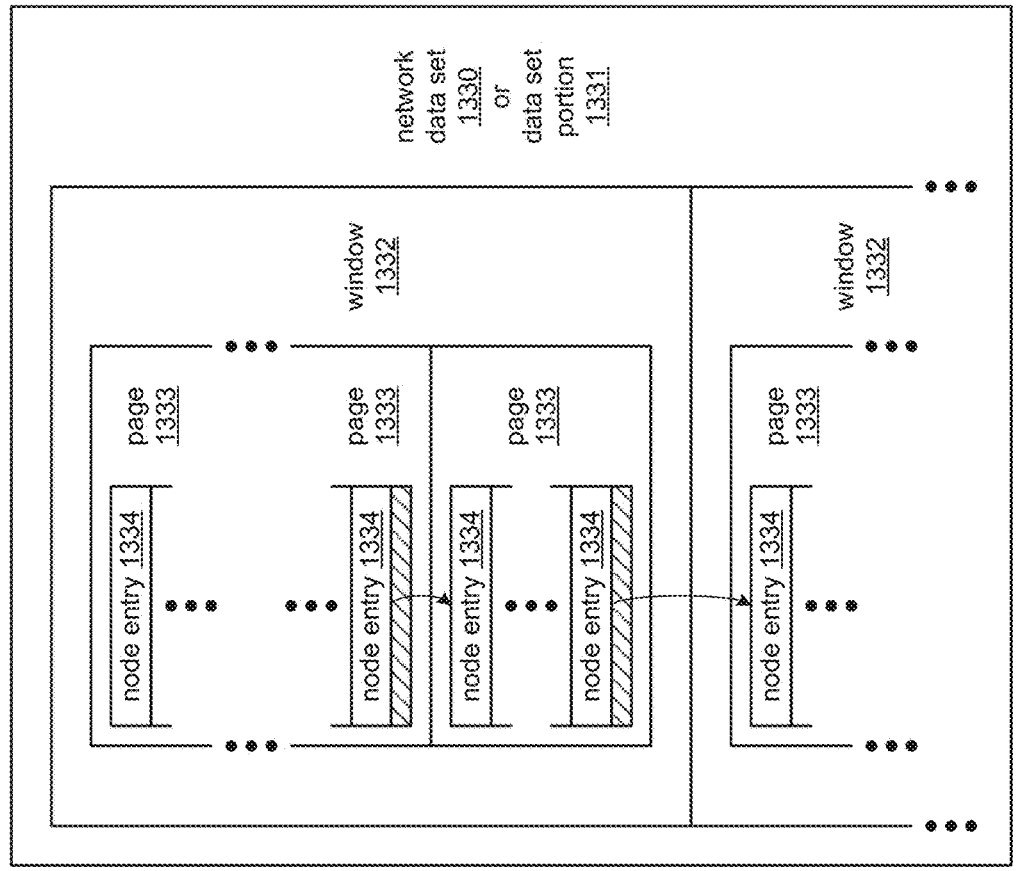

Turning to FIG. 17C, in view of the fact that such use may be made of virtual address spaces and/or of the swapping of page-sized portions of whichever window 1332 may be mapped into the virtual address space within the analysis server 1500, it may be deemed desirable to avoid having node entries within the network data set 1300 that span boundaries between portions of a window 1332 that may each be assigned to a different page 1333. By so doing, a situation may be avoided in which the loading of a node entry 1334 requires the loading of two adjacent pages 1333 that are spanned by that node entry 1334.

In some embodiments, the manner in which the spanning of page boundaries between adjacent pages 1333 may be avoided may similar to the earlier discussed manner in which the spanning of boundaries between adjacent windows 1332 may be avoided. More specifically, if a situation should arise, during the generation of the network data set 1330, where the next node entry 1334 to be generated would span a boundary between either two adjacent windows 1332 or two adjacent pages 1333 if the next node entry 1334 were to be generated to start immediately after the end of the preceding node entry 1334, then the next node entry 1334 may instead be generated to start coincident with the start of the next window 1332 or the start of the next page 1333 to avoid such an instance of spanning.

Figure 18A:
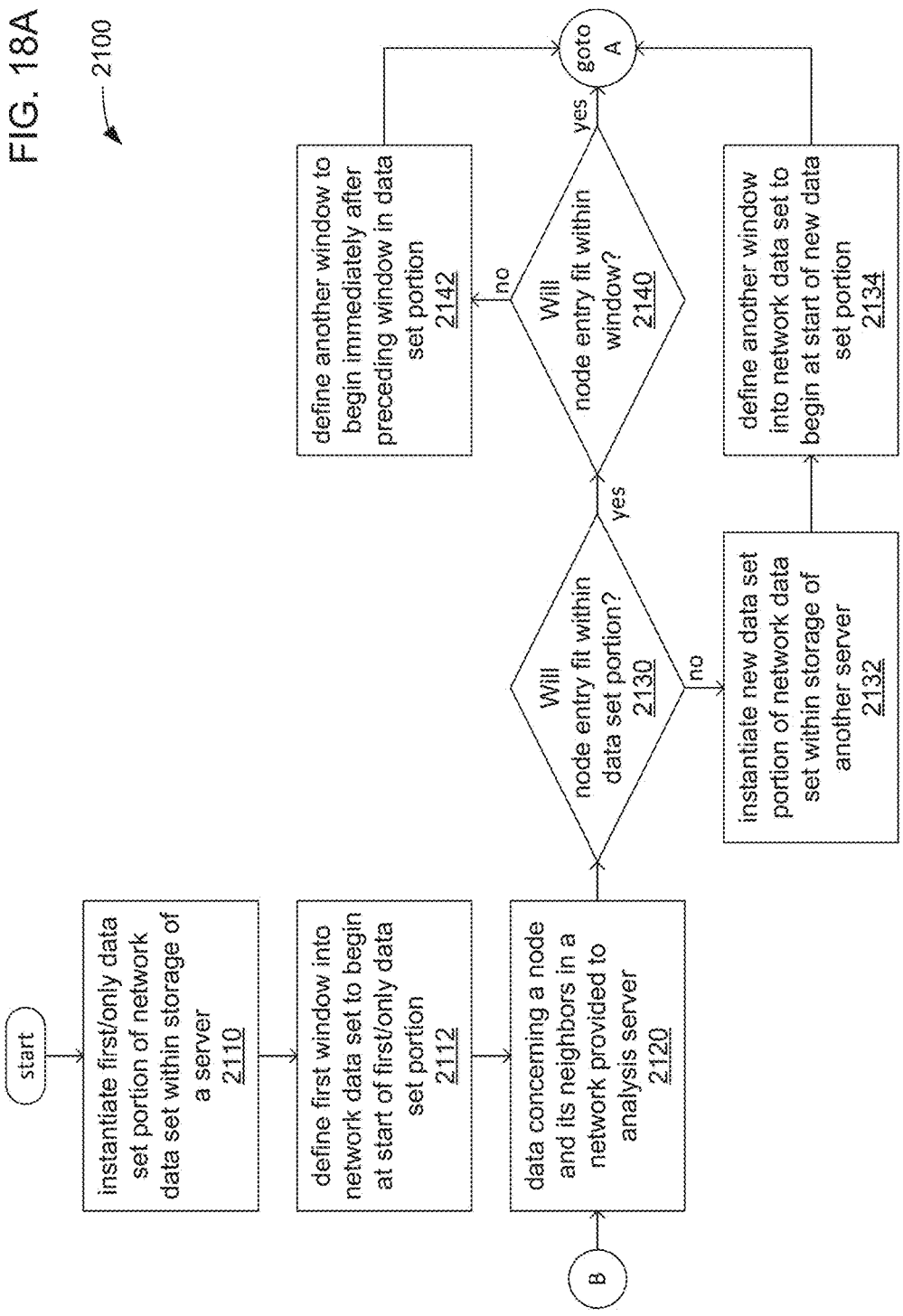

FIGS. 18A and 18B, together, illustrate an example embodiment of a logic flow 2100. The logic flow 2100 may be representative of some or all of the operations executed by one or more embodiments described herein. More specifically, the logic flow 2100 may illustrate operations performed by the processor 1550 in executing the control routine 1540, and/or performed by other component(s) of the analysis server 1500 to generate a network data set that may be distributed among the one or more storage servers 1300.

At 2110, a processor of an analysis server of a distributed processing system (e.g., the processor 1550 of the analysis server 1500 of the distributed processing system 1000) may instantiate the first data set portion of a network data set (e.g., a first one of the data set portion 1331 of the network data set 1330) within persistent storage of a storage server (e.g., within persistent storage 1363 of one of the storage servers 1300). At 2112, the processor may define a first new window to which node entries are to be assigned to become accessible (e.g., a first one of the windows 1332 to make node entries 1334 accessible) to have boundaries that start coincident with the start of the first data set portion.

At 2120, the analysis server may be provided with data concerning a node and its neighboring nodes and/or edges in a network (e.g., nodes 1101 and/or edges 1109 of the network 1100). As has been discussed, the network may include nodes that represent any of a variety of objects that may be connected in any of a variety of particular ways that are represented by the edges. As also previously discussed, the information concerning the network (e.g., the collected network data 1130) from which the network data set is generated may be retrieved by the processor directly from that network in some embodiments where that network is made up of devices that are capable of electronic communication. Alternatively, in other embodiments where the objects may not be of a type that is capable of such direct communications, information concerning the network may be provided to the analysis server from one or more other devices that may be involved in the monitoring of the objects and/or connections of the network.

At 2130, the processor may check whether a new node entry to be generated for the node is of a size that will fit within the data set portion of the network data set that is currently being generated. If not, then at 2132, the processor may instantiate a new data set portion of the network data set within persistent storage of another storage server, and may define another new window to have boundaries that start coincident with the start of the new data set portion at 2134. At 2150, the processor may check whether the new node entry, when added to the data set, would span across a page boundary between two adjacent pages of a virtual memory system of the analysis server (e.g., two of the pages 1333).

However, if at 2130, the new node entry will fit within the data set portion that is currently being generated, then at 2140, the processor may check whether the new node entry will fit within the window to which node entries are currently being assigned to be made accessible through the window. If not, then at 2142, the processor may define a new window to which at least the new node entry is to be assigned to become accessible to have boundaries that start coincident with the end of the boundaries of the preceding window. At 2150, the processor may check whether the new node entry would span across a page boundary. However, if at 2140, the new node entry will fit within the window to which node entries are currently being assigned to be made accessible through the window, then the processor may check whether the new node entry would span across a page boundary at 2150 without first defining a new window at 2142.

If, at 2150, the new node entry will not span a page boundary, then the processor may generate the new node entry at a location within the network data set that immediately follows the last node entry to be generated within the network data set at 2152. The processor may also add a new index entry that corresponds to the new node entry to index data (e.g., a new index entry 1434 to the index data 1430) associated with the network data set at 2160. As has been discussed, the new index entry may be generated within the index data at a location having an address able to be derived by multiplying a node identifier assigned to the node of the new node entry to greatly improve the speed with which the index entries are able to be accessed.

However, if at 2150, the new node entry will span a page boundary, then the processor may generate the new node entry at a location that starts immediately after the page boundary within the network data set at 2154. The processor may also add a new index entry that corresponds to the new node entry to index data associated with the network data set at 2160.

At 2170, the processor may check whether there is any more data concerning nodes of the network to add to the network data set. If there is, then the analysis server may again be provided with such data at 2120.

Figure 19A:
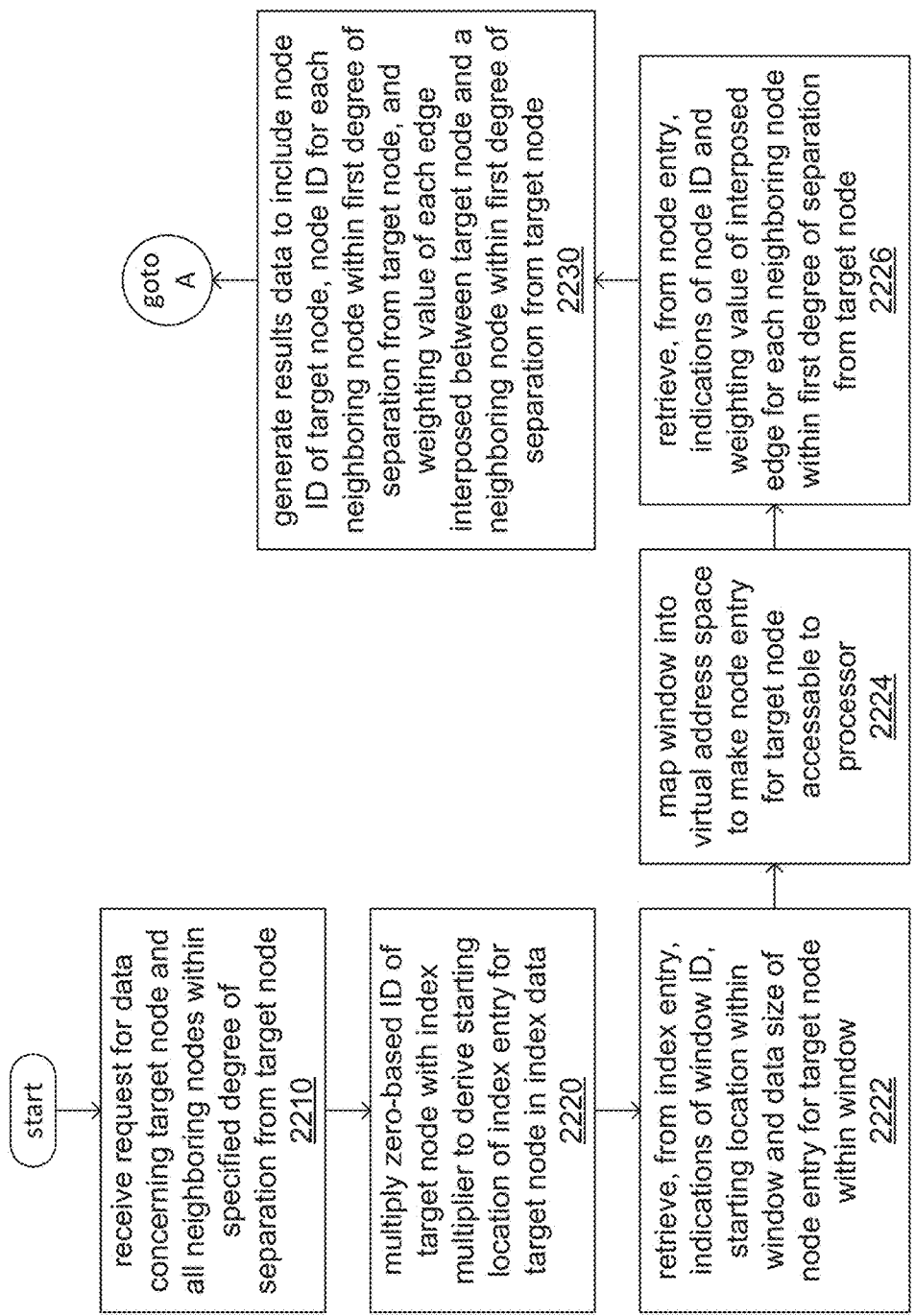
FIGS. 19A and 19B, together, illustrate an example embodiment of a logic flow of an analysis server retrieving data concerning nodes from a network data set.
Figure 19B:
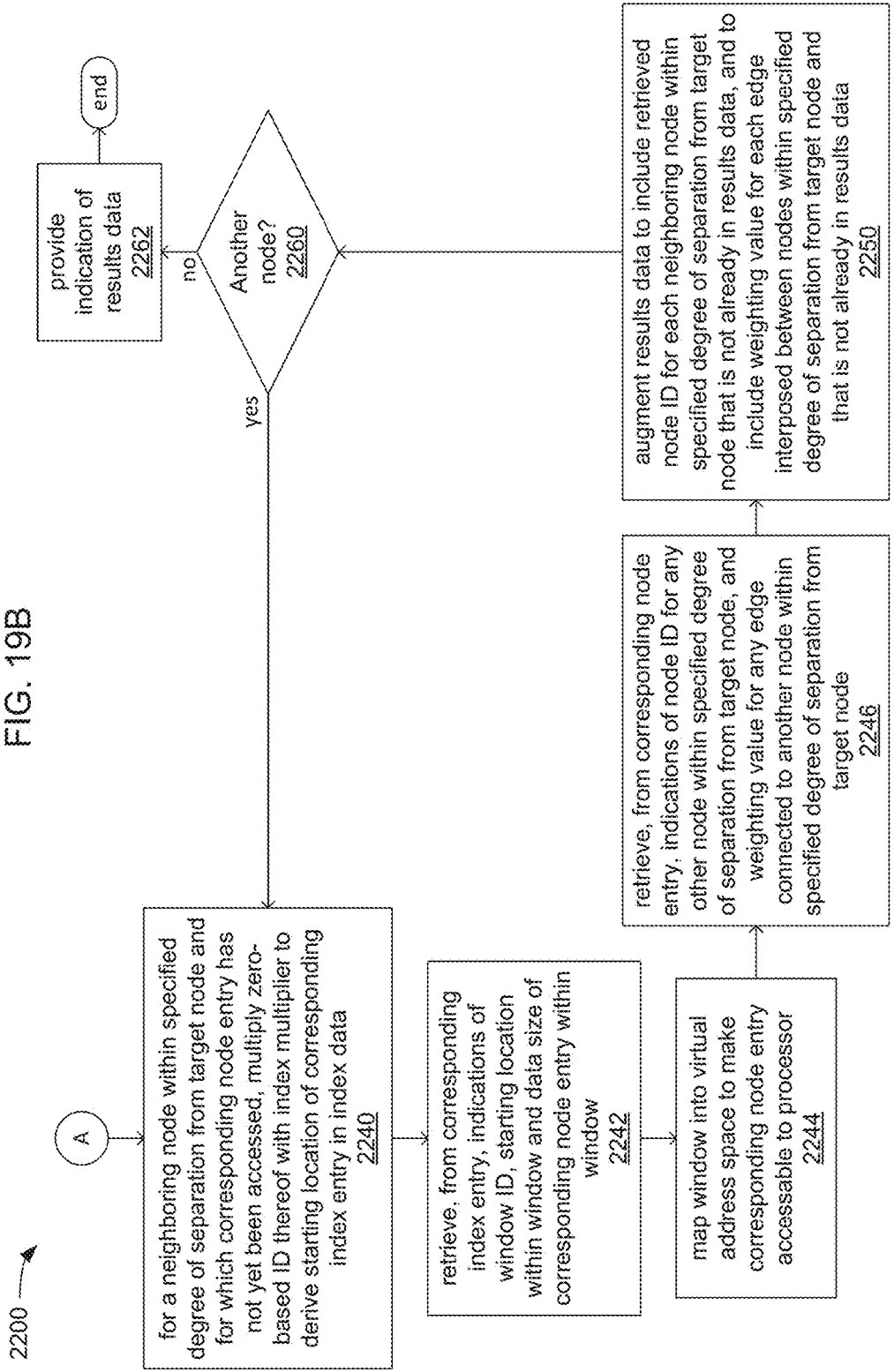

FIGS. 19A and 19B, together, illustrate an example embodiment of a logic flow 2200. The logic flow 2200 may be representative of some or all of the operations executed by one or more embodiments described herein. More specifically, the logic flow 2200 may illustrate operations performed by the processor 1550 in executing the control routine 1540, and/or performed by other component(s) of the analysis server 1500 to retrieve data from a network data set.

At 2210, a processor of an analysis server of a distributed processing system (e.g., the processor 1550 of the analysis server 1500 of the distributed processing system 1000) may receive a request for data concerning a target node and all neighboring nodes within a specified degree of separation of the target node (e.g., nodes 1101 of the network 1100). As has been discussed, such a request includes data concerning the edges among the target node and the specified neighboring nodes (e.g., the edges 1109 thereamong).

At 2220, the processor may multiply the node identifier by which the target node may be specified in the request by an index multiplier value to derive the address of the starting location within index data of the index entry (e.g., an index entry 1434 of the index data 1430) that corresponds to the target node. As previously discussed, an identical amount of space within the index data may be allocated for each of the index entries, and a value specifying the size of that space (which may be stored as part of the configuration data 1530) may be used as the index multiplier by which node identifiers may be multiplied to derive the addresses at which their corresponding index entries begin. As has also been discussed, the node identifiers assigned to the nodes may be sequentially assigned integer values that may start with the value of zero that is incremented by the value of one as each node is assigned its node identifier (e.g., the values of zero, one, two, three, and so on).

At 2222, the processor may retrieve, from the index entry for the target node, indications of the window identifier for the window through which the node entry corresponding to the target node in a node data set may be accessed (e.g., one of the windows 1332 through which one of the node entries 1334 of the node data set 1330 may be accessed), the starting location of the node entry for the target node within the window, and the size of the node entry for the target node. At 2224, the processor may use the window identifier retrieved from the index entry for the target node to select the identified window for being mapped into a virtual address space of the analysis server to make the node entry that corresponds to the target node accessible to the processor.

At 2226, the processor may use the starting location of the node entry within the window and the size of the node entry retrieved from the index entry to access the node entry and retrieve therefrom the node identifier for each neighboring node within the 1st degree of separation from the target node, and a weighting value indicative of a degree of a characteristic for each edge that connects one of the neighboring nodes within the 1st degree of separation to the target node. At 2230, the processor may use the data retrieved from the node entry corresponding to the target node to generate results data (e.g., the results data 1730) to include the node identifier of the target node, and all of the node identifiers and weighting values retrieved from the node entry of the target node, as part of responding to the request.

At 2240, for one of the neighboring nodes that is within the specified degree of separation from the target node and for which its corresponding node entry in the network data set has not yet been accessed, the processor may multiply the node identifier of that node by the index multiplier value to derive the address of the starting location within index data of the index entry that corresponds to that node. At 2242, the processor may retrieve, from the corresponding index entry, indications of the window identifier for the window through which the corresponding node entry may be accessed, the starting location of the corresponding node entry within the window, and the size of the corresponding node entry.

At 2244, the processor may use the window identifier retrieved from the corresponding index entry to select the identified window for being mapped into a virtual address space of the analysis server to make the corresponding node entry accessible to the processor. At 2246, the processor may use the starting location of the corresponding node entry within the window and the size of the corresponding node entry retrieved from the corresponding index entry to access the corresponding node entry and retrieve therefrom the node identifier for each neighboring node within the specified degree of separation from the target node, and/or a weighting value indicative of a degree of a characteristic for each edge that connects between two nodes that are within the specified degree of separation from the target node.

At 2250, the processor may use the data retrieved from the corresponding node entry to augment the results data to include the retrieved node ID of any neighboring node that is within the specified degree of separation from the target node that is not already included in the results data. The processor may also use the data retrieved from the corresponding node entry to augment the results data to include the weighting value for each edge that is interposed between nodes within the specified degree of separation from the target node that is not already included in the results data.

At 2260, the processor may check whether there is another one of the neighboring nodes that is within the specified degree of separation from the target node and for which the corresponding node entry within the network data set has not yet been accessed. If so, then the processor may return to accessing another index entry at 2240. However, if not, then the processor may provide the results data to the source of the request at 2262. As previously discussed, if the request was received from another device, then the results data may be transmitted thereto. Alternatively, if the request was received from an input device of the analysis server (e.g., the input device 1520), then the processor may use a display or other output device of the analysis server to present the results data (e.g., the display 1580). Also alternatively, if the request was received by the processor from an application routine executed within the analysis server, then the processor may provide an indication of the results data to the application routine.

Figure 20A:
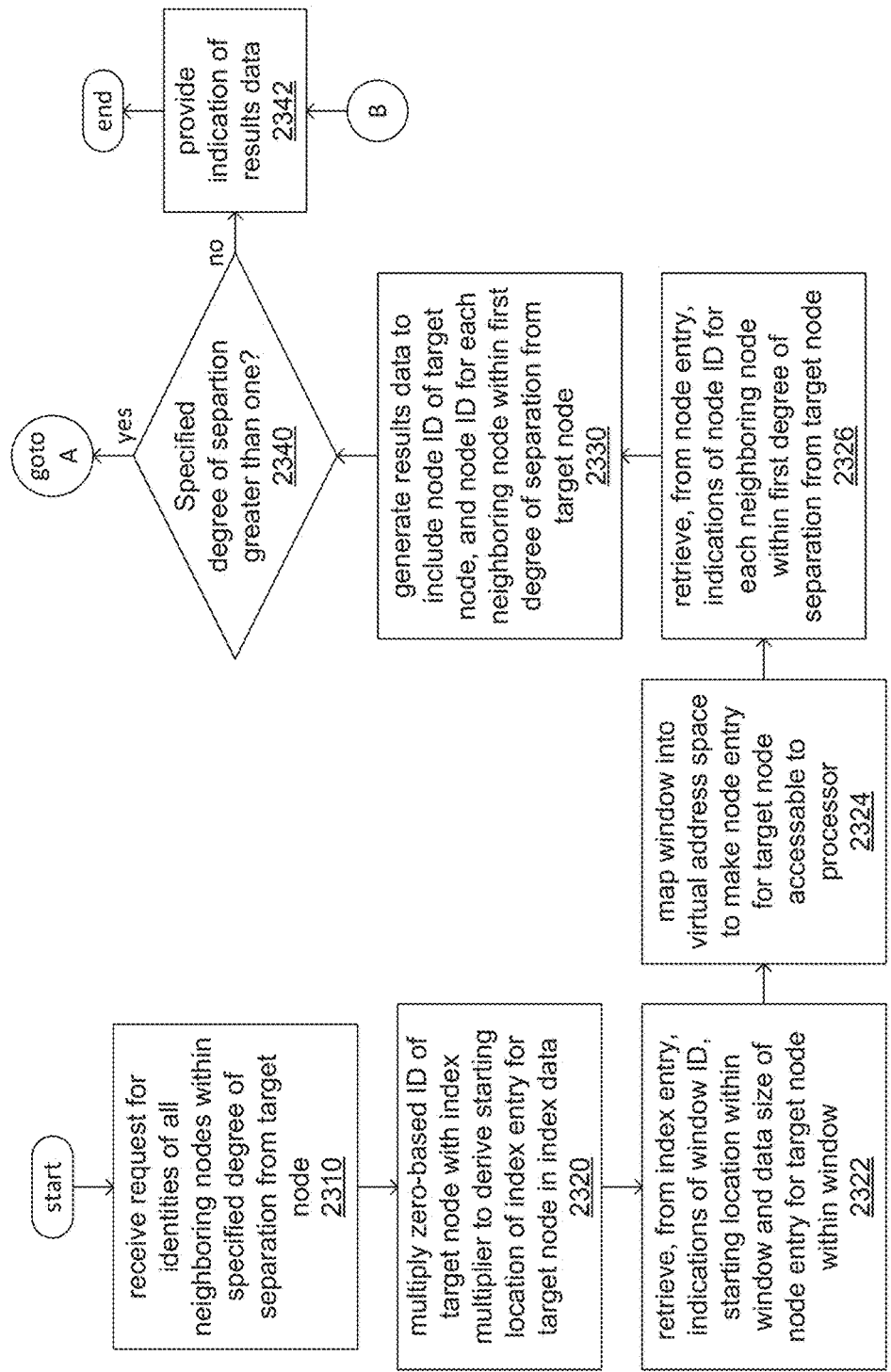

FIGS. 20A and 20B, together, illustrate an example embodiment of a logic flow 2300. The logic flow 2300 may be representative of some or all of the operations executed by one or more embodiments described herein. More specifically, the logic flow 2300 may illustrate operations performed by the processor 1550 in executing the control routine 1540, and/or performed by other component(s) of the analysis server 1500 to retrieve data from a network data set.

At 2310, a processor of an analysis server of a distributed processing system (e.g., the processor 1550 of the analysis server 1500 of the distributed processing system 1000) may receive a request for data specifying the identities of all neighboring nodes within a specified degree of separation of a target node (e.g., nodes 1101 of the network 1100). As has been discussed, such a request may not include data concerning the edges among the target node and the specified neighboring nodes (e.g., the edges 1109 thereamong).

At 2320, the processor may multiply the node identifier by which the target node may be specified in the request by an index multiplier value to derive the address of the starting location within index data of the index entry (e.g., an index entry 1434 of the index data 1430) that corresponds to the target node. Again, an identical amount of space within the index data may be allocated for each of the index entries, and a value specifying the size of that space (which may be stored as part of the configuration data 1530) may be used as the index multiplier by which node identifiers may be multiplied to derive the addresses at which their corresponding index entries begin.

At 2322, the processor may retrieve, from the index entry for the target node, indications of the window identifier for the window through which the node entry corresponding to the target node in a node data set may be accessed (e.g., one of the windows 1332 through which one of the node entries 1334 of the node data set 1330 may be accessed), the starting location of the node entry for the target node within the window, and the size of the node entry for the target node. At 2324, the processor may use the window identifier retrieved from the index entry for the target node to select the identified window for being mapped into a virtual address space of the analysis server to make the node entry that corresponds to the target node accessible to the processor.

At 2326, the processor may use the starting location of the node entry within the window and the size of the node entry retrieved from the index entry to access the node entry and retrieve therefrom the node identifier for each neighboring node within the 1st degree of separation from the target node. At 2330, the processor may use the data retrieved from the node entry corresponding to the target node to generate results data (e.g., the results data 1730) to include the node identifier of the target node, and all of the node identifiers retrieved from the node entry of the target node, as part of responding to the request.

At 2340, the processor may check whether the specified degree of separation from the target node is greater than one. If not, then the processor may provide the results data to the source of the request at 2342. Again, as previously discussed, if the request was received from another device, then the results data may be transmitted thereto. Alternatively, if the request was received from an input device of the analysis server (e.g., the input device 1520), then the processor may use a display or other output device of the analysis server to present the results data (e.g., the display 1580). Also alternatively, if the request was received by the processor from an application routine executed within the analysis server, then the processor may provide an indication of the results data to the application routine.

However, if the specified degree of separation is greater than one, then at 2350, for one of the neighboring nodes that is within one degree less than the specified degree of separation from the target node and for which its corresponding node entry in the network data set has not yet been accessed, the processor may multiply the node identifier of that node by the index multiplier value to derive the address of the starting location within index data of the index entry that corresponds to that node. At 2352, the processor may retrieve, from the corresponding index entry, indications of the window identifier for the window through which the corresponding node entry may be accessed, the starting location of the corresponding node entry within the window, and the size of the corresponding node entry.

At 2354, the processor may use the window identifier retrieved from the corresponding index entry to select the identified window for being mapped into a virtual address space of the analysis server to make the corresponding node entry accessible to the processor. At 2356, the processor may use the starting location of the corresponding node entry within the window and the size of the corresponding node entry retrieved from the corresponding index entry to access the corresponding node entry and retrieve therefrom the node identifier for each neighboring node within the specified degree of separation from the target node.

At 2360, the processor may use the data retrieved from the corresponding node entry to augment the results data to include the retrieved node ID of any neighboring node that is within the specified degree of separation from the target node that is not already included in the results data. At 2370, the processor may check whether there is another one of the neighboring nodes that is within one degree less than the specified degree of separation from the target node and for which the corresponding node entry within the network data set has not yet been accessed. If so, then the processor may return to accessing another index entry at 2350. However, if not, then the processor may provide the results data to the source of the request at 2342.

FIGS. 21A and 21B, together, illustrate an example embodiment of a logic flow 2400. The logic flow 2400 may be representative of some or all of the operations executed by one or more embodiments described herein. More specifically, the logic flow 2400 may illustrate operations performed by the processor 1550 in executing the control routine 1540, and/or performed by other component(s) of the analysis server 1500 to selectively generate more of a network data set that may be distributed among the one or more storage servers 1300.

At 2410, an analysis server a distributed processing system (e.g., the analysis server 1500 of the distributed processing system 1000) may be provided with data concerning anode and its neighboring nodes and/or edges in a network (e.g., nodes 1101 and/or edges 1109 of the network 1100) for which a network data set (e.g., the network data set 1330) may have already been generated. Again, such information concerning the network (e.g., the collected network data 1130) from which the network data set is generated may be retrieved by the analysis server directly from that network in some embodiments where that network is made up of devices that are capable of electronic communication. Alternatively, in other embodiments where the objects may not be of a type that is capable of such direct communications, information concerning the network may be provided to the analysis server from one or more other devices that may be involved in the monitoring of the objects and/or connections of the network.

At 2420, a processor of the analysis server (e.g., the processor 1550) may check whether there is already a node entry within the network data set for the node. If there is, then at 2422, the addition of the received data concerning the node may be deferred until the next occasion on which the network data set is regenerated, at which time a new node entry may be generated to include and/or be updated with received data. As has been discussed, to keep the information within the network data set up to date, the generation of the network data set may be recurringly repeated.

However, if at 2420, there is not already a node entry within the network data set for the node, then the processor may check at 2430 whether a new node entry to be generated for the node is of a size that will fit within the data set portion of the network data set that includes the last node entries to be generated. If not, then at 2432, the processor may instantiate a new data set portion of the network data set within persistent storage of a storage server different from the storage server that stores the data set portion in which the last node entries were generated (e.g., one of the storage servers 1300). The processor may also define a new window to have boundaries that start coincident with the start of the new data set portion at 2434. At 2450, the processor may check whether the new node entry, when added to the data set, would span across a page boundary between two adjacent pages of a virtual memory system of the analysis server (e.g., two of the pages 1333).

However, if at 2430, the new node entry will fit within the data set portion in which the last node entries were generated, then at 2440, the processor may check whether the new node entry will fit within the window to which the last node entries generated were assigned to be made accessible through the window. If not, then at 2442, the processor may define a new window to which at least the new node entry is to be assigned to become accessible to have boundaries that start coincident with the end of the boundaries of the preceding window. At 2450, the processor may check whether the new node entry would span across a page boundary. However, if at 2440, the new node entry will fit within the window to which the last node entries to be generated were assigned to be made accessible through the window, then the processor may check whether the new node entry would span across a page boundary at 2450 without first defining a new window at 2442.

If, at 2450, the new node entry will not span a page boundary, then the processor may generate the new node entry at a location within the network data set that immediately follows the last node entry to be generated within the network data set at 2452. The processor may also add a new index entry that corresponds to the new node entry to index data (e.g., a new index entry 1434 to the index data 1430) associated with the network data set at 2460. Again, the new index entry may be generated within the index data at a location having an address able to be derived by multiplying a node identifier assigned to the node of the new node entry to greatly improve the speed with which the index entries are able to be accessed.

However, if at 2450, the new node entry will span a page boundary, then the processor may generate the new node entry at a location that starts immediately after the page boundary within the network data set at 2454. The processor may also add a new index entry that corresponds to the new node entry to index data associated with the network data set at 2360.

In various embodiments, each of the processors 1150, 1350, 1550 and 1750 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 1550 of the coordinating device 1500 may be selected to efficiently perform the analysis of multiple instances of the metadata 1510 and/or the observation data 1511 in generating the annotated metadata 1512. Alternatively or additionally, the processor 1350 of each of the node devices 1300 may be selected to efficiently perform analyses of and/or tasks with corresponding ones of the data set portions 1310 at least partially in parallel. By way of example, the processor 1350 and/or 1550 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1350 of at least one of the node devices 1300 may incorporate multi-threaded capabilities and/or multiple processor cores to enable parallel performances of the functions of both the coordinating device 1500 and a node device 1300 in embodiments of the distributed processing system 1000 that, like the embodiment depicted in FIG. 12, do not include a separate and distinct coordinating device 1500.

In various embodiments, each of the control routines 1140, 1340, 1540 and 1740, including the components of which each is composed, may be selected to be operative on whatever type of processor or processors that are selected to implement applicable ones of the processors 1150, 1350, 1550 and/or 1750 within corresponding ones of the devices 1100, 1300, 1500 and/or 1700. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 1150, 1350, 1550 and/or 1750. Where one or more device drivers are included, those device drivers may provide support for any of a variety of other components, whether hardware or software components, of the devices 1100, 1300, 1500 and/or 1700.

In various embodiments, each of the storages 1160, 1360, 1560 and 1760 may be based on any of a wide variety of information storage technologies, including volatile technologies requiring the uninterrupted provision of electric power to retain data, and/or persistent storage technologies that do not require such uninterrupted provision of electric power to retain data, including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, persistent storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 1360 of one or more of the node devices 1300 that stores one or more of the data set portions 1310 may be implemented with a redundant array of independent discs (RAID) of a RAID level selected to provide fault tolerance to prevent loss of one or more of these datasets and/or to provide increased speed in accessing one or more of these datasets.

In various embodiments, each of the input devices 1520 and 1720 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, each of the displays 1580 and 1780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 1580 of the coordinating device 1500 and/or the display 1780 of the viewing device 1700 may be a touch-screen display such that the input device 1520 may be incorporated into the display 1580 and/or the input device 1720 may be incorporated into the display 1780. In such embodiments, the input device 1520 and/or the input device 1720 may be a touch-sensitive component of the display 1580 and/or the display 1780, respectively.

In various embodiments, the network interfaces 1190, 1390, 1590 and 1790 may employ any of a wide variety of communications technologies enabling, these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, the network interface 1390 of one or more of the node devices 1300 that stores one or more of the data set portions 1310 may be implemented with multiple copper-based or fiber-optic based network interface ports to provide redundant and/or parallel pathways in exchanging one or more of the data set portions 1310 with the one or more storage devices 1100.

In various embodiments, the division of processing and/or storage resources among the coordinating device 1500 and/or the node devices 1300, and/or the API architectures supporting communications among the coordinating device 1500 and/or the node devices 1300, may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of the data set portions 1310 of the selected data set 1113 are not dependent on, nor constrained by, existing API architectures and/or supporting communications protocols. More broadly, there is nothing in the manner in which the selected data set 1113 may be organized in storage, transmission and/or distribution via the network 1999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:

receive, at an analysis server, a request for data concerning a target node and one or more neighboring nodes of the target node that are within a degree of separation specified by the request from the target node within a network that comprises multiple nodes interconnected by multiple edges;

multiply an identifier of the target node provided by the request with an index multiplier to determine a location of an index entry of the target node within an index data, wherein:
the index data comprises multiple index entries for the multiple nodes of the network;
the multiple index entries are organized based on a sequential order of multiple zero-based numeric identifiers that are each uniquely associated with each node of the multiple nodes;
the identifier of the target node comprises one of the multiple zero-based numeric identifiers; and
the index multiplier is based on a length of each of the multiple index entries;

access the index entry of the target node within the index data to retrieve an identifier of a window and an indication of a location within the window at which a node entry of the target node within a network data set may be accessed, and to retrieve an indication of data size of the node entry of the target node, wherein:
the network data set comprises multiple node entries for the multiple nodes of the network; and
the window comprises one of multiple windows that are each defined to enable access to a corresponding subset of the network data set;

access the node entry of the target node within the network data set at the indicated location within the identified window to retrieve an amount of the node entry of the target node up to the indicated data size, wherein the node entry of the target node comprises:
  at least one identifier of at least one neighboring node of the target node that is within a first degree of separation from the target node within the network; and
  at least one weighting value associated with at least one edge interposed between the target node and the at least one neighboring node; and
output an indication of the at least one identifier of the at least one neighboring node within the first degree of separation from the target node.

2. The apparatus of claim 1, comprising:
a persistent storage to retain the network data set therein regardless of provision of electric power thereto; and
a volatile storage able to provide the processor with faster access than the persistent storage to multiple pages of the network data set stored therein, wherein, in accessing the node entry of the target node, the processor is caused to:
  retrieve, from the persistent storage, at least one page of the network data set within the identified window that includes the node entry of the target node; and
  store, within the volatile storage, the at least one page.

3. The apparatus of claim 1, wherein:
the network data set comprises multiple data set portions;
each of the multiple data set portions is stored by a separate one of multiple storage servers;
each of the multiple storage servers comprises a persistent storage to retain one of the multiple data set portions therein regardless of provision of electric power thereto;
each window of the multiple windows is defined to provide access to multiple pages of one of the data set portions of the multiple data set portions;
the apparatus comprises a volatile storage able to provide the processor with faster access than the persistent storage to multiple pages of the network data set stored therein; and
in accessing the node entry of the target node, the processor is caused to perform operations comprising:
  transmit, to a storage server that stores a data set portion that the identified window provides access to at least a subset of, a request for at least one page of the data set portion within the identified window that includes the node entry of the target node;
  receive, at the analysis server, the at least one page from the storage server; and
  store, within the volatile storage, the at least one page.

4. The apparatus of claim 3, wherein the processor is caused to:
  access the index entry of the target node to additionally retrieve an identifier of at least one of the data set portion and the storage server; and
  select the storage server from among the multiple storage servers to transmit the request to based on the identifier of at least one of the data set portion and the storage server.

5. The apparatus of claim 3, wherein the identifier of the window also identifies at least one of the data set portion and the storage server.

6. The apparatus of claim 1, wherein the processor is caused to perform operations comprising:
determine whether the degree of separation specified by the request from the target node is greater than one; and
in response to the determination that the specified degree of separation from the target node is greater than one, for each neighboring node within the specified degree of separation from the target node, perform operations comprising:
  multiply an identifier of the neighboring node with the index multiplier to determine a location of an index entry of the neighboring node within the index data;
  access the index entry of the neighboring node within the index data to retrieve an identifier of a window and an indication of a location within the window at which a node entry of the neighboring node within the network data set may be accessed, and to retrieve an indication of the data size of the node entry of the neighboring node;
  access the node entry of the neighboring node within the network data set at the indicated location within the identified window to retrieve an amount of the node entry of the neighboring node up to the indicated data size, wherein the node entry of the neighboring node comprises:
    an identifier of another neighboring node of the target node that is within the specified degree of separation from the target node within the network; and
    a weighting value associated with an edge interposed between the neighboring node and the other neighboring node; and
  output an indication of the identifier of the other neighboring node.

7. The apparatus of claim 1, wherein the processor is caused to perform operations comprising:
receive, at the analysis server, data descriptive of the multiple nodes of the network; and
for each node of the multiple nodes, perform operations comprising:
  add a node entry of the multiple node entries for the node to the network data set; and
  add an index entry of the multiple index entries for the node to the index data at a location that enables the index entry to be accessed by multiplying the identifier of the node with the index multiplier.

8. The apparatus of claim 7, wherein for each node entry of the multiple node entries that is added to the node data set, the processor is caused to perform operations comprising:
determine whether adding the node entry at a location within the network data set that is immediately adjacent to another node entry most recently added to the network data set will cause the node entry to straddle a page boundary; and
in response to a determination that adding the node entry immediately adjacent to the other node will straddle a page boundary, add the node entry at a location adjacent to and not straddling the page boundary.

9. The apparatus of claim 7, wherein:
the network data set comprises multiple data set portions;
each of the multiple data set portions is stored by a separate one of multiple storage servers;
adding the node entry to the network data set comprises adding the node entry to one of the data set portions stored by one of the multiple storage servers; and
in adding the node entry of the multiple node entries to the one of the data set portions, the processor is caused to perform operations comprising:

determine whether the node entry will fit within the one of the multiple data set portions; and in response to a determination that the node entry will not fit within the one of the multiple data set portions, perform operations comprising:

instantiate another of the multiple data set portions within another of the multiple storage servers; and add the node entry to the other of the multiple data set portions.

10. The apparatus of claim 1, comprising a display, wherein:

the network comprises a social network;

each node of the multiple nodes comprises a person;

each edge of the multiple edges comprises a relationship between two persons;

in outputting the indication of the at least one identifier of the at least one neighboring node, the processor is caused to present the indication of the at least one identifier on the display as part of a presentation of a portion of the network within a user interface; and in providing the user interface, the processor is caused to alter the presentation of the portion of the network in response to input received by the processor through the user interface.

11. A computer-program product tangibly embodied in a non-transitory machine-readable storage medium, the computer-program product including instructions operable to cause a processor to perform operations comprising:

receive, at an analysis server, a request for data concerning a target node and one or more neighboring nodes of the target node that are within a degree of separation specified by the request from the target node within a network that comprises multiple nodes interconnected by multiple edges;

multiply, at the analysis server, an identifier of the target node provided by the request with an index multiplier to determine a location of an index entry of the target node within an index data, wherein:

the index data comprises multiple index entries for the multiple nodes of the network;

the multiple index entries are organized based on a sequential order of multiple zero-based numeric identifiers that are each uniquely associated with each node of the multiple nodes;

the identifier of the target node comprises one of the multiple zero-based numeric identifiers; and the index multiplier is based on a length of each of the multiple index entries;

access, at the analysis server, the index entry of the target node within the index data to retrieve an identifier of a window and an indication of a location within the window at which a node entry of the target node within a network data set may be accessed, and to retrieve an indication of data size of the node entry of the target node, wherein:

the network data set comprises multiple node entries for the multiple nodes of the network; and the window comprises one of multiple windows that are each defined to enable access to a corresponding subset of the network data set;

access the node entry of the target node within the network data set at the indicated location within the identified window to retrieve an amount of the node entry of the target node up to the indicated data size, wherein the node entry of the target node comprises:

at least one identifier of at least one neighboring node of the target node that is within a first degree of separation from the target node within the network; and at least one weighting value associated with at least one edge interposed between the target node and the at least one neighboring node; and output, from the analysis server, an indication of the at least one identifier of the at least one neighboring node within the first degree of separation from the target node.

12. The computer-program product of claim 11, wherein in accessing the node entry of the target node, the processor is caused to perform operations comprising:

retrieve, from a persistent storage of the analysis server, at least one page of the network data set within the identified window that includes the node entry of the target node, wherein the persistent storage is to retain the network data set therein regardless of provision of electric power thereto; and store, within a volatile storage of the analysis server, the at least one page, wherein the volatile storage is able to provide the processor with faster access than the persistent storage to multiple pages of the network data set stored therein.

13. The computer-program product of claim 11, wherein:

the network data set comprises multiple data set portions;

each of the multiple data set portions is stored by a separate one of multiple storage servers;

each of the multiple storage servers comprises a persistent storage to retain one of the multiple data set portions therein regardless of provision of electric power thereto;

each window of the multiple windows is defined to provide access to multiple pages of one of the data set portions of the multiple data set portions; and in accessing the node entry of the target node, the processor is caused to perform operations comprising:

transmit, from the analysis server and to a storage server that stores a data set portion that the identified window provides access to at least a subset of, a request for at least one page of the data set portion within the identified window that includes the node entry of the target node;

receive, at the analysis server, the at least one page from the storage server; and store, within a volatile storage of the analysis server, the at least one page, wherein the volatile storage able to provide the processor with faster access than the persistent storage to multiple pages of the network data set stored therein.

14. The computer-program product of claim 13, wherein the processor is caused to:

access, at the analysis server, the index entry of the target node to additionally retrieve an identifier of at least one of the data set portion and the storage server; and select, at the analysis server, the storage server from among the multiple storage servers to transmit the request to based on the identifier of at least one of the data set portion and the storage server.

15. The computer-program product of claim 13, wherein the identifier of the window also identifies at least one of the data set portion and the storage server.

16. The computer-program product of claim 11, wherein the processor is caused to perform operations comprising:

determine, at the analysis server, whether the degree of separation specified by the request from the target node is greater than one; and in response to a determination that the specified degree of separation from the target node is greater than one, for each neighboring node within the specified degree of separation from the target node, perform operations comprising:

multiply, at the analysis server, an identifier of the neighboring node with the index multiplier to determine a location of an index entry of the neighboring node within the index data;

access, at the analysis server, the index entry of the neighboring node within the index data to retrieve an identifier of a window and an indication of a location within the window at which a node entry of the neighboring node within the network data set may be accessed, and to retrieve an indication of the data size of the node entry of the neighboring node;

access the node entry of the neighboring node within the network data set at the indicated location within the identified window to retrieve an amount of the node entry of the neighboring node up to the indicated data size, wherein the node entry of the neighboring node comprises:

an identifier of another neighboring node of the target node that is within the specified degree of separation from the target node within the network; and a weighting value associated with an edge interposed between the neighboring node and the other neighboring node; and output, from the analysis server an indication of the identifier of the other neighboring node.

17. The computer-program product of claim 11, wherein the processor is caused to perform operations comprising:

receive, at the analysis server, data descriptive of the multiple nodes of the network; and for each node of the multiple nodes, perform operations comprising:

add a node entry of the multiple node entries for the node to the network data set; and add an index entry of the multiple index entries for the node to the index data at a location that enables the index entry to be accessed by multiplying the identifier of the node with the index multiplier.

18. The computer-program product of claim 17, wherein for each node entry of the multiple node entries that is added to the node data set, the processor is caused to perform operations comprising:

determine, at the analysis server, whether adding the node entry at a location within the network data set that is immediately adjacent to another node entry most recently added to the network data set will cause the node entry to straddle a page boundary; and in response to a determination that adding the node entry immediately adjacent to the other node will straddle a page boundary, add the node entry at a location adjacent to and not straddling the page boundary.

19. The computer-program product of claim 17, wherein:

the network data set comprises multiple data set portions;

each of the multiple data set portions is stored by a separate one of multiple storage servers;

adding the node entry to the network data set comprises adding the node entry to one of the data set portions stored by one of the multiple storage servers; and in adding the node entry of the multiple node entries to the one of the data set portions, the processor is caused to perform operations comprising:

determine, at the analysis server, whether the node entry will fit within the one of the multiple data set portions; and in response to a determination that the node entry will not fit within the one of the multiple data set portions, perform operations comprising:

instantiate another of the multiple data set portions within another of the multiple storage servers; and add the node entry to the other of the multiple data set portions.

20. The computer-program product of claim 11, wherein in outputting the indication of the at least one identifier of the at least one neighboring node, the processor is caused to provide the indication of the at least one identifier to an application routine executed by the processor at the analysis server.

21. A computer-implemented method comprising:

receiving, at an analysis server, a request for data concerning a target node and one or more neighboring nodes of the target node that are within a degree of separation specified in the request from the target node within a network that comprises multiple nodes interconnected by multiple edges;

multiplying, at the analysis server, an identifier of the target node provided by the request with an index multiplier to determine a location of an index entry of the target node within an index data, wherein:

the index data comprises multiple index entries for the multiple nodes of the network;

the multiple index entries are organized based on a sequential order of multiple zero-based numeric identifiers that are each uniquely associated with each node of the multiple nodes;

the identifier of the target node comprises one of the multiple zero-based numeric identifiers; and the index multiplier is based on a length of each of the multiple index entries;

accessing, at the analysis server, the index entry of the target node within the index data to retrieve an identifier of a window and an indication of a location within the window at which a node entry of the target node within a network data set may be accessed, and to retrieve an indication of data size of the node entry of the target node, wherein:

the network data set comprises multiple node entries for the multiple nodes of the network; and the window comprises one of multiple windows that are each defined to enable access to a corresponding subset of the network data set;

accessing the node entry of the target node within the network data set at the indicated location within the identified window to retrieve an amount of the node entry of the target node up to the indicated data size, wherein the node entry of the target node comprises:

at least one identifier of at least one neighboring node of the target node that is within a first degree of separation from the target node within the network; and at least one weighting value associated with at least one edge interposed between the target node and the at least one neighboring node; and outputting, from the analysis server, an indication of the at least one identifier of the at least one neighboring node within the first degree of separation from the target node.

22. The computer-implemented method of claim 21, wherein accessing the node entry of the target node comprises:
retrieving, from a persistent storage of the analysis server, at least one page of the network data set within the identified window that includes the node entry of the target node, wherein the persistent storage is to retain the network data set therein regardless of provision of electric power thereto; and
storing, within a volatile storage of the analysis server, the at least one page, wherein the volatile storage is able to provide a processor of the analysis server with faster access than the persistent storage to multiple pages of the network data set stored therein.

23. The computer-implemented method of claim 21, wherein:
the network data set comprises multiple data set portions;
each of the multiple data set portions is stored by a separate one of multiple storage servers;
each of the multiple storage servers comprises a persistent storage to retain one of the multiple data set portions therein regardless of provision of electric power thereto;
each window of the multiple windows is defined to provide access to multiple pages of one of the data set portions of the multiple data set portions; and
accessing the node entry of the target node comprises:
transmitting, from the analysis server and to a storage server that stores a data set portion that the identified window provides access to at least a subset of, a request for at least one page of the data set portion within the identified window that includes the node entry of the target node;
receiving, at the analysis server, the at least one page from the storage server; and
storing, within a volatile storage of the analysis server, the at least one page, wherein the volatile storage able to provide a processor with faster access than the persistent storage to multiple pages of the network data set stored therein.

24. The computer-implemented method of claim 23, comprising:
accessing, at the analysis server, the index entry of the target node to additionally retrieve an identifier of at least one of the data set portion and the storage server; and
selecting, at the analysis server, the storage server from among the multiple storage servers to transmit the request to based on the identifier of at least one of the data set portion and the storage server.

25. The computer-implemented method of claim 23, wherein the identifier of the window also identifies at least one of the data set portion and the storage server.

26. The computer-implemented method of claim 21, comprising:
determining, at the analysis server, whether the degree of separation specified by the request from the target node is greater than one; and
in response to a determination that the specified degree of separation from the target node is greater than one, for each neighboring node within the specified degree of separation from the target node, performing operations comprising:
multiplying, at the analysis server, an identifier of the neighboring node with the index multiplier to determine a location of an index entry of the neighboring node within the index data;
accessing, at the analysis server, the index entry of the neighboring node within the index data to retrieve an identifier of a window and an indication of a location within the window at which a node entry of the neighboring node within the network data set may be accessed, and to retrieve an indication of the data size of the node entry of the neighboring node;
accessing the node entry of the neighboring node within the network data set at the indicated location within the identified window to retrieve an amount of the node entry of the neighboring node up to the indicated data size, wherein the node entry of the neighboring node comprises:
an identifier of another neighboring node of the target node that is within the specified degree of separation from the target node within the network; and
a weighting value associated with an edge interposed between the neighboring node and the other neighboring node; and
outputting; from the analysis server an indication of the identifier of the other neighboring node.

27. The computer-implemented method of claim 21, comprising:
receiving, at the analysis server, data descriptive of the multiple nodes of the network; and
for each node of the multiple nodes, performing operations comprising:
adding a node entry of the multiple node entries for the node to the network data set; and
adding an index entry of the multiple index entries for the node to the index data at a location that enables the index entry to be accessed by multiplying the identifier of the node with the index multiplier.

28. The computer-implemented method of claim 27, comprising, for each node entry of the multiple node entries that is added to the node data set, performing operations comprising:
determining, at the analysis server, whether adding the node entry at a location within the network data set that is immediately adjacent to another node entry most recently added to the network data set will cause the node entry to straddle a page boundary; and
in response to a determination that adding the node entry immediately adjacent to the other node will straddle a page boundary, adding the node entry at a location adjacent to and not straddling the page boundary.

29. The computer-implemented method of claim 27, wherein:
the network data set comprises multiple data set portions;
each of the multiple data set portions is stored by a separate one of multiple storage servers;
adding the node entry to the network data set comprises adding the node entry to one of the data set portions stored by one of the multiple storage servers; and
adding the node entry of the multiple node entries to the one of the data set portions comprises:
determining, at the analysis server, whether the node entry will fit within the one of the multiple data set portions; and
in response to a determination that the node entry will not fit within the one of the multiple data set portions, perforating operations comprising:

instantiating another of the multiple data set portions within another of the multiple storage servers; and
adding the node entry to the other of the multiple data set portions.

30. The computer-implemented method of claim 21, wherein outputting the indication of the at least one identifier of the at least one neighboring node comprises transmitting the indication of the at least one identifier to a viewing device.

* * * * *

UNITED STATES PATENT AND TRADEMARK OFFICE
CERTIFICATE OF CORRECTION

PATENT NO. : 9,742,867 B1  
APPLICATION NO. : 15/467955  
DATED : August 22, 2017  
INVENTOR(S) : Charles Michael Cavalier Page 1 of 1

It is certified that error appears in the above-identified patent and that said Letters Patent is hereby corrected as shown below:

In the Specification

Column 36, Line 59, replace "huh" with -- hub --.

Column 54, Line 29, replace "anode" with -- a node --.

Signed and Sealed this  
Thirty-first Day of October, 2017

Joseph Matal  
*Performing the Functions and Duties of the*  
*Under Secretary of Commerce for Intellectual Property and*  
*Director of the United States Patent and Trademark Office*